(12) United States Patent (10) Patent No.: US 8,576,281 B2
Hammadou (45) Date of Patent: Nov. 5, 2013

(54) SMART NETWORK CAMERA SYSTEM-ON-A-CHIP

(75) Inventor: Tarik Hammadou, Surry Hills (AU)

(73) Assignee: ITS-7 Pty Ltd (AU)

( * ) Notice: Subject to any disclaimer, the term of this patent is extended or adjusted under 35 U.S.C. 154(b) by 1158 days.

(21) Appl. No.: 12/209,736

(22) Filed: Sep. 12, 2008

(65) Prior Publication Data

US 2009/0066790 A1 Mar. 12, 2009

Related U.S. Application Data

(60) Provisional application No. 60/971,702, filed on Sep. 12, 2007.

(51) Int. Cl.
*H04N 7/18* (2006.01)
(52) U.S. Cl.
USPC .............................. 348/143; 348/149; 382/104
(58) Field of Classification Search
USPC .................................... 348/143–149; 382/104
See application file for complete search history.

(56) References Cited

U.S. PATENT DOCUMENTS

| | | | |
|---|---|---|---|
| 6,323,897 B1 | 11/2001 | Kogane et al. | |
| 6,999,004 B2 * | 2/2006 | Comaniciu et al. | 340/937 |
| 7,068,842 B2 | 6/2006 | Liang et al. | |
| 7,227,569 B2 | 6/2007 | Maruya | |
| 7,729,516 B2 * | 6/2010 | Shima et al. | 382/106 |
| 2002/0057340 A1 * | 5/2002 | Fernandez et al. | 348/143 |
| 2003/0142209 A1 * | 7/2003 | Yamazaki et al. | 348/143 |
| 2004/0085445 A1 * | 5/2004 | Park | 348/143 |
| 2004/0096084 A1 * | 5/2004 | Tamoto et al. | 382/104 |
| 2004/0131233 A1 * | 7/2004 | Comaniciu et al. | 382/104 |
| 2004/0263625 A1 * | 12/2004 | Ishigami et al. | 348/152 |
| 2005/0057653 A1 * | 3/2005 | Maruya | 348/159 |
| 2006/0028556 A1 * | 2/2006 | Bunn et al. | 348/211.99 |
| 2006/0190419 A1 * | 8/2006 | Bunn et al. | 706/2 |
| 2006/0250501 A1 * | 11/2006 | Widmann et al. | 348/148 |
| 2006/0256198 A1 * | 11/2006 | Nishiuchi | 348/148 |
| 2006/0269104 A1 * | 11/2006 | Ciolli | 382/104 |
| 2007/0130599 A1 * | 6/2007 | Monroe | 725/105 |
| 2007/0154100 A1 | 7/2007 | Au et al. | |

(Continued)

OTHER PUBLICATIONS

Notification Concerning Transmittal of International Preliminary Report on Patentability (Chapter I of the Patent Cooperation Treaty), PCT/IB2008/002404, mailed Mar. 25, 2010.

(Continued)

*Primary Examiner* — Quang N Nguyen
*Assistant Examiner* — Razu Miah
(74) *Attorney, Agent, or Firm* — McAndrews, Held & Malloy, Ltd.

(57) ABSTRACT

Aspects of a method and system for processing video data are disclosed and may include detecting, within a single chip in a programmable surveillance video camera, one or more moving objects in a raw video signal generated by the programmable surveillance video camera. One or more characteristics of the detected one or more objects may be extracted within the single chip in the programmable surveillance video camera. The extraction may be based on the raw video signal and may be performed prior to compression of the raw video data. The characteristics of the detected one or more objects may include shape, texture, color, motion presence, motion direction, sequence name, location, links, and/or alarm type. One or more textual representations of at least one of the characteristics of the detected one or more objects may be generated within the single chip in the programmable surveillance video camera.

21 Claims, 28 Drawing Sheets

(56) References Cited

U.S. PATENT DOCUMENTS

2008/0106599 A1* 5/2008 Liu et al. .................. 348/143
2008/0130949 A1* 6/2008 Ivanov et al. ............. 382/103
2008/0316308 A1* 12/2008 Spinello et al. ........... 348/143
2009/0059002 A1* 3/2009 Kim .......................... 348/143
2009/0219387 A1* 9/2009 Marman et al. ........... 348/143

OTHER PUBLICATIONS

International Search Report and Written Opinion corresponding to International Application Serial No. PCT/IB2008/002404, mailed Jan. 26, 2009.

* cited by examiner

SMART NETWORK CAMERA SYSTEM-ON-A-CHIP

RELATED APPLICATIONS

This application makes reference to and claims priority to U.S. Provisional Application Ser. No. 60/971,702, filed on Sep. 12, 2007, entitled "SMART NETWORK CAMERA SYSTEM-ON-A-CHIP," which is incorporated herein by reference in its entirety.

This application also makes reference to:
U.S. patent application Ser. No. 11/107,671, filed on Apr. 15, 2005;
U.S. patent application Ser. No. 11/219,951, filed on Sep. 6, 2005; and
U.S. patent application Ser. No. 11/748,775, filed on May 15, 2007.

Each of the above stated applications is hereby incorporated herein by reference in its entirety.

FIELD OF THE INVENTION

Certain embodiments of the invention relate to security management systems. More specifically, certain embodiments of the invention relate to a smart network camera system-on-a-chip (SoC).

BACKGROUND OF THE INVENTION

A common security function that is generally provided in security management systems is video surveillance. Video surveillance operations may require upgrades to support newer technologies, additional features, and/or compatibility with other security functions. Most video surveillance operations are generally provided by stand-alone closed circuit television (CCTV) systems that are commonly found in, for example, office buildings, retail shops, external structures, schools, railway stations, and even on city streets. Thus an effectively integrated security management system may require that a CCTV system be compatible with other security functions such as access control methods augmented with biometrics, crowd control operations, security tracking systems, and/or access tracking systems, for example. Generally, a human operator utilizes collected information from the various security functions to analyze current events to determine an action to be taken or for forensic investigation of previous occurrences. More effective integrated security management systems are needed that would coordinate the contents supplied by the security functions in order to simplify or reduce the need for operator analysis and action.

However, most CCTV systems are not easily upgradable nor are they easily integrated with other security functionality. As a result, integrated security management systems that include video surveillance operations remain a challenge to implement. Moreover, the ability of these integrated security management systems to evolve and provide further security functions and/or additional features is generally limited, or may only be accomplished with a substantial investment in hardware and/or software, or by adding human operators.

Novel and cost effective network video camera solutions are therefore needed that, while providing flexibility in integration and deployment, also enable the back end security management platform to simplify the processing and storage of video information in a manner that enhances the availability and efficiency of advanced security applications and functionalities. This approach may therefore enable truly integrated security management solutions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A smart network camera system-on-a-chip (SoC), substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for processing video data. Aspects of the method may include detecting, within a single chip in a programmable surveillance video camera, one or more moving objects in a raw video signal generated by the programmable surveillance video camera. One or more characteristics of the detected one or more objects may be extracted within the single chip in the programmable surveillance video camera. The extraction may be based on the raw video signal and may be performed prior to compression of the raw video data. The characteristics of the detected one or more objects may include shape, texture, color, motion presence, motion direction, sequence name, location, links, and/or alarm type. One or more textual representations of at least one of the characteristics of the detected one or more objects may be generated within the single chip in the programmable surveillance video camera.

Thanks to the increased deployment and access to digital networks in many locations where integrated security management are utilized, a recent approach to address the limited flexibility of CCTV systems has been to use network compatible security cameras for video surveillance. Most network or Internet protocol (IP) video cameras communicate video content over an Ethernet network to enable better implementation, flexibility and operability of integrated security management systems. Nevertheless, a real integrated security management solution remains a challenge. For example, the ease with which additional network video cameras may be added to existing networks may significantly increase the amount of information captured for video surveillance applications, which may have consequences in the ability to store and/or analyze the video information. Moreover, network management issues also add to the complexity of implementing an effective security and surveillance system. Novel and cost effective network video camera solutions are therefore needed that, while providing flexibility in integration and deployment, also enable the back end security management platform to simplify the processing and storage of video information in a manner that enhances the availability and efficiency of advanced security applications and functionalities. This approach may therefore enable truly integrated security management solutions.

Figure 1A:
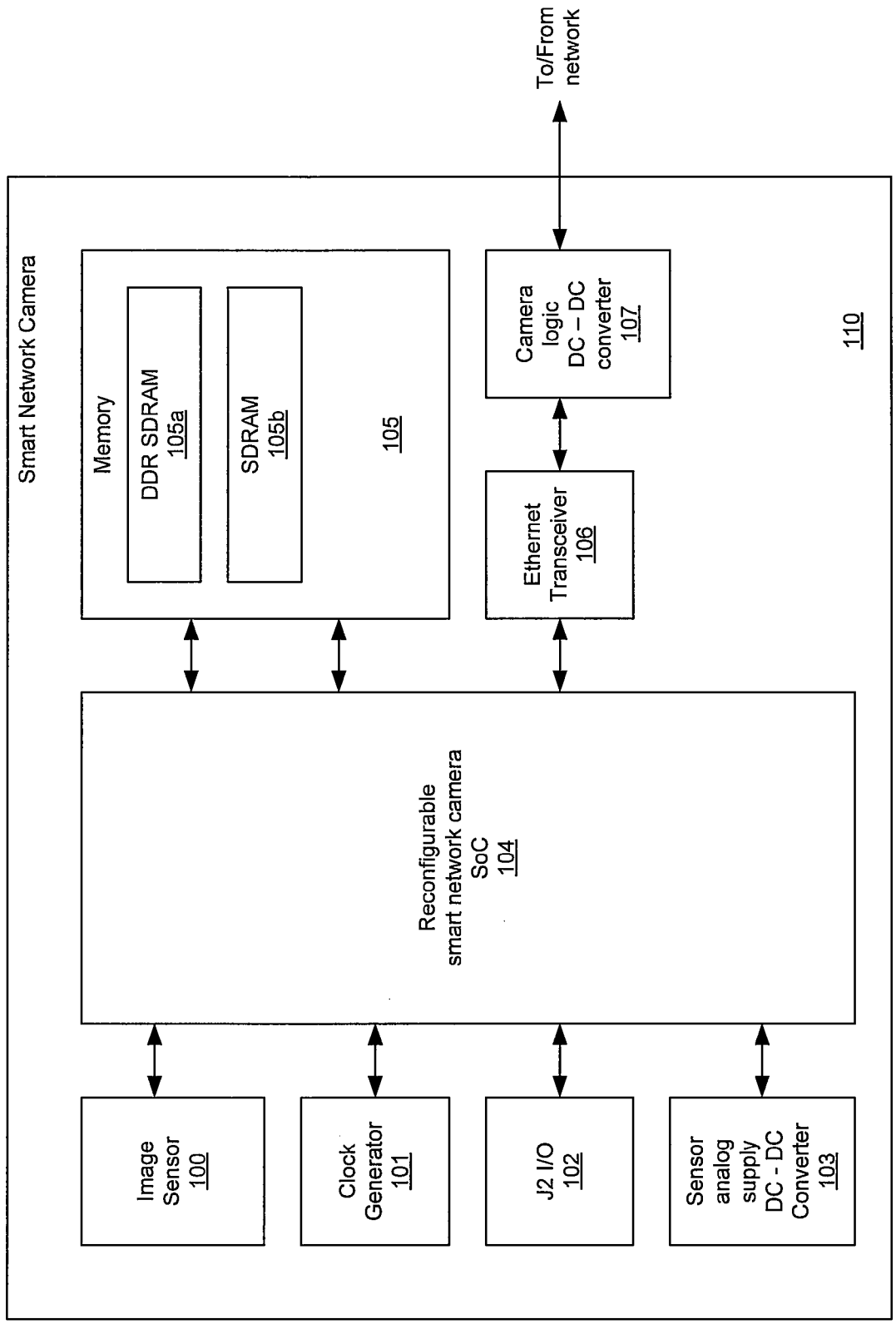
FIG. 1A illustrates a block diagram of a network camera architecture comprising reconfigurable smart network camera SoC, in accordance with an embodiment of the invention.

FIG. 1A illustrates a block diagram of a network camera architecture comprising reconfigurable smart network camera SoC, in accordance with an embodiment of the invention. Referring to FIG. 1A, the exemplary network architecture of the smart network camera 110 may comprise a reconfigurable smart network camera system-on-a-chip (SoC) 104, an image sensor 100, a clock generator 101, a J2 I/O 102, a sensor analog supply DC-DC converter 103, memory 105, an Ethernet transceiver 106, a camera logic DC-DC converter 107. The memory 105 may further comprise DDR SDRAM 105a and SDRAM 105b. The image sensor 100 may be a CCD, CMOS or any other similar device capable of converting an optical image into an electrical signal.

The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110.

The reconfigurable smart network camera SoC 104 may comprise suitable circuitry, logic and/or code and may be used to perform several stages of data processing, such as color processing, compression and/or content analysis. The Ethernet transceiver 106 provides an interface to transmit and receive data to and from other devices connected to a network, such as wired and/or wireless network. Other interfaces to transmit and receive data may also be used. The camera logic DC-DC converter 107 may comprise suitable circuitry, logic and/or code and may be used as a camera interface. In addition, the camera logic DC-DC converter 107 may be integrated with the Ethernet transceiver 106.

In operation, the image sensor 100 may capture an image and may transfer the image to the reconfigurable smart network camera SoC 104. The reconfigurable smart network camera SoC 104 may then perform several stages of data processing, such as color processing, compression and/or content analysis. The reconfigurable smart network camera SoC 104 may also interface with the memory module 105, which may allow for further image processing, for example by enabling the images to be buffered in the memory 105. Once the image data has been processed and analyzed within the reconfigurable smart network camera SoC 104, the data may be transmitted to a network via the Ethernet transceiver 106. In another embodiment, the reconfigurable smart network camera SoC 104 may also be used to receive data from other sources through the Ethernet transceiver 106. The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110.

Figure 1B:
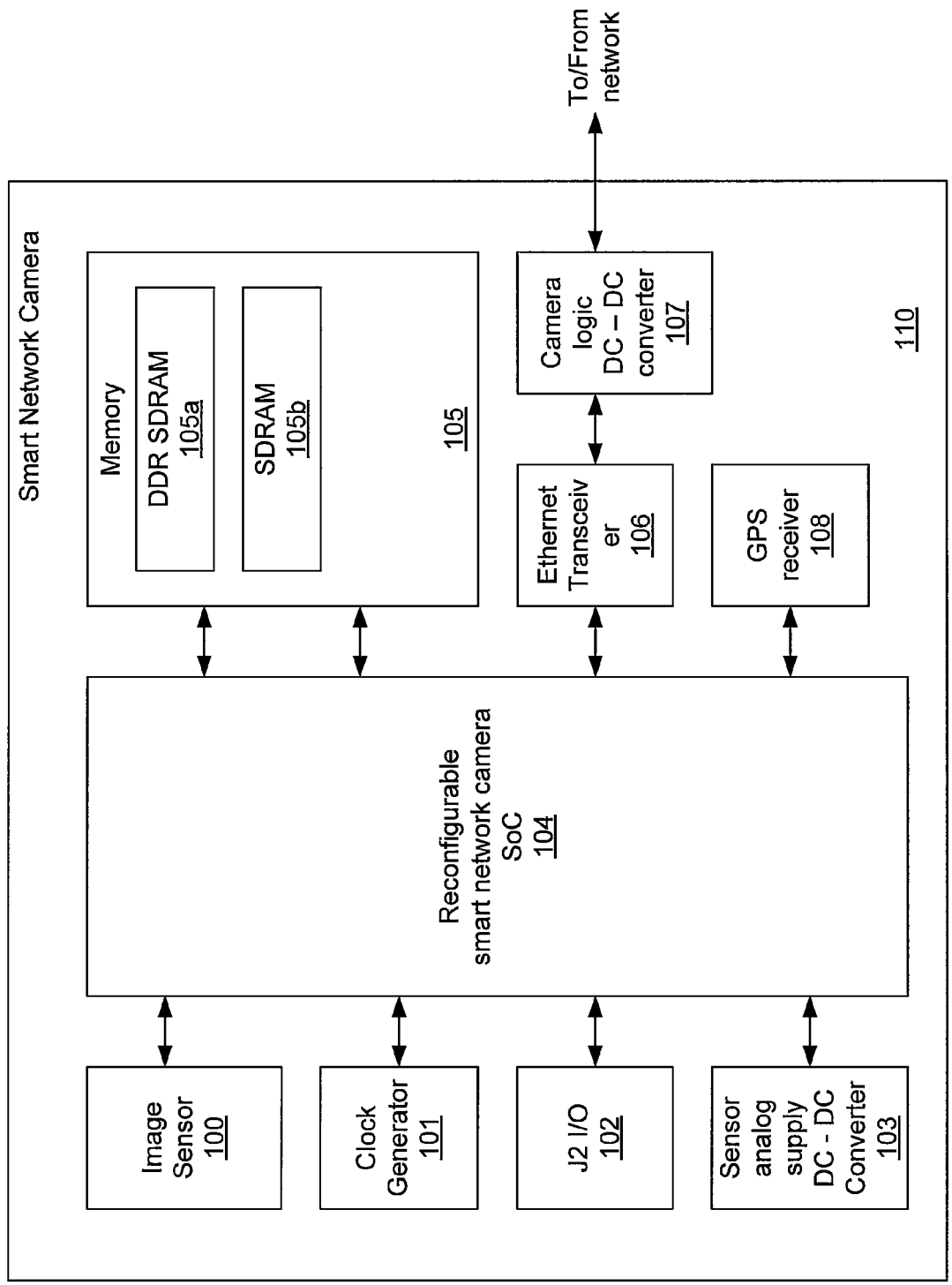
FIG. 1B illustrates a block diagram of network camera architecture comprising reconfigurable smart network camera SoC and a GPS receiver, in accordance with an embodiment of the invention.

FIG. 1B illustrates a block diagram of network camera architecture comprising reconfigurable smart network camera SoC and a GPS receiver, in accordance with an embodiment of the invention. Referring to FIG. 1B, the exemplary smart network camera 110 may comprise a reconfigurable smart network camera system-on-a-chip (SoC) 104, an image sensor 100, a clock generator 101, a J2 I/O 102, a sensor analog supply DC-DC converter 103, memory 105, an Ethernet transceiver 106, a camera logic DC-DC converter 107, and a GPS receiver 108. The memory 105 may further comprise DDR SDRAM 105a and SDRAM 105b. The image sensor 100 may be a CCD, CMOS or a similar device capable of converting an optical image into an electrical signal.

The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110.

The reconfigurable smart network camera SoC 104 may comprise suitable circuitry, logic and/or code and may be used to perform several stages of data processing, including but not limited to color processing, compression and content analysis. The Ethernet transceiver 106 may provide an interface to transmit and receive data to and from other devices connected to the network. Other interfaces to transmit and receive data may also be used. The camera logic DC-DC converter 107 may comprise suitable circuitry, logic and/or code and may be used as a camera interface. In addition, the camera logic DC-DC converter 107 may be integrated with the Ethernet transceiver 106. The GPS receiver 108 may provide geographical location data to the reconfigurable smart network camera SoC 104.

In operation, the image sensor 100 may capture an image and may transfer the image to the reconfigurable smart network camera SoC 104. The GPS receiver 108 may provide geographical location data to the reconfigurable smart network camera SoC 104. The reconfigurable smart network camera SoC 104 may then perform several stages of data processing, such color processing, compression and/or content analysis. In one embodiment, the reconfigurable smart network camera SoC 104 may use the geographical data provided by the GPS receiver 108 in a variety of ways, including embedding or appending information to images being acquired through the image sensor 100. This geographical data may be converted to a format, such as XML, and may then be embedded, appended or otherwise packaged with the images. Furthermore, the images and/or the geographical data may be transmitted to other smart network cameras to enable other cameras or devices to react or further process such information. The smart network camera 110 may also comprise additional modules (not illustrated in FIG. 1B), other than the GPS receiver 108 illustrated in FIG. 1B. The function of such modules may be to capture or generate data which may be embedded, appended or otherwise packaged with the images. Another example of such a module may be a distance measuring laser module. In instances when the smart network camera 110 includes a distance measuring laser module, once a target is acquired, the distance from the camera to the target may be embedded, appended or otherwise packaged with the image. These images and/or the data may then be transmitted to other cameras and/or devices for further processing and/or triggering actions or events.

The reconfigurable smart network camera SoC 104 may also interface with the memory module 105, which may allow for further image processing, for example by enabling the images to be buffered in the memory 105. Once the image data has been processed and analyzed within the reconfigurable smart network camera SoC 104, the data may be transmitted to a network via the Ethernet transceiver 106. In another embodiment of the invention, the reconfigurable smart network camera SoC 104 may also be used to receive data from other sources through the Ethernet transceiver 106. The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110.

Figure 1C:
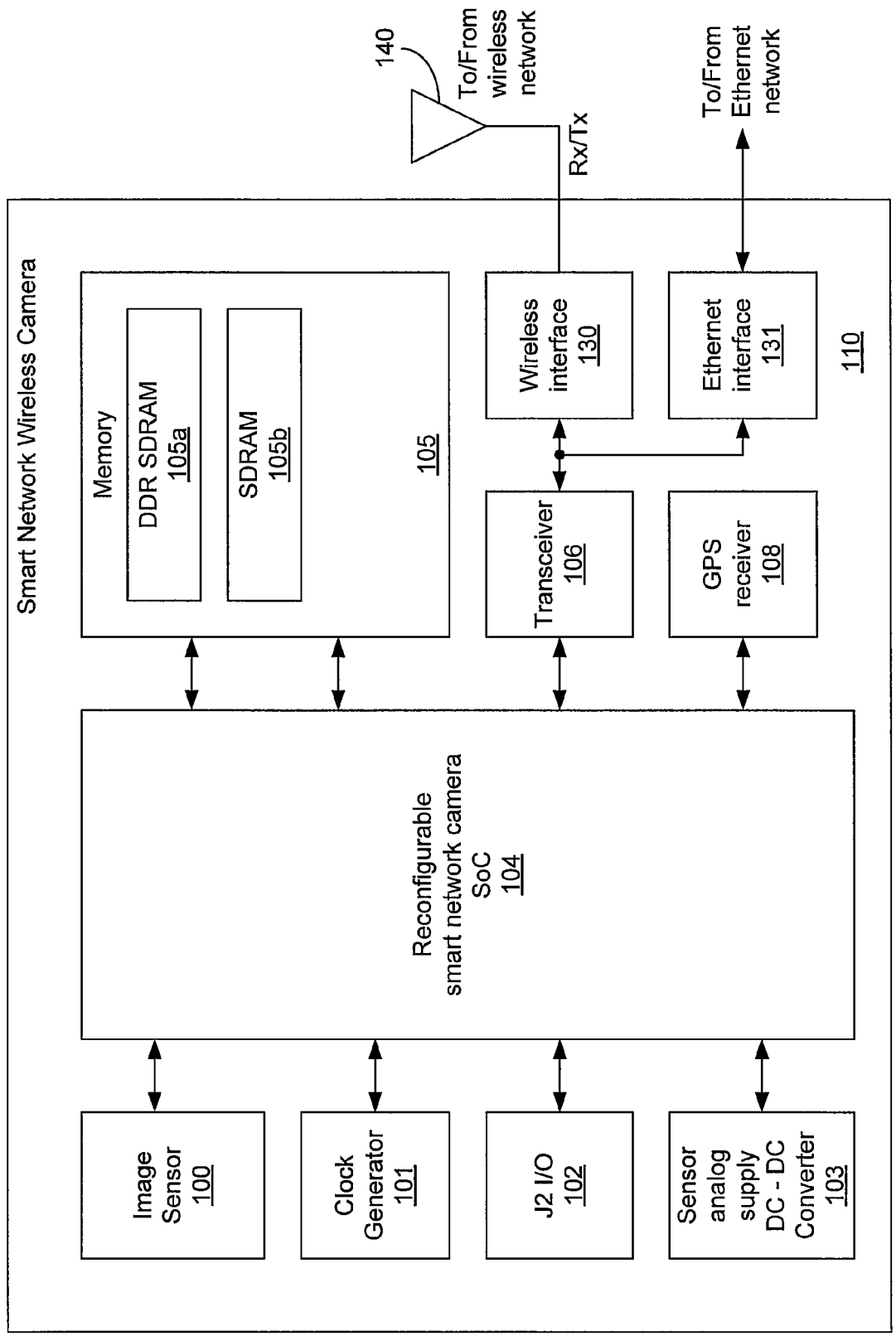
FIG. 1C illustrates a block diagram of a network wireless camera architecture comprising reconfigurable smart network camera SoC, in accordance with an embodiment of the invention.

FIG. 1C illustrates a block diagram of a network wireless camera architecture comprising reconfigurable smart network camera SoC, in accordance with an embodiment of the invention. Referring to FIG. 1C, the exemplary smart network camera 110 may comprise a reconfigurable smart network camera system-on-a-chip (SoC) 104, an image sensor 100, a clock generator 101, a J2 I/O 102, a sensor analog supply DC-DC converter 103, memory 105, a GPS receiver 108, a transceiver 106, wireless interface 130, a wireless antenna 140, and/or an Ethernet interface 131. The memory 105 may further comprise DDR SDRAM 105a and SDRAM 105b. The image sensor 100 may be a CCD, CMOS or a similar device capable of converting an optical image into an electrical signal.

The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110. The reconfigurable smart network camera SoC 104 may comprise suitable circuitry, logic and/or code and may be used to perform several stages of data processing, such as color processing, compression and/or content analysis. The Ethernet transceiver 106 may provide an interface to transmit and receive data to and from other devices connected to the network. Other interfaces to transmit and receive data may also be used. The camera logic DC-DC converter 107 may comprise suitable circuitry, logic and/or code and may be used as a camera interface. The GPS receiver 108 may provide geographical location data to the reconfigurable smart network camera SoC 104. The wireless interface 130 may comprise suitable circuitry, logic and/or code and may support more than one wireless protocol. For example, the protocol may be 802.11a, 802.11b, 802.11g, 802.11n, 802.16, Bluetooth, or any other wireless protocol. The wireless interface 130 may operate independently or in tandem with the Ethernet interface 131. The wireless interface 130 and the Ethernet interface 131 are each a channel of communication and by operating independently or in tandem, there may result at least three modes of transmission, such as a metadata mode, a video mode, and a metadata plus video mode. In the metadata mode, only the metadata may be sent/received without any video or image data. In the video mode of operation, only the image or video data may be sent without any metadata embedded, appended or otherwise packaged. In the metadata plus video mode, both the metadata and video may be transmitted simultaneously. The metadata may be in any format such as XML and may contain data acquired through a GPS receiver 108, data acquired through another module such as a distance measuring laser module, or any other data acquired or generated by the reconfigurable smart network camera SoC 104. For bandwidth management, the metadata/descriptors generated by the SoC 104 may be sent wirelessly by using Bluetooth, or similar wireless protocols, to other cameras to create an intelligent distributed camera network. By using the wireless connection 130 and the antenna 140, the camera 110 may send object tracking, face recognition or other information to nearby cameras to perform effective tracking of an object or person. The images and the metadata may also be sent via the Ethernet connection 131. However, direct transmission of metadata between cameras may improve the efficiency and speed with which the security network may react to an event without having to go first through a back end processing operation.

Figure 2A:
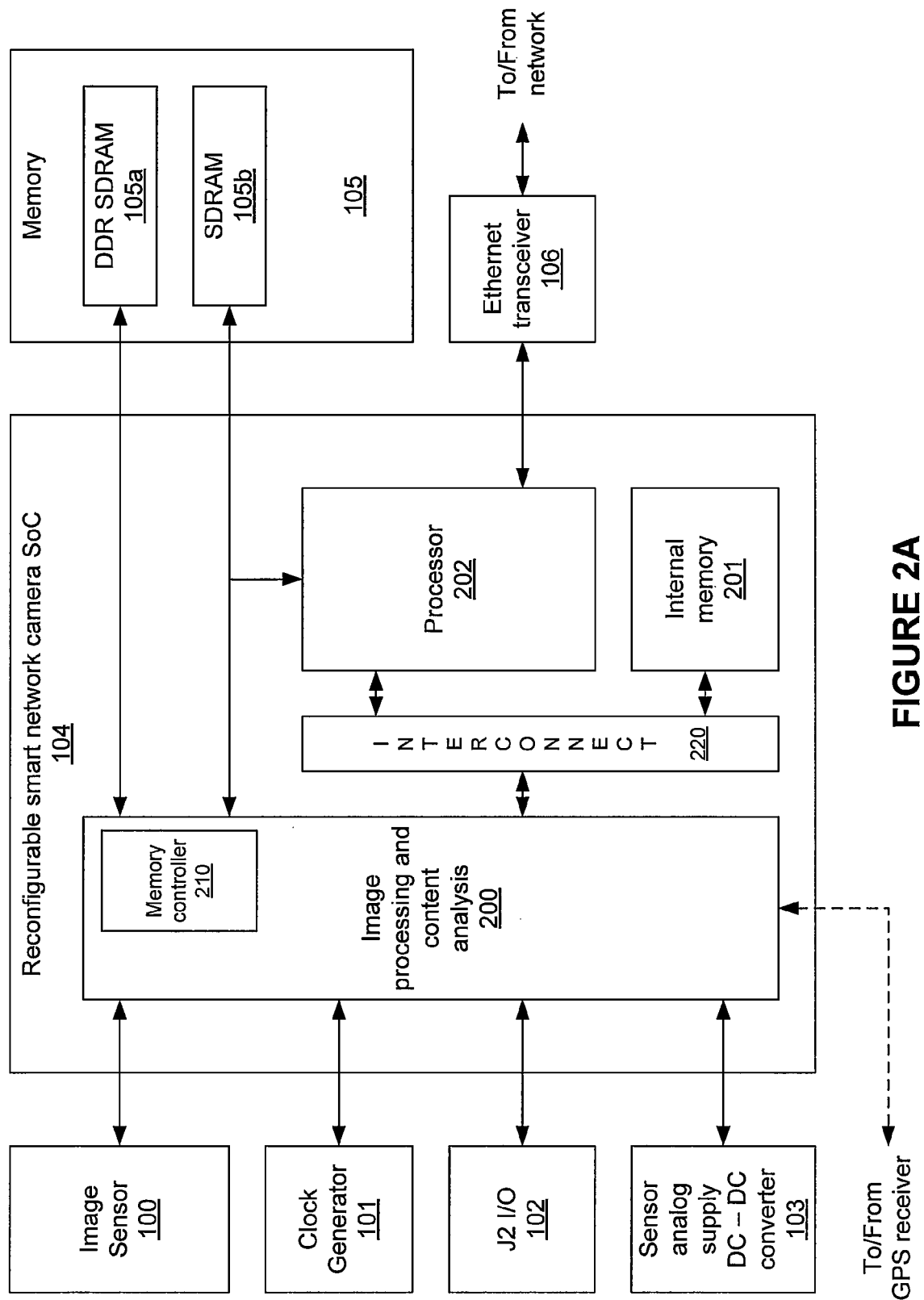
FIG. 2A illustrates a reconfigurable smart network camera SoC high-level block diagram, in accordance with an embodiment of the invention.

FIG. 2A illustrates a reconfigurable smart network camera SoC with an image processing and content analysis block, a processor, an interconnect block, and internal memory. Referring to FIG. 2A, the exemplary smart network camera may comprise a reconfigurable smart network camera system-on-a-chip (SoC) 104, an image sensor 100, a clock generator 101, a J2 I/O 102, a sensor analog supply DC-DC converter 103, memory 105, and an Ethernet transceiver 106. The memory 105 may further comprise DDR SDRAM 105a and SDRAM 105b. The reconfigurable smart network camera SoC 104 may further comprise an image processing and content analysis block 200, an interconnect block 220, a processor 202, and internal memory 201. The image processing and content analysis block 200 may further comprise a memory controller 210, which may serve as an interface to memory 105. The processor 202 may be implemented using, for example, a standard core, a soft core, a microcontroller, and/or a state machine that supports an instruction set. The processor 202 may be programmable through a software development kit (SDK). The processor 202 may be used to implement a digital signal processing (DSP) engine. The interconnect block 220 may be a multiple bus architecture that uses standard as well as custom busses.

The image sensor 100 may be a CCD, CMOS or a similar device capable of converting an optical image into an electrical signal. The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110. The reconfigurable smart network camera SoC 104 may comprise suitable circuitry, logic and/or code (and may be used to) to perform several stages of data processing, such as color processing, compression and/or content analysis. The Ethernet transceiver 106 may provide an interface to transmit and receive data to and from other devices connected to the network. Other interfaces to transmit and receive data may also be used. The image processing and content analysis block 200 may comprise suitable circuitry, logic and/or code and may be used to perform image processing and content analysis including but not limited to color processing, image content analysis and compression. The architecture, functionality, and operation of the image processing and content analysis block 200 are discussed in greater detail herein below.

In operation, the image sensor 100 may capture an image and may transfer the image to the image processing and content analysis block 200 within the reconfigurable smart network camera SoC 104. Once the image processing and content analysis block 200 receives raw image data from the image sensor 100, the image processing and content analysis block 200 may perform several stages of data processing, such as color processing, compression and content analysis. The memory controller 210 may interface directly with internal memory 201 or external memory 105 to buffer images for further processing. The interconnect bus 220 may transfer data between the various modules within the reconfigurable smart network camera SoC 104. For example, the processor 202 may interface with internal memory 201 or the image processing and content analysis block 200 via the interconnect bus 220. Similarly, the image processing and content analysis block 200 may send/receive data to/from the processor 202 or internal memory 201. Once the image data has been processed and analyzed within the reconfigurable smart network camera SoC 104, the data may be transmitted to a network via the Ethernet transceiver 106.

In another embodiment, the reconfigurable smart network camera SoC 104 may also be used to receive data from other sources through the Ethernet transceiver 106. The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110. Data from the reconfigurable smart network camera SoC 104 may be sent/received to/from any other module within the smart network camera 110. In one embodiment, the reconfigurable smart network camera SoC 104 may send/receive data to/from a GPS receiver 108. The reconfigurable smart network camera SoC 104 may also send/receive data to/from the network via the Ethernet transceiver 106. In another embodiment, the reconfigurable smart network camera SoC 104 may send/receive data from the network through a wireless connection any other means of network communication.

Figure 2B:
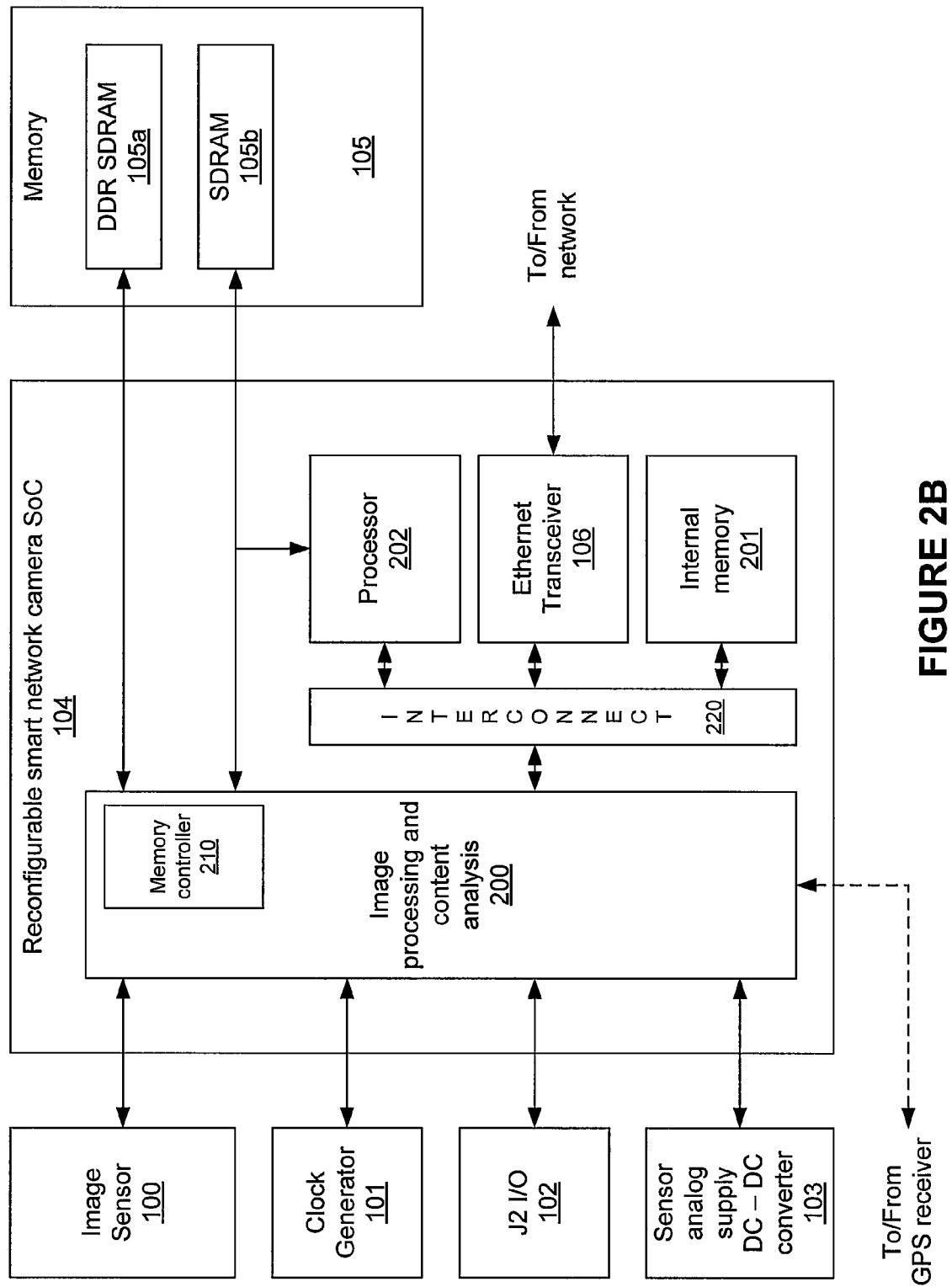
FIG. 2B illustrates a reconfigurable smart network camera SoC high-level block diagram with integrated Ethernet transceiver, in accordance with an embodiment of the invention.

FIG. 2B illustrates a reconfigurable smart network camera SoC high-level block diagram with integrated Ethernet transceiver, in accordance with an embodiment of the invention. Referring to FIG. 2B, the exemplary smart network camera 110 may comprise a reconfigurable smart network camera system-on-a-chip (SoC) 104, an image sensor 100, a clock generator 101, a J2 I/O 102, a sensor analog supply DC-DC converter 103, memory 105, and an integrated Ethernet transceiver 106. The memory 105 may further comprise DDR SDRAM 105a and SDRAM 105b. The reconfigurable smart network camera SoC 104 may further comprise an image processing and content analysis block 200, an interconnect block 220, a processor 202, and internal memory 201. The image processing and content analysis block 200 may further comprise a memory controller 210, which may serve as an interface to memory 105. The processor 202 may be implemented using a standard core, a soft core, a microcontroller, or a state machine that supports an instruction set. The processor 202 may be programmable through a software development kit (SDK), and may be used to implement a digital signal processing (DSP) engine. The interconnect block 220 may be a multiple bus architecture that uses standard as well as custom busses.

The image sensor 100 may be a CCD, CMOS or a similar device capable of converting an optical image into an electrical signal. The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110. The reconfigurable smart network camera SoC 104 may comprise suitable circuitry, logic and/or code and may be used to perform several stages of data processing, including but not limited to color processing, compression and content analysis. The integrated Ethernet transceiver 106 provides an interface to transmit and receive data to and from other devices connected to the network. Other interfaces to transmit and receive data may also be used. The image processing and content analysis block 200 may comprise suitable circuitry, logic and/or code and may be used to perform image processing and content analysis including but not limited to color processing, image content analysis and compression.

In operation, the image sensor 100 may capture an image and may transfer the image to the image processing and content analysis block 200 within the reconfigurable smart network camera SoC 104. Once the image processing and content analysis block 200 receives raw image data from the image sensor 100, the image processing and content analysis block 200 may perform several stages of data processing, such as color processing, compression and/or content analysis, for example. The memory controller 210 may interface directly with internal memory 201 or external memory 105 to buffer images for further processing. The interconnect bus 220 may transfer data between the various modules within the reconfigurable smart network camera SoC 104. For example, the processor 202 may interface with internal memory 201, the integrated Ethernet transceiver 106, or the image processing and content analysis block 200 via the interconnect bus 220. Similarly, the image processing and content analysis block 200 may send/receive data to/from the processor 202, integrated Ethernet transceiver 106, or internal memory 201. Once the image data has been processed and analyzed within the reconfigurable smart network camera SoC 104, the data may be transmitted to a network via the integrated Ethernet transceiver 106.

In another embodiment, the reconfigurable smart network camera SoC 104 may also be used to receive data from other sources through the integrated Ethernet transceiver 106. The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110. Data from the reconfigurable smart network camera SoC 104 may be sent/received to/from any other module within the smart network camera 110. In one embodiment, the reconfigurable smart network camera SoC 104 may send/receive data to/from a GPS receiver 108. The reconfigurable smart network camera SoC 104 may also send/receive data to/from the network via the integrated Ethernet transceiver 106. In another embodiment, the reconfigurable smart network camera SoC 104 may send/receive data from the network through a wireless connection any other means of network communication. In yet another embodiment of the invention, the Ethernet transceiver 106 may be external to the reconfigurable smart network camera SoC 104.

Figure 2C:
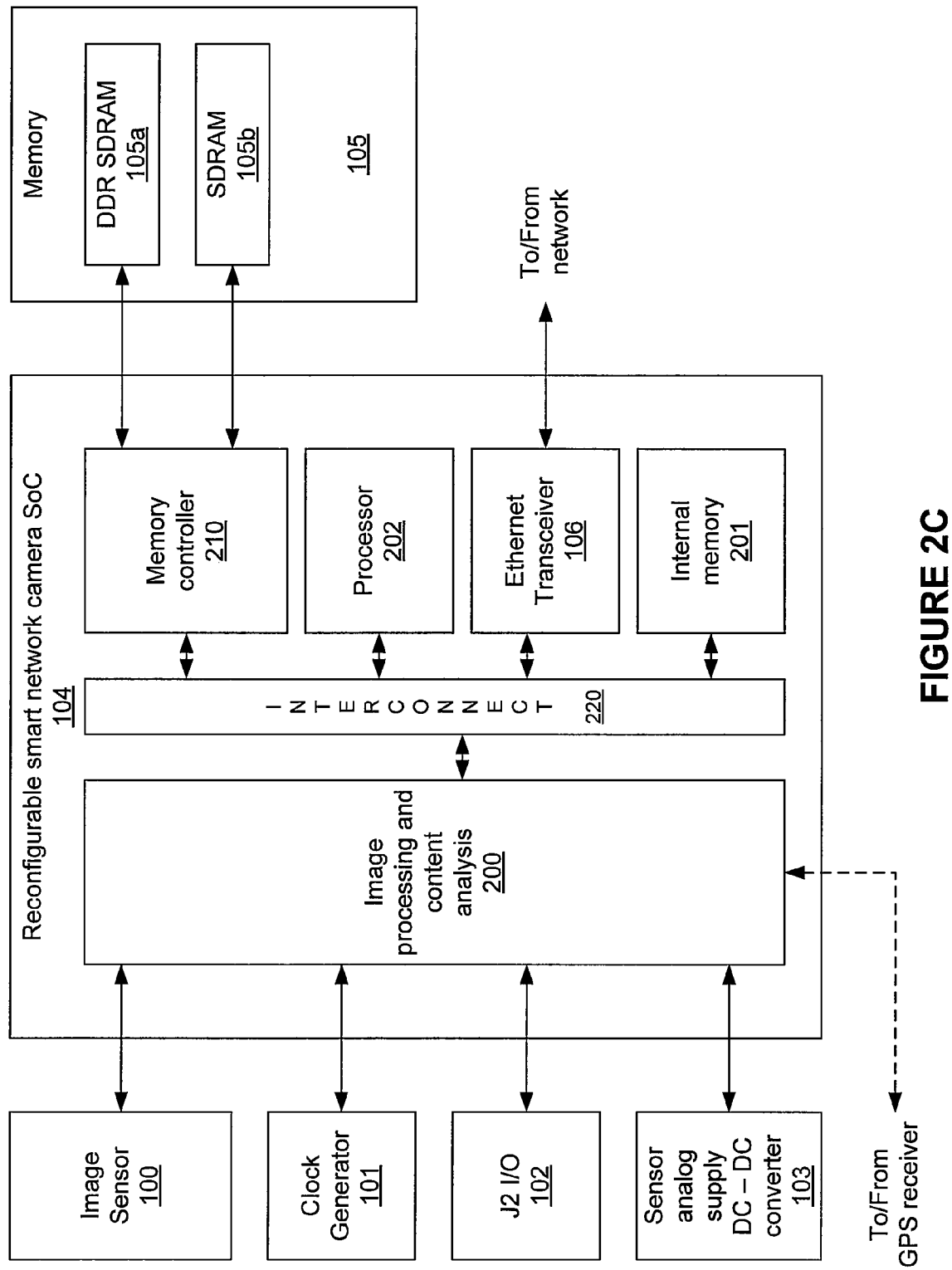
FIG. 2C illustrates a reconfigurable smart network camera SoC high-level block diagram with integrated Ethernet transceiver and memory controller block, in accordance with an embodiment of the invention.

FIG. 2C illustrates a reconfigurable smart network camera SoC high-level block diagram with integrated Ethernet transceiver and memory controller block, in accordance with an embodiment of the invention. Referring to FIG. 2C, the exemplary smart network camera 110 may comprise a reconfigurable smart network camera system-on-a-chip (SoC) 104, an image sensor 100, a clock generator 101, a J2 I/O 102, a sensor analog supply DC-DC converter 103, and memory 105. The memory 105 may further comprise DDR SDRAM 105a and SDRAM 105b. The reconfigurable smart network camera SoC 104 may further comprise an image processing and content analysis block 200, an interconnect block 220, a memory controller 210, a processor 202, an Ethernet transceiver, and internal memory 201. The memory controller 210 may serve as an interface to memory 105. In another embodiment, the memory controller 210 may be integrated with the image processing and content analysis block 200. The processor 202 may be implemented using a standard core, a soft core, a microcontroller, or a state machine that supports an instruction set. The processor 202 may be programmable through a software development kit (SDK) and may be used to implement a digital signal processing (DSP) engine. The interconnect block 220 may be a multiple bus architecture that may use standard, as well as custom, busses. The image sensor 100 may be a CCD, CMOS or a similar device capable of converting an optical image into an electrical signal. The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110. The reconfigurable smart network camera SoC 104 may comprise suitable circuitry, logic and/or code (and may be used to) to perform several stages of data processing, including but not limited to color processing, compression and content analysis. The integrated Ethernet transceiver 106 provides an interface to transmit and receive data to and from other devices connected to the network. Other interfaces to transmit and receive data may also be used. The image processing and content analysis block 200 may comprise suitable circuitry, logic and/or code and may be used to perform image processing and content analysis including but not limited to color processing, image content analysis and compression.

In operation, the image sensor 100 may capture an image and may transfer the image to the image processing and content analysis block 200 within the reconfigurable smart network camera SoC 104. Once the image processing and content analysis block 200 receives raw image data from the image sensor 100, the image processing and content analysis block 200 may perform several stages of data processing, such as color processing, compression and/or content analysis, for example. The memory controller 210 may interface with internal memory 201 via the interconnect bus 220 or external memory 105 to buffer images for further processing. The interconnect bus 220 may transfer data between the various modules within the reconfigurable smart network camera SoC 104. For example, the processor 202 may interface, via the interconnect bus 220, with the image processing and content analysis module 200, the memory controller 210, the integrated Ethernet transceiver 106, or the internal memory. Similarly, the image processing and content analysis block 200 may send/receive data to/from the memory controller 210, the processor 202, the integrated Ethernet transceiver 106, or the internal memory 201. Once the image data has been processed and analyzed within the reconfigurable smart network camera SoC 104, the data may be transmitted to a network via the integrated Ethernet transceiver 106.

In another embodiment of the invention, the reconfigurable smart network camera SoC 104 may also be used to receive data from other sources through the integrated Ethernet transceiver 106. The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110. Data from the reconfigurable smart network camera SoC 104 may be sent/received to/from any other module within the smart network camera 110. In one embodiment of the invention, the reconfigurable smart network camera SoC 104 may send/receive data to/from a GPS receiver 108. The reconfigurable smart network camera SoC 104 may also send/receive data to/from the network via the integrated Ethernet transceiver 106. In another embodiment of the invention, the reconfigurable smart network camera SoC 104 may send/receive data from the network through a wireless connection any other means of network communication. In yet another embodiment of the invention, the Ethernet transceiver 106 may be external to the reconfigurable smart network camera SoC 104.

Figure 2D:
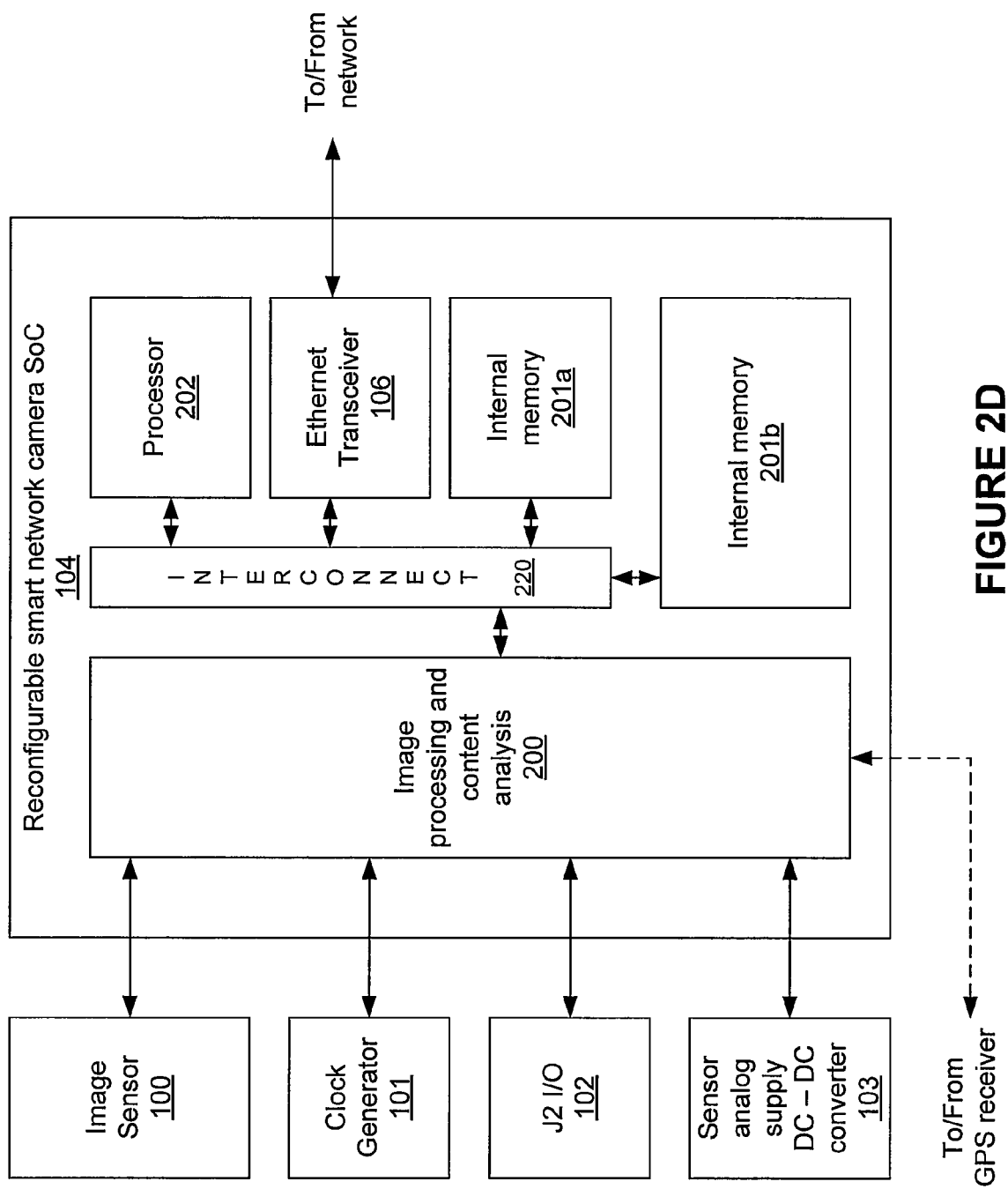
FIG. 2D illustrates a reconfigurable smart network camera SoC high-level block diagram with additional integrated memory.

FIG. 2D illustrates a reconfigurable smart network camera SoC high-level block diagram with additional integrated memory. Referring to FIG. 2D, the exemplary smart network camera 110 may comprise a reconfigurable smart network camera system-on-a-chip (SoC) 104, an image sensor 100, a clock generator 101, a J2 I/O 102, and a sensor analog supply DC-DC converter 103. The reconfigurable smart network camera SoC 104 may further comprise an image processing and content analysis block 200, an interconnect block 220, a processor 202, an integrated Ethernet transceiver 106, and multiple internal memory modules for example 201*a* and 201*b*. These internal memory modules 201*a* and 201*b* illustrate a complete integration of the reconfigurable smart network camera SoC 104 such that no external memory may be required for buffering images for image processing.

The processor 202 may be implemented using a standard core, a soft core, a microcontroller, or a state machine that supports an instruction set. The processor 202 may be programmable through a software development kit (SDK) and may be used to implement a digital signal processing (DSP) engine. The interconnect block 220 may be a multiple bus architecture that may use standard as well as custom busses. The image sensor 100 may be a CCD, CMOS or a similar device capable of converting an optical image into an electrical signal. The clock generator 101 may comprise any circuit or device capable of synchronizing the operation of the various modules within the smart network camera 110. The J2 I/O 102 may comprise suitable circuitry, logic and/or code and may be used as an input/output to the reconfigurable smart network camera SoC 104. The J2 I/O 102 may carry any type of input or output to or from the reconfigurable smart network camera SoC 104. The sensor analog supply DC-DC converter 103 may comprise suitable circuitry, logic and/or code and may serve as a voltage supply to the various modules within the smart network camera 110. The reconfigurable smart network camera SoC 104 may comprise suitable circuitry, logic and/or code and may be used to perform several stages of data processing, such as color processing, compression and/or content analysis. The integrated Ethernet transceiver 106 provides an interface to transmit and receive data to and from other devices connected to the network. Other interfaces to transmit and receive data may also be used. The image processing and content analysis block 200 may comprise suitable circuitry, logic and/or code and may be used to perform image processing and content analysis including but not limited to color processing, image content analysis and compression.

In operation, the image sensor 100 may capture an image and may transfer the image to the image processing and content analysis block 200 within the reconfigurable smart network camera SoC 104. Once the image processing and content analysis block 200 receives raw image data from the image sensor 100, the image processing and content analysis block 200 may perform several stages of data processing, such as color processing, compression and/or content analysis. The interconnect bus 220 may transfer data between the various modules within the reconfigurable smart network camera SoC 104. For example, the processor 202 may interface, via the interconnect bus 220, with the image processing and content analysis module 200, the integrated Ethernet transceiver 106, or any of the internal memory modules such as 201*a* and/or 201*b*. Similarly, the image processing and content analysis block 200 may send/receive data to/from the processor 202, the integrated Ethernet transceiver 106, or any of the internal memory modules such as 201*a* and/or 201*b*. Once the image data has been processed and analyzed within the reconfigurable smart network camera SoC 104, the data may be transmitted to a network via the integrated Ethernet transceiver 106. In another embodiment, the reconfigurable smart network camera SoC 104 may also be used to receive data from other sources through the integrated Ethernet transceiver 106.

The clock generator 101 may be used to synchronize the reconfigurable smart network camera SoC 104 with various other modules within the smart network camera 110. The J2 I/O 102 may be used to carry any type of input or output to or from the reconfigurable smart network camera SoC 104. The sensor analog supply DC-DC converter 103 may be used to supply voltage to the various modules within the smart network camera 110. Data from the reconfigurable smart network camera SoC 104 may be sent/received to/from any other module within the smart network camera 110. In one embodiment of the invention, the reconfigurable smart network camera SoC 104 may send/receive data to/from a GPS receiver 108. The reconfigurable smart network camera SoC 104 may also send/receive data to/from the network via the integrated Ethernet transceiver 106. In another embodiment of the invention, the reconfigurable smart network camera SoC 104 may send/receive data from the network through a wireless connection any other means of network communication. In yet another embodiment of the invention, the Ethernet transceiver 106 may be external to the reconfigurable smart network camera SoC 104.

Figure 3A:
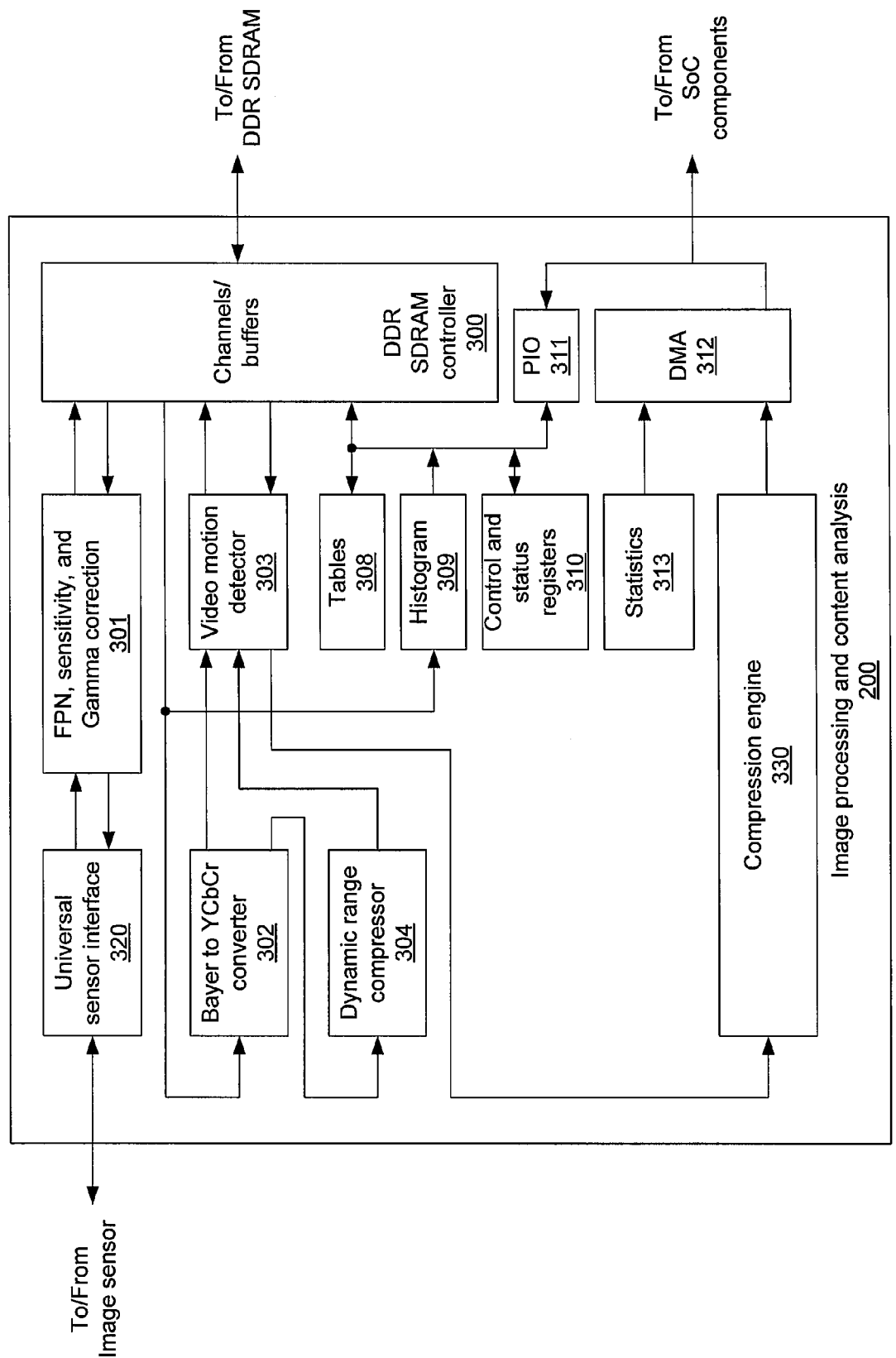
FIG. 3A illustrates an image processing and content analysis block functional diagram with compression engine, in accordance with an embodiment of the invention.

FIG. 3A illustrates an image processing and content analysis block functional diagram with compression engine, in accordance with an embodiment of the invention. Referring to FIG. 3A, the exemplary image processing and content analysis block 200 may comprise a universal sensor interface 320, an FPN, sensitivity and Gamma correction module 301, a Bayer to YCbCr converter 302, a dynamic range compressor 304, a video motion detector 303, a tables module 308, a histogram 309, control and status registers 310, a statistics module 313, a channels/buffers module with an integrated DDR SDRAM controller 300, a PIO 311, a DMA 312, and a compression engine 330. This image processing and content analysis block 200 may be conceptually segmented into three major subsystems: a DDR SDRAM memory controller 300, an image processing and compression chain 301, 302, 303, 304, 308, 309, 310, 313, and 330, and a system interface subsystem 320, 300, 311, 312.

Image processing and compression chain subsystem 301, 302, 303, 304, 308, 309, 310, 313, and 330 may comprise an FPN, sensitivity and Gamma correction module 301, a Bayer to YCbCr converter 302, a dynamic range compressor 304, a video motion detector 303, a tables module 308, a histogram module 309, control and status registers 310, a statistics module 313 and a compression engine 330. The system interface subsystem may comprise the universal sensor interface 320, the DDR SDRAM controller 300, the PIO 311, and the DMA 312.

The universal sensor interface 320 may comprise suitable circuitry, logic and/or code and may be used as an interface to an image sensor 100 which may be a CCD, CMOS or a similar device capable of converting an optical image into an electrical signal. The FPN, sensitivity, and Gamma correction module 301 performs image processing such as Fixed Pattern Noise, sensitivity and Gamma correction. The architecture, functionality, and operation of the FPN, sensitivity, and Gamma correction module 301 are discussed in greater detail herein below. The Bayer to YCbCr converter module 302 converts data from a Bayer format to an YCbCr format. The architecture, functionality, and operation of the Bayer to YCbCr converter module is discussed in greater detail herein below. The video motion detector module 303 performs image processing for detecting objects in motion within the incoming image. The video motion detector module 303 may also perform image processing for detecting the background of an image. The architecture, functionality, and operation of the video motion detector 303 are discussed in greater detail herein below.

The dynamic range compressor module 304 performs various operations on the incoming Y and CbCr signals to deliver compressed Y and CrCb. The tables module 308 renders and/or creates graphs based upon the data received from the histogram module 309. The histogram module 309 may contain histograms of images once they have been corrected and/or processed by the FPN, sensitivity, and Gamma correction module 301. These histograms may provide information regarding the levels of illumination and exposure within an image. The control and status registers 310 may control the operation of, and maintain the status of the various modules within the image processing and content analysis block 200. The statistics module 313 may contain data required to generate various descriptors or metadata regarding the image content being processed by the image processing and content analysis block 200. The compression engine 330 performs image compression and may output compressed image data. For example, in one embodiment of the invention, the image compression engine 330 may provide JPEG data. In another embodiment of the invention, the image compression engine 330 may output MPEG-4 data, or any other form of compressed image data. The channels/buffers with an integrated DDR SDRAM controller module 300 may be used to buffer data within the image processing and content analysis block 200. The channels/buffers with an integrated DDR SDRAM controller module 300 may also be used to buffer data sent/received to/from the DDR SDRAM. The PIO module 311 is a programmable I/O module capable of displaying a histogram within an image. The DMA module 312 may accept input from a variety of modules. As illustrated in the figures, the DMA module 312 may accept input data from the statistics module 313 and/or the compression engine 330. The DMA module may then transfer data to the PIO module 311 or may send/receive data to/from other SoC components for example, the Ethernet transceiver 106.

In operation, the universal sensor interface 320 may acquire an image and then may transfer the image to the FPN, sensitivity and Gamma correction module 301. The FPN, sensitivity and Gamma correction module 301 may perform image color correction and image processing, such as Fixed Pattern Noise, sensitivity and Gamma correction. In order to calculate the Fixed Pattern Noise, sensitivity and other parameters, the FPN, sensitivity and Gamma correction module 301 transfers the image data received from the universal sensor interface 320 to the channels/buffers module 300. The channels/buffers module 300 may transfer the data directly to the Bayer to YCbCr converter 302 as well as the video motion detector 303. The channels/buffers module 300 may transfer the image to the Bayer to YCbCr converter module 302 for further processing such as converting data from Bayer to YCbCr format. The channels/buffers module 300 may also transfer the image to the video motion detector 303 for purposes of image processing to isolate various objects in an image from the background of the image. The video motion detector 303 may receive data from other input modules. As illustrated in this embodiment, the video motion detector module may receive inputs from the Bayer to YCbCr converter module 302 and/or the dynamic range compressor module 304.

The video motion detector module 303 then transfers the image to the compression engine 330. The corrected image is transferred from the FPN, sensitivity, and Gamma correction module to the histogram 309. The tables 308, histogram 309, control and status registers 310, and the statistics 313 modules may operate in parallel with the video motion detector 303. The video motion detector 303, the tables module 308, the histogram 309, control and status registers 310, and the statistics module 313 each perform various aspects of image processing and content analysis. For example, collectively, the video motion detector 303, the tables module 308, the histogram 309, control and status registers 310, and the statistics module 313 perform feature extraction. Feature extraction may comprise analyzing incoming video data and performing analysis of objects in order to extract various features of these objects, including but not limited to the shape, color and/or the motion vector of the objects. The video metadata may comprise timestamp, object detection, object size, object dominant color, object motion description, description of object clusters, skin detection, and/or face detection. The tables 308 and control and status registers 310 may be used for operation of the image processing and content analysis block. The histogram 309 and statistics 313 may be used for generating descriptors or metadata information from the video content. Moreover, information generated by the video motion detector 303 may also be used to generate descriptors and/or metadata.

The descriptors may include motion detection, object detection, object tracking, color information, cluster information, background information, skin detection, and/or face detection. The descriptors or metadata generated may be sent to the processor 202 for embedding or appending to the JPEG compressed video. The processor 202 may also send the descriptors to the network separate from their respective compressed video. The descriptors may then be used to facilitate applications, such as data mining applications. The FPN, sensitivity, and Gamma correction module 301, the Bayer to YCbCr Converter module 302, and the dynamic range compressor module 304 each perform various aspects of color processing. The tables module 308 renders/creates graphs based upon the histogram data received from the histogram module 309. The histogram module 309 may transfer the histogram data to the PIO module 311 which may display a histogram within or superimposed over an image. The dynamic range compressor 304 may perform image compression in order to ensure that the entire dynamic range is captured by devices which would be otherwise incapable of handling the dynamic range.

The control and status registers module 310 may be used to control various registers and to display the status of these registers as well. For example, the control and status registers module 310 may control and display the status of the registers within the universal sensor interface 320. The control registers 310 may also be used to enable or disable various modules within the image processing and content analysis block 200. For example, the control and status registers module 310 may enable or disable the dynamic range compressor 304. The statistics module 313 may interface directly with the DMA 312. The DMA 312 may also receive compressed data from the compression engine 330, and may then transfer the data from the statistics module 313 and/or the compression engine 330 to the PIO 311 or to other components within the reconfigurable smart network camera SoC 104. The DMA 312 may also receive data from other modules within the reconfigurable smart network camera SoC 104. The DMA controller 312 in the camera processor may comprise two external channels, which may be used by the imaging processing and content analysis to transfer data directly to the SDRAM memory. Channel 0 may be used for JPEG compressed images, and channel 1 may be used for statistics data transfers, for example.

Figure 3B:
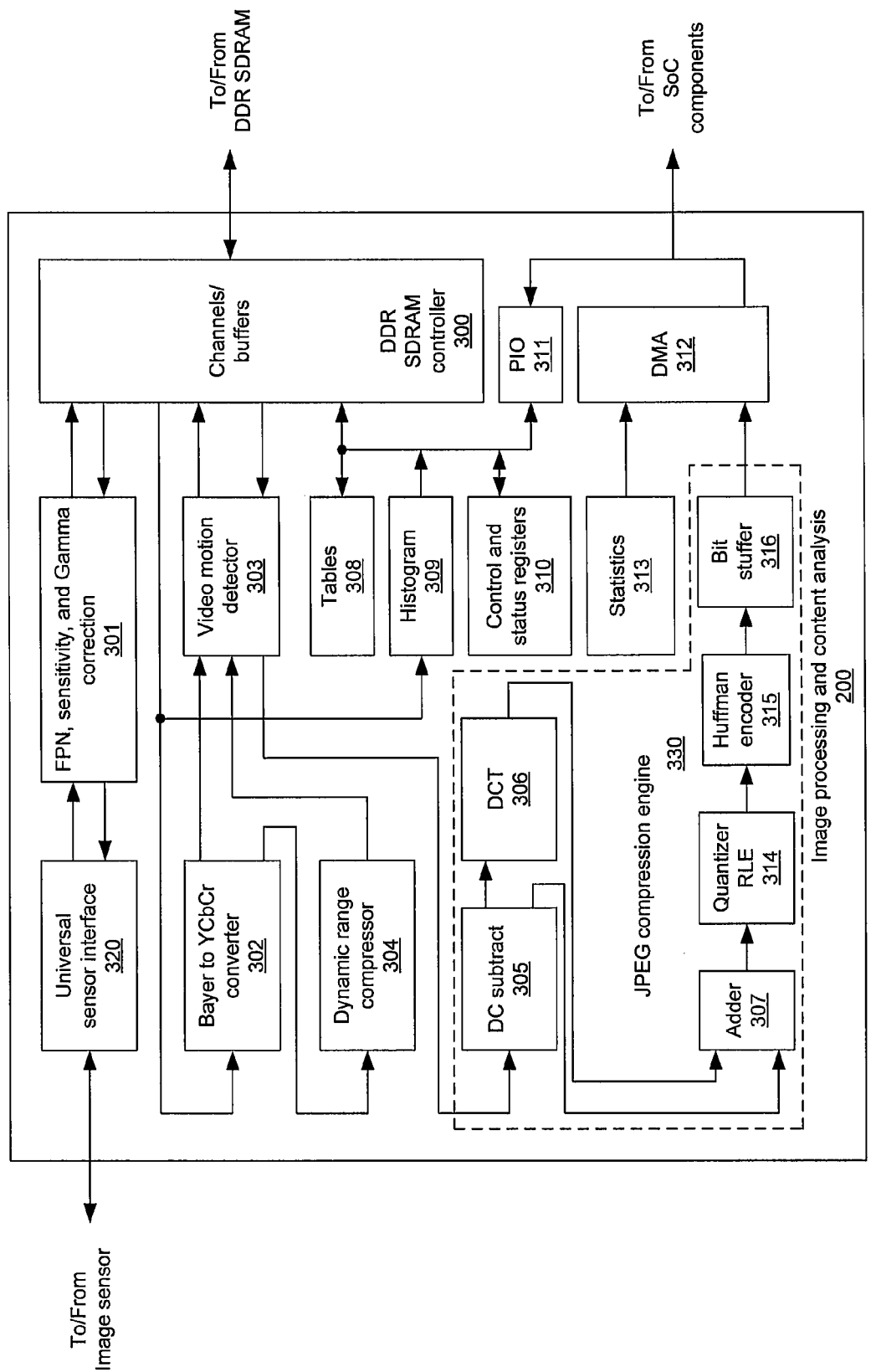
FIG. 3B illustrates an image processing and content analysis block functional diagram with JPEG compression engine, in accordance with an embodiment of the invention.

FIG. 3B illustrates an image processing and content analysis block functional diagram with JPEG compression engine, in accordance with an embodiment of the invention. Referring to FIG. 3B, the exemplary image processing and content analysis block 200 may comprise a universal sensor interface 320, an FPN, sensitivity and Gamma correction module 301, a Bayer to YCbCr converter 302, a dynamic range compressor 304, a video motion detector 303, a tables module 308, a histogram 309, control and status registers 310, a statistics module 313, a channels/buffers module with an integrated DDR SDRAM controller 300, a PIO 311, a DMA 312, and a JPEG compression engine 330. The JPEG compression engine 330 may further comprise a DC subtract module 305, a (discrete cosine transformation (DCT) module 306, an adder 307, a quantizer RLE 314, a Huffman encoder 315, and a bit stuffer 316. The image processing and content analysis block 200 may be conceptually divided into three major subsystems: a DDR SDRAM memory controller 300, an image processing and compression chain 301, 302, 303, 304, 308, 309, 310, 313, and 330, and a system interface subsystem 320, 300, 311, 312. The system interface subsystem may comprise the universal sensor interface 320, the DDR SDRAM controller 300, the PIO 311, and the DMA 312. The image processing and compression chain subsystem 301, 302, 303, 304, 308, 309, 310, 313, and 330 may comprise an FPN, sensitivity and Gamma correction module 301, a Bayer to YCbCr converter 302, a dynamic range compressor 304, a video motion detector 303, a tables module 308, a histogram module 309, control and status registers 310, a statistics module 313, and a JPEG compression engine 330. The JPEG compression engine 330 may further comprise a DC subtract 305 module, a DCT module 306, an adder 307, a quantizer RLE 314, a Huffman encoder 315, and a bit stuffer 316.

The universal sensor interface 320 may comprise suitable circuitry, logic and/or code and may be used as an interface to an image sensor 100 which may be a CCD, CMOS or a similar device capable of converting an optical image into an electrical signal. The FPN, sensitivity, and Gamma correction module 301 may perform image processing, such as Fixed Pattern Noise, sensitivity and/or Gamma correction. The Bayer to YCbCr converter module 302 converts data from a Bayer format to a YCbCr format. The video motion detector module 303 may perform image processing for detecting objects in motion within the incoming image. The video motion detector module 303 may also perform image processing for detecting the background of an image. The dynamic range compressor module 304 may perform various operations on the incoming Y and CbCr signals to deliver compressed Y and CrCb. The tables module 308 renders and/or creates graphs based upon the data received from the histogram module 309. The histogram module 309 may contain histograms of images once they have been corrected and/or processed by the FPN, sensitivity, and Gamma correction module 301. The histograms may provide information regarding the levels of illumination and exposure within an image. The control and status registers 310 may control the operation of, and maintain the status of the various modules within the image processing and content analysis block 200.

The statistics module 313 may contain data required to generate various descriptors or metadata regarding the image content being processed by the image processing and content analysis block 200. The compression engine 330 may perform image compression and may output compressed image data. For example, in one embodiment of the invention, the image compression engine 330 may provide JPEG data. In another embodiment of the invention, the image compression engine 330 may output MPEG-4 data, or any other form of compressed image data. The channels/buffers with an integrated DDR SDRAM controller module 300 may be used to buffer data within the image processing and content analysis block 200. The channels/buffers with an integrated DDR SDRAM controller module 300 may also be used to buffer data sent/received to/from the DDR SDRAM. The PIO module 311 is a programmable I/O module capable of displaying a histogram within an image. The DMA module 312 may accept input from a variety of modules. As illustrated in the figures, the DMA module 312 may accept input data from the statistics module 313 and/or the compression engine 330. The DMA module may then transfer data to the PIO module 311 or may send/receive data to/from other SoC components for example, the Ethernet transceiver 106.

In operation, the universal sensor interface 320 may acquire the image and may transfer the image to the FPN, sensitivity and Gamma correction module 301. The FPN, sensitivity and Gamma correction module 301 may perform image color correction and image processing, such as Fixed Pattern Noise, sensitivity and Gamma correction. In order to calculate the Fixed Pattern Noise, sensitivity and other parameters, the FPN, sensitivity and Gamma correction module 301 may transfer the image data received from the universal sensor interface 320 to the channels/buffers module 300. The channels/buffers module 300 may transfer the data directly to the Bayer to YCbCr converter 302, as well as the video motion detector 303. The channels/buffers module 300 may transfer the image to the Bayer to YCbCr converter module 302 for further processing, such as converting data from Bayer to YCbCr format. The channels/buffers module 300 may also transfer the image to the video motion detector 303 for purposes of image processing to isolate various objects in an image from the background of the image. The video motion detector 303 may receive data from other input modules. As illustrated in the figures, the video motion detector module may receive inputs from the Bayer to YCbCr converter module 302 and/or the dynamic range compressor module 304. The video motion detector module 303 then transfers the image to the compression engine 330. The corrected image is transferred from the FPN, sensitivity, and Gamma correction module to the histogram 309.

The tables 308, histogram 309, control and status registers 310, and the statistics 313 modules may operate in parallel with the video motion detector 303. The video motion detector 303, the tables module 308, the histogram 309, control and status registers 310, and the statistics module 313 each perform various aspects of image processing and content analysis. For example, collectively, the video motion detector 303, the tables module 308, the histogram 309, control and status registers 310, and the statistics module 313 perform feature extraction. Feature extraction may comprise analyzing incoming video data and performing analysis of objects in order to extract various features of these objects including but not limited to the shape, color and/or the motion vector of the objects. The architecture, functionality, and operation of these modules is discussed in greater detail herein below. The tables 308 and control and status registers 310 may be used for operation of the image processing and content analysis block. The histogram 309 and statistics 313 may be used for generating descriptors or metadata information from the video content. Moreover, information generated by the video motion detector 303 may also be used to generate descriptors and/or metadata.

The descriptors may include motion detection, object detection, object tracking, color information, cluster information, background information, skin detection, and/or face detection. The descriptors or metadata generated may be sent to the processor 202 for embedding or appending to the JPEG compressed video. The processor 202 may also send the descriptors to the network separate from their respective compressed video. The descriptors may then be used to facilitate applications, such as data mining applications.

The FPN, sensitivity, and Gamma correction module 301, the Bayer to YCbCr Converter module 302, and the dynamic range compressor module 304 may each perform various aspects of color processing. The tables module 308 may render/create graphs based upon the histogram data received from the histogram module 309. The histogram module 309 may transfer the histogram data to the PIO module 311, which may display a histogram within or superimposed over an image. The dynamic range compressor 304 may perform image compression in order to ensure that the entire dynamic range is captured by devices which would be otherwise incapable of handling the dynamic range. The control and status registers module 310 may be used to control various registers and to display the status of these registers as well. For example, the control and status registers module 310 may control and display the status of the registers within the universal sensor interface 320. The control registers 310 may also be used to enable or disable various modules within the image processing and content analysis block 200. For example, the control and status registers module 310 may enable or disable the dynamic range compressor 304. The statistics module 313 may interface directly with the DMA 312 and may also receive compressed data from the compression engine 330. The DMA 312 may then transfer the data from the statistics module 313 and/or the compression engine 330 to the PIO 311 or to other components within the reconfigurable smart network camera SoC 104. The DMA 312 may also receive data from other modules within the reconfigurable smart network camera SoC 104. The DMA controller 312 in the camera processor may comprise two external channels, which may be used by the imaging processing and content analysis to transfer data directly to the SDRAM memory. Channel 0 may be used for JPEG compressed images, and channel 1 may be used for statistics data transfers.

Figure 3C:
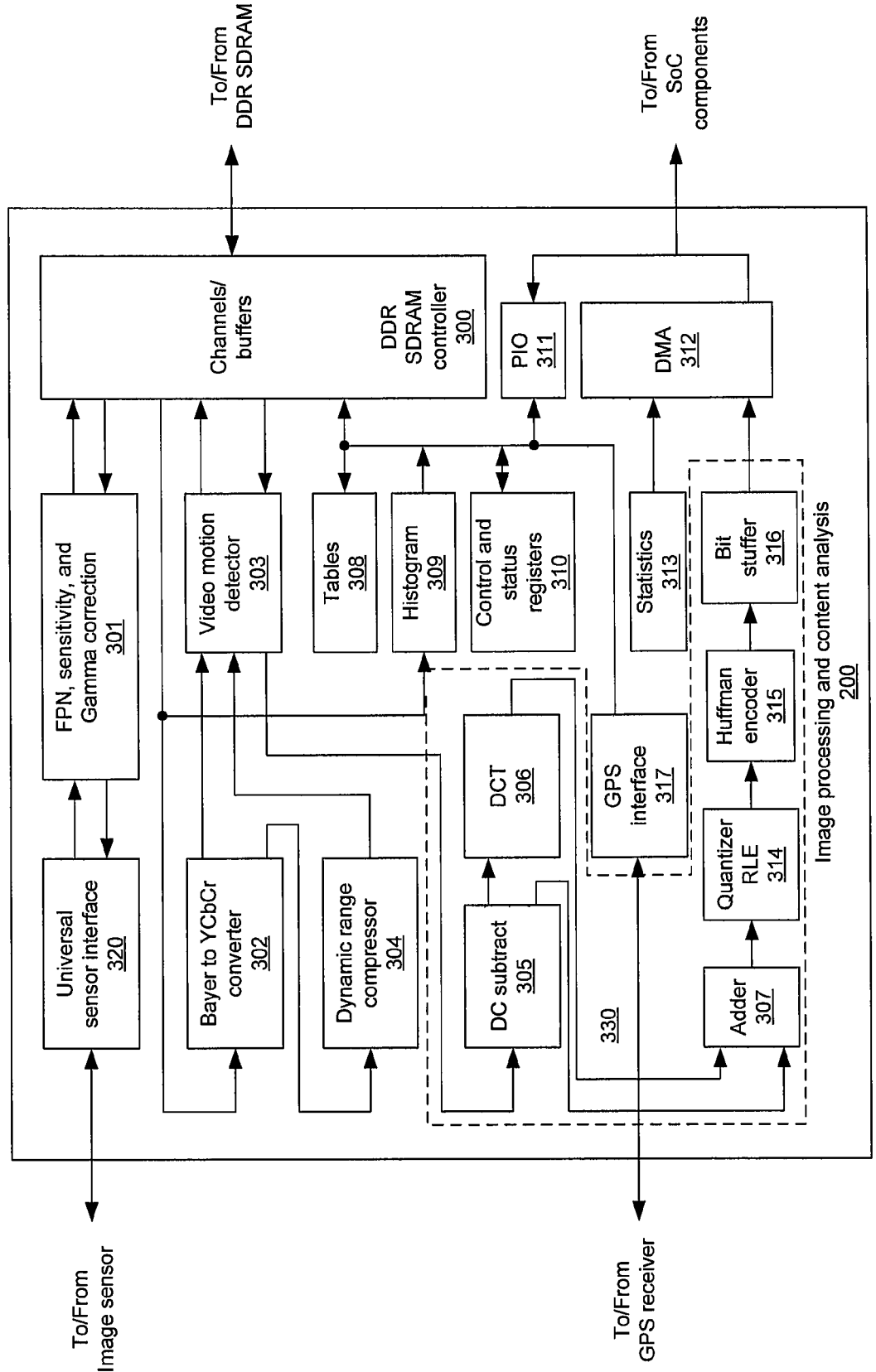
FIG. 3C illustrates an image processing and content analysis block with integrated GPS interface, in accordance with an embodiment of the invention.

FIG. 3C illustrates an image processing and content analysis block with integrated GPS interface, in accordance with an embodiment of the invention. Referring to FIG. 3C, the exemplary image processing and content analysis block 200 may comprise a universal sensor interface 320, an FPN, sensitivity and Gamma correction module 301, a Bayer to YCbCr converter 302, a dynamic range compressor 304, a video motion detector 303, a tables module 308, a histogram 309, control and status registers 310, a statistics module 313, a channels/buffers module with an integrated DDR SDRAM controller 300, a PIO 311, a DMA 312, a JPEG compression engine 330, and a GPS interface 317. The JPEG compression engine 330 may further comprise a DC subtract 305 module, a DCT module 306, an adder 307, a quantizer RLE 314, a Huffman encoder 315, and a bit stuffer 316.

The image processing and content analysis block 200 may be conceptually divided into three major subsystems: a DDR SDRAM memory controller 300, an image processing and compression chain 301, 302, 303, 304, 308, 309, 310, 313, and 330, and a system interface subsystem 320, 300, 311, 312. The system interface subsystem may comprise the universal sensor interface 320, the DDR SDRAM controller 300, the PIO 311, and the DMA 312. The image processing and compression chain subsystem 301, 302, 303, 304, 308, 309, 310, 313, and 330 may comprise an FPN, sensitivity and Gamma correction module 301, a Bayer to YCbCr converter 302, a dynamic range compressor 304, a video motion detector 303, a tables module 308, a histogram module 309, control and status registers 310, a statistics module 313 and a JPEG compression engine 330. The JPEG compression engine 330 may further comprise a DC subtract 305 module, a DCT module 306, an adder 307, a quantizer RLE 314, a Huffman encoder 315, and a bit stuffer 316.

The universal sensor interface 320 may comprise suitable circuitry, logic and/or code and may be used as an interface to an image sensor 100, which may be a CCD, CMOS or a similar device capable of converting an optical image into an electrical signal. The FPN, sensitivity, and Gamma correction module 301 may perform image processing, such as Fixed Pattern Noise, sensitivity and/or Gamma correction. The Bayer to YCbCr converter module 302 converts data from a Bayer format to a YCbCr format. The video motion detector module 303 performs image processing for detecting objects in motion within the incoming image. The video motion detector module 303 may also perform image processing for detecting the background of an image. The dynamic range compressor module 304 performs various operations on the incoming Y and CbCr signals to deliver compressed Y and CrCb. The tables module 308 renders and/or creates graphs based upon the data received from the histogram module 309. The histogram module 309 may contain histograms of images once they have been corrected and/or processed by the FPN, sensitivity, and Gamma correction module 301. These histograms may provide information regarding the levels of illumination and exposure within an image. The control and status registers 310 may control the operation of, and maintain the status of, the various modules within the image processing and content analysis block 200.

The statistics module 313 may contain data used for generating various descriptors or metadata regarding the image content being processed by the image processing and content analysis block 200. The compression engine 330 performs image compression and may output compressed image data. For example, in one embodiment, the image compression engine 330 may provide JPEG data. In another embodiment, the image compression engine 330 may output MPEG-4 data, or any other form of compressed image data. The channels/buffers with an integrated DDR SDRAM controller module 300 may be used to buffer data within the image processing and content analysis block 200. The channels/buffers with an integrated DDR SDRAM controller module 300 may also be used to buffer data sent/received to/from the DDR SDRAM. The PIO module 311 is a programmable I/O module capable of displaying a histogram within an image. The DMA module 312 may accept input from a variety of modules. As illustrated in the figures, the DMA module 312 may accept input data from the statistics module 313 and/or the compression engine 330. The DMA module may then transfer data to the PIO module 311 or may send/receive data to/from other SoC components, for example, the Ethernet transceiver 106. The GPS interface 317 may connect to the common bus or to other modules within the image processing and content analysis block 200 to send location information, which may be used as a descriptor or metadata. As illustrated in the figures, the GPS interface may be connected to the common bus and may interface directly with the tables module 308, the control and status registers module 310, the PIO 310 and the channels/buffers module 300.

In operation, the universal sensor interface 320 may acquire and then transfer the image to the FPN, sensitivity and Gamma correction module 301. The FPN, sensitivity and Gamma correction module 301 may perform image color correction and image processing, such as Fixed Pattern Noise, sensitivity and/or Gamma correction. In order to calculate the Fixed Pattern Noise, sensitivity and other parameters, the FPN, sensitivity and Gamma correction module 301 ma transfer the image data received from the universal sensor interface 320 to the channels/buffers module 300. The channels/buffers module 300 may transfer the data directly to the Bayer to YCbCr converter 302 as well as the video motion detector 303. The channels/buffers module 300 may transfer the image to the Bayer to YCbCr converter module 302 for further processing, such as converting data from Bayer to YCbCr format. The channels/buffers module 300 may also transfer the image to the video motion detector 303 for purposes of image processing to isolate various objects in an image from the background of the image. The video motion detector 303 may receive data from other input modules. As illustrated in the figures, the video motion detector module may receive inputs from the Bayer to YCbCr converter module 302 and/or the dynamic range compressor module 304. The video motion detector module 303 then transfers the image to the compression engine 330. The corrected image is transferred from the FPN, sensitivity, and Gamma correction module to the histogram 309. The tables 308, histogram 309, control and status registers 310, and the statistics 313 modules may operate in parallel with the video motion detector 303.

The video motion detector 303, the tables module 308, the histogram 309, control and status registers 310, and the statistics module 313 may each perform various aspects of image processing and content analysis. For example, collectively, the video motion detector 303, the tables module 308, the histogram 309, control and status registers 310, and the statistics module 313 may perform feature extraction. Feature extraction may comprise, for example, analyzing incoming video data and performing analysis of objects in order to extract various features of these objects including but not limited to the shape, color and/or the motion vector of the objects. The tables 308 and control and status registers 310 may be used for operation of the image processing and content analysis block. The histogram 309 and statistics 313 may be used for generating descriptors or metadata information from the video content. Moreover, information generated by the video motion detector 303 may also be used to generate descriptors and/or metadata. The descriptors may include motion detection, object detection, object tracking, color information, cluster information, background information, skin detection, and/or face detection. The descriptors or metadata generated may be sent to the processor 202 for embedding or appending to the JPEG compressed video. The processor 202 may also send the descriptors to the network separate from their respective compressed video. The descriptors may then be used to facilitate applications, such as data mining applications.

The FPN, sensitivity, and Gamma correction module 301, the Bayer to YCbCr Converter module 302, and the dynamic range compressor module 304 may each perform various aspects of color processing. The tables module 308 renders/creates graphs based upon the histogram data received from the histogram module 309. The histogram module 309 may transfer the histogram data to the PIO module 311 which may display a histogram within or superimposed over an image. The dynamic range compressor 304 may perform image compression in order to ensure that the entire dynamic range is captured by devices which would be otherwise incapable of handling the dynamic range. The control and status registers module 310 may be used to control various registers and to display the status of these registers as well. For example, the control and status registers module 310 may control and display the status of the registers within the universal sensor interface 320. The control registers 310 may also be used to enable or disable various modules within the image processing and content analysis block 200. For example, the control and status registers module 310 may enable or disable the dynamic range compressor 304. The statistics module 313 may interface directly with the DMA 312. The DMA 312 may also receive compressed data from the compression engine 330. The DMA 312 may then transfer the data from the statistics module 313 and/or the compression engine 330 to the PIO 311 or to other components within the reconfigurable smart network camera SoC 104. The DMA 312 may also receive data from other modules within the reconfigurable smart network camera SoC 104. The DMA controller 312 in the camera processor may comprise two external channels, which may be used by the imaging processing and content analysis to transfer data directly to the SDRAM memory. Channel 0 may be used for JPEG compressed images, and channel 1 may be used for statistics data transfers.

As illustrated in FIG. 3C, the GPS interface 317 may be connected to the common bus and may interface directly with the tables module 308, the control and status registers module 310, the PIO 310 and the channels/buffers module 300. The GPS interface 317 may provide location information which may be used as a descriptor or metadata. For example, the information from the GPS interface 317 may be transferred to the control and status registers 310. The control and status registers 310 may control and maintain status of various registers within the image processing and content analysis block 200. The information from the GPS interface 317 may be transferred to the tables module 308. The tables module 308 may maintain a cross reference between data. For example, the tables module 308 may maintain a cross reference between an image and the corresponding geographical coordinates.

Figure 3D:
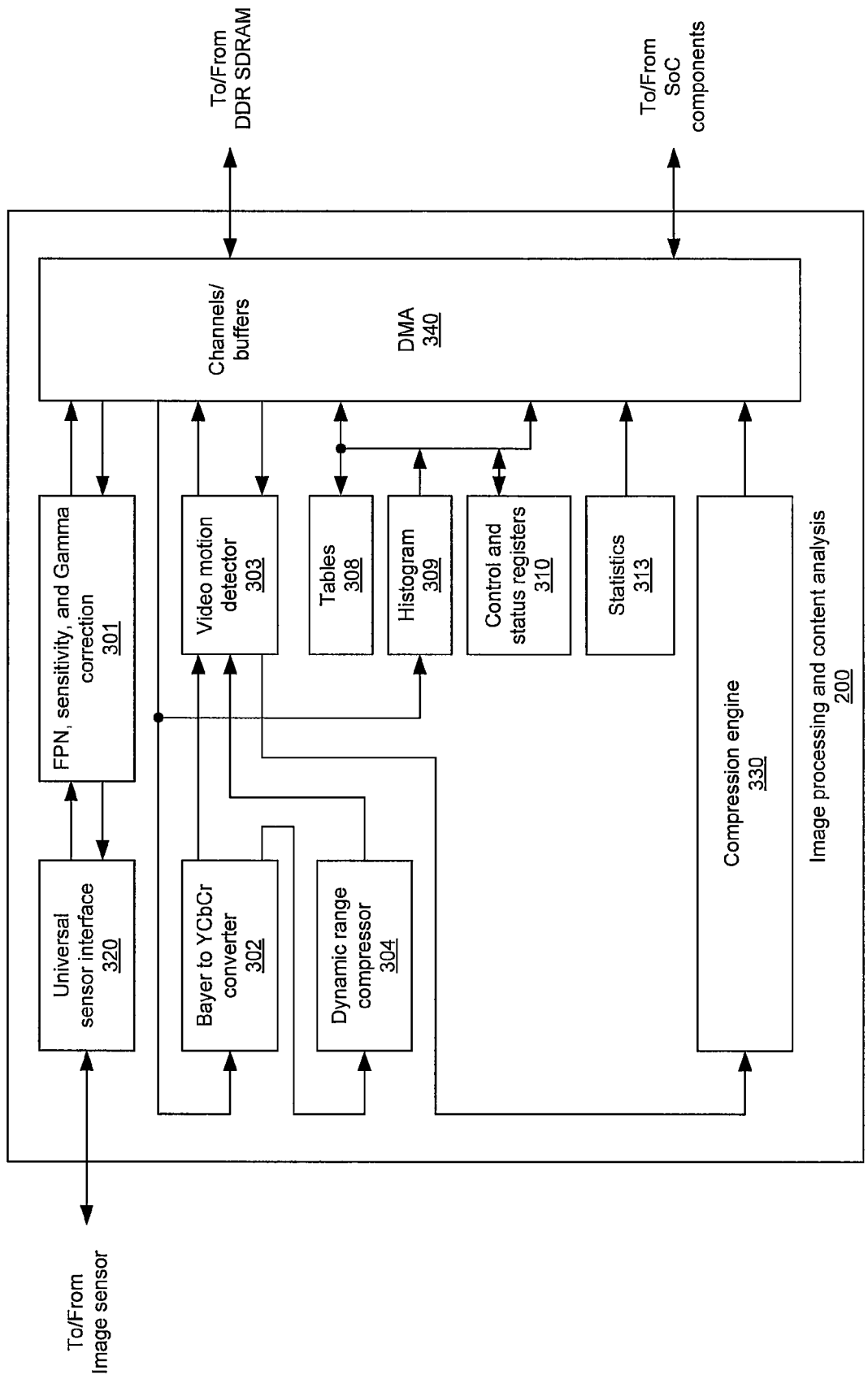
FIG. 3D illustrates an image processing and content analysis block with single DMA, in accordance with an embodiment of the invention.

FIG. 3D illustrates an image processing and content analysis block with single DMA, in accordance with an embodiment of the invention. Referring to FIG. 3D, the exemplary image processing and content analysis block 200 may comprise a universal sensor interface 320, an FPN, sensitivity and Gamma correction module 301, a Bayer to YCbCr converter 302, a dynamic range compressor 304, a video motion detector 303, a tables module 308, a histogram 309, control and status registers 310, a statistics module 313, a channels/buffers module with an integrated DMA 340, and a compression engine 330.

The universal sensor interface 320 may comprise suitable circuitry, logic and/or code (and may be used) to serve as an interface to an image sensor 100 which may be a CCD, CMOS or a similar device capable of converting an optical image into an electrical signal. The FPN, sensitivity, and Gamma correction module 301 may perform image processing, such as Fixed Pattern Noise, sensitivity and/or Gamma correction. The Bayer to YCbCr converter module 302 may convert data from a Bayer format to a YCbCr format. The architecture, functionality, and operation of the Bayer to YCbCr converter module is discussed in greater detail herein below. The video motion detector module 303 performs image processing for detecting objects in motion within the incoming image. The video motion detector module 303 may also perform image processing for detecting the background of an image. The dynamic range compressor module 304 may perform various operations on the incoming Y and CbCr signals to deliver compressed Y and CrCb. The tables module 308 may render and/or create graphs based upon the data received from the histogram module 309. The histogram module 309 may contain histograms of images once they have been corrected and/or processed by the FPN, sensitivity, and Gamma correction module 301. These histograms may provide information regarding the levels of illumination and exposure within an image.

The control and status registers 310 may control the operation of, and maintain the status of the various modules within the image processing and content analysis block 200. The statistics module 313 may contain data required to generate various descriptors or metadata regarding the image content being processed by the image processing and content analysis block 200. The compression engine 330 performs image compression and may output compressed image data. For example, in one embodiment of the invention, the image compression engine 330 may provide JPEG data. In another embodiment, the image compression engine 330 may output MPEG-4 data, or any other form of compressed image data. The channels/buffers with an integrated DMA 340 may be used to buffer data within the image processing and content analysis block 200. The channels/buffers with an integrated DMA 340 may also be used to buffer data sent/received to/from the DDR SDRAM. The channels/buffers with an integrated DMA 340 module may also control DDR SDRAM and may interface directly with other components within the reconfigurable smart network camera SoC 104. The integration of the channels/buffers and the DMA into a single module may offer benefits such as greater range and flexibility of operation, lower power consumption and reduction in physical size.

The integrated DMA module 340 may accept input from a variety of modules. As illustrated in FIG. 3D, the DMA module 340 may accept input data from the FPN, sensitivity and Gamma correction module 301, the video motion detector 303, the tables module 308, the histogram module 309, the control and status registers 310, the statistics module 313 and/or the compression engine 330. The integrated DMA module 340 may then send/receive data to/from the DDR SDRAM. The integrated DMA module 340 may also send/receive data to/from other SoC components for example, the Ethernet transceiver 106.

In operation, the universal sensor interface 320 may acquire and transfer the image to the FPN, sensitivity and Gamma correction module 301. The FPN, sensitivity and Gamma correction module 301 may perform image color correction and image processing, such as Fixed Pattern Noise, sensitivity and/or Gamma correction. In order to calculate the Fixed Pattern Noise, sensitivity and other parameters, the FPN, sensitivity and Gamma correction module 301 may transfer the image data received from the universal sensor interface 320 to the channels/buffers module 300. The channels/buffers module 300 may transfer the data directly to the Bayer to YCbCr converter 302 as well as the video motion detector 303. The channels/buffers module 300 may transfer the image to the Bayer to YCbCr converter module 302 for further processing, such as converting data from Bayer to YCbCr format. The channels/buffers module 300 may also transfer the image to the video motion detector 303 for purposes of image processing to isolate various objects in an image from the background of the image. The video motion detector 303 may receive data from other input modules. As illustrated in FIG. 3D, the video motion detector module may receive inputs from the Bayer to YCbCr converter module 302 and/or the dynamic range compressor module 304. The video motion detector module 303 then transfers the image to the compression engine 330.

The corrected image may be transferred from the FPN, sensitivity, and Gamma correction module to the histogram 309. The tables 308, histogram 309, control and status registers 310, and the statistics 313 modules may operate in parallel with the video motion detector 303. The video motion detector 303, the tables module 308, the histogram 309, control and status registers 310, and the statistics module 313 may each perform various aspects of image processing and content analysis. For example, collectively, the video motion detector 303, the tables module 308, the histogram 309, control and status registers 310, and the statistics module 313 may perform feature extraction. Feature extraction may comprise analyzing incoming video data and performing analysis of objects in order to extract various features of these objects including but not limited to the shape, color and/or the motion vector of the objects. The architecture, functionality, and operation of these modules is discussed in greater detail herein below. The tables 308 and control and status registers 310 may be used for operation of the image processing and content analysis block. The histogram 309 and statistics 313 may be used for generating descriptors or metadata information from the video content. Moreover, information generated by the video motion detector 303 may also be used to generate descriptors and/or metadata.

The descriptors may include motion detection, object detection, object tracking, color information, cluster information, background information, skin detection, and/or face detection. The descriptors or metadata generated may be sent to the processor 202 for embedding or appending to the JPEG compressed video. The processor 202 may also send the descriptors to the network separate from their respective compressed video. The descriptors may then be used to facilitate applications, such as data mining applications. The FPN, sensitivity, and Gamma correction module 301, the Bayer to YCbCr Converter module 302, and the dynamic range compressor module 304 may each perform various aspects of color processing. The tables module 308 renders/creates graphs based upon the histogram data received from the histogram module 309. The histogram module 309 may transfer the histogram data to the DMA module 340. The dynamic range compressor 304 may perform image compression in order to ensure that the entire dynamic range is captured by devices which would be otherwise incapable of handling the dynamic range.

The control and status registers module 310 may be used to control various registers and to display the status of these registers as well. For example, the control and status registers module 310 may control and display the status of the registers within the universal sensor interface 320. The control registers 310 may also be used to enable or disable various modules within the image processing and content analysis block 200. For example, the control and status registers module 310 may enable or disable the dynamic range compressor 304. The statistics module 313 may interface directly with the DMA 340. The DMA 340 may also receive compressed data from the compression engine 330. The DMA 340 may then transfer the data from the statistics module 313 and/or the compression engine 330 to various other modules within the reconfigurable smart network camera SoC 104. The DMA 340 may also receive data from other modules within the reconfigurable smart network camera SoC 104. The integrated DMA controller within the DMA module 340 may comprise two external channels, which may be used by the imaging processing and content analysis to transfer data directly to the SDRAM memory. Channel 0 may be used for JPEG compressed images, and channel 1 may be used for statistics data transfers.

Figure 4:
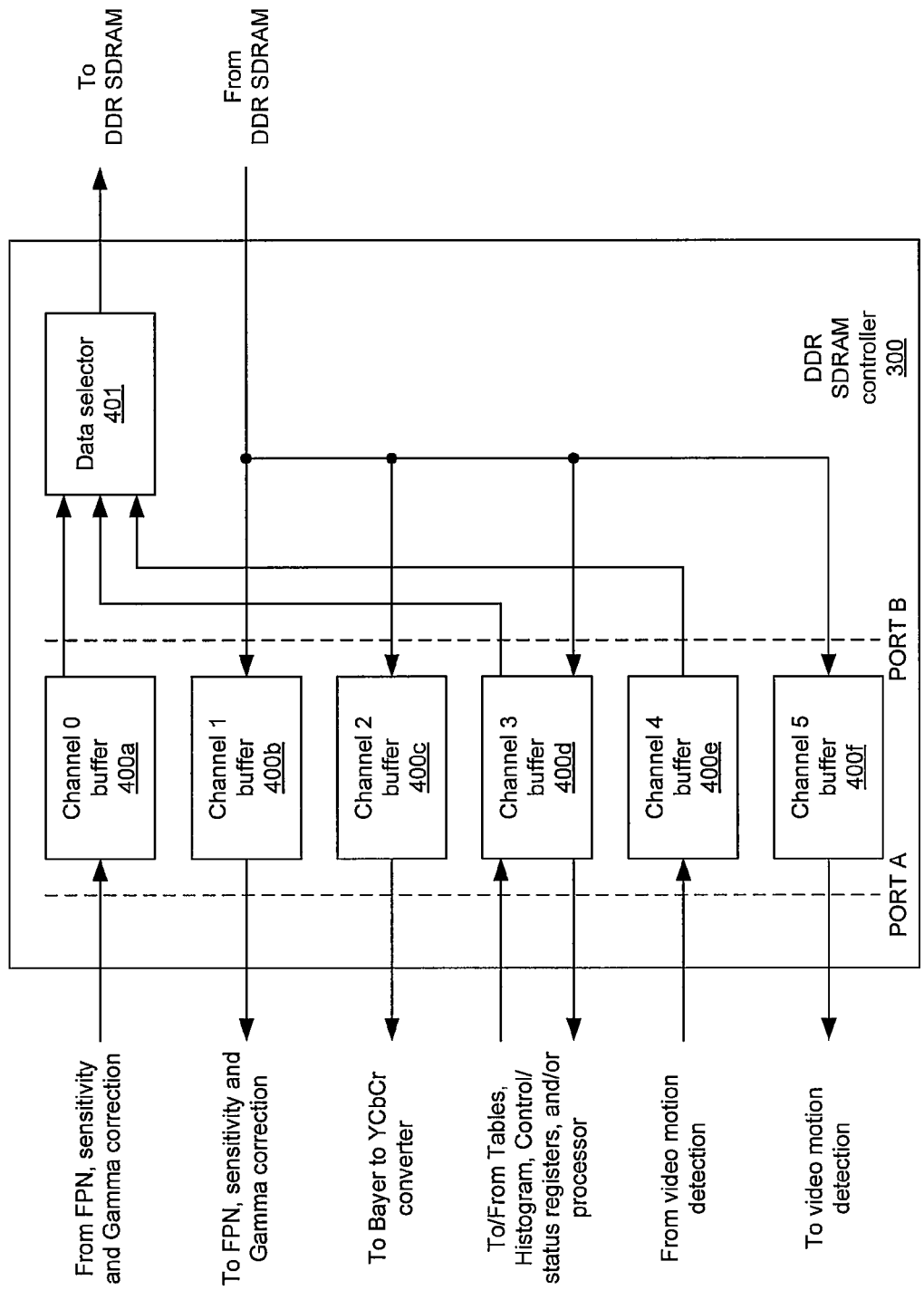
FIG. 4 illustrates a dual-port external memory controller block diagram, in accordance with an embodiment of the invention.

FIG. 4 illustrates a dual-port external memory controller block diagram, in accordance with an embodiment of the invention. Referring to FIG. 4, the exemplary architecture of the DDR SDRAM controller inside the image processing and content analysis block 200 may comprise a data selector module 401, a channel buffer 0 400a, a channel buffer 1 400b, a channel buffer 2 400c, a channel buffer 3 400d, a channel buffer 4 400e, and a channel buffer 5 400f. In another embodiment, the DDR SDRAM controller 300 may comprise another number of channel buffers. Collectively, the channel buffers may act as a dual-port external memory controller. The data selector 401 may be implemented using a standard multiplexer switch.

Each channel may interface with the SDRAM via the data selector 401. A channel may only send, only receive, or simultaneously send and/or receive data. For example, channel 0 400a may only receive image data, channel 1 400b may only send image data whereas channel 3 may simultaneously send and/or receive data. This difference among the channels may be due to the size of the data being transferred. Channels 0 400a and 1 400b may send/receive images which may be greater in size than the data being sent/received by channel 3 400d.

In operation, channel 0 buffer 400a may receive data from the FPN, sensitivity and Gamma correction module 301. Channel 1 buffer 400b may send data to the FPN, sensitivity and Gamma correction module 301. Channel 2 buffer 400c may send data to the Bayer to YCbCr converter module 302. Channel 3 buffer 400e may send/receive data to/from the tables 308, the histogram 309, control/status registers 310, and/or the processor 202. Channel 4 400e may receive data from the video motion detector 303 and may transfer it to the DDR SDRAM for further processing. Channel 5 400f may receive data from the DDR SDRAM and may transfer it to the video motion detector 303.

Acquired sensor frame pixel data samples may be stored in the DDR SDRAM memory, and may be accessed by various SoC modules through time division multiplexed channels. Each channel may comprise its own dual-port memory buffer, as illustrated in FIG. 4. At any given time, one channel data may be transferred between the channel buffer and the DDR SDRAM. Four channels may be defined: Channel 0 400a may be used to write corrected raw sensor data samples to a video buffer in the DDR SDRAM; Channel 1 400b may be used to read Fixed Pattern Noise (FPN) data from the DDR SDRAM; Channel 2 400c may be used to read the sensor data written there by channel 0 in pixel macroblocks; and Channel 3 400d may be used for the processor 202 read and write accesses to the SDRAM through a memory window. The use of certain channels may be enabled or disabled in certain modes of operation.

The accesses to the DDR SDRAM are arbitrated by an SoC module that grants the access to the SDRAM to a channel with the highest priority from channels requesting the access in a given time. There may be, for example, seven request sources possible: channels 0 to 5 and the DDR SDRAM refresh cycles. The channels may be prioritized starting from channel 0 (highest priority), channel 1, channel 2, channel 5, channel 4 and channel 3 (lower priority) with SDRAM refresh cycles having the lowest priority. Once the highest priority channel releases access, the next highest priority channel in the queue may access the SDRAM.

The DDR SDRAM may be organized as, for example, 16M×16 (4 banks of 8192 pages of 512 16-bit wide locations giving 32 MB of address space), and may be accessed for read and write operations in bursts of eight memory locations. Each memory access may transfer 16 bytes (4×32-bits) to/from one of the dual-port memory buffers. The SDRAM address lines may be produced by an SoC module. The address space organized as 16M×16 may be addressed by a word address that may be composed of 2-bit bank address, 13-bit row address and 9-bit column address.

Two transfer modes may be defined: mode 0 and mode 1. Mode 0 may be used to access SDRAM memory in a linear fashion (scan-line order) from a given start address. The transfer length may be expressed in multiples of 16 bytes (eight 16-bit words). Maximum 32 multiples of eight word groups may be transferred in one buffer (512 bytes). Mode 1 may be used for read accesses (channel 2 only) where the data samples for one 20×20 pixel block (tile) may be required.

The parameters of data transfers between the DDR SDRAM and the four channel buffers may be programmed through the buffers descriptors called static descriptors. There may be three descriptors for each channel. The addresses for each dual-port memory buffer page and DDR SDRAM buffer transfers may be produced by descriptors called dynamic descriptors.

The DDR SDRAM controller channel 4 may be used to write current frame background data to the memory buffer 400e while channel 5 may be used to read from the memory buffer 400f the previous frame background data. Both channel 4 and channel 5 descriptors may have the same start address programmed. The memory controller may first read the DDR SDRAM buffer data through channel 5 (written there during the previous frame), then may write the current frame data to the same buffer through channel 4. The start address may be aligned to the page boundary. The start address location in the DDR SDRAM address space may be selected based on the selected VMD window size (one byte per pixel). Channel 4 and channel 5 transfer data for VMD window and may be programmed with nTileX and nTileY values.

Figure 5:
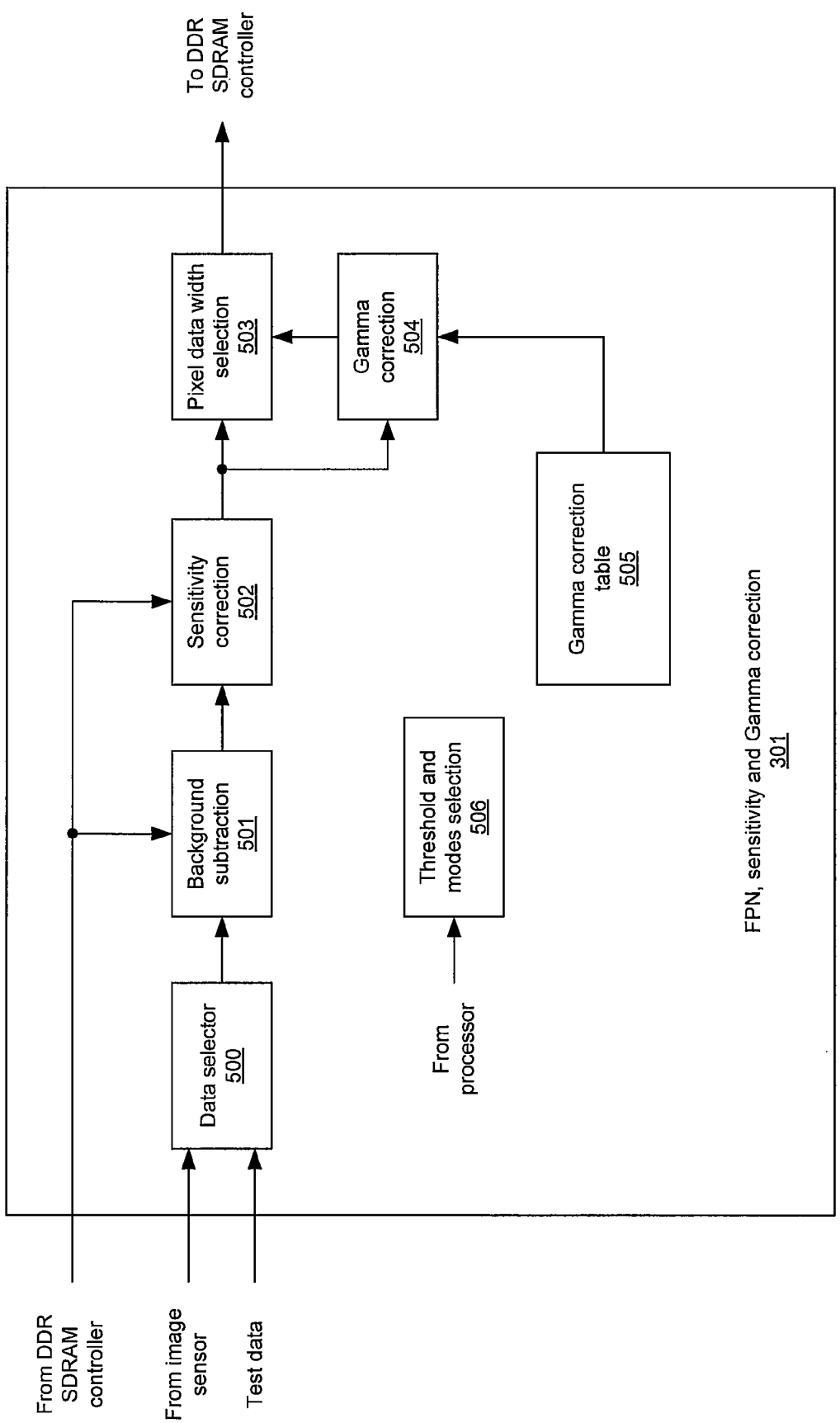
FIG. 5 illustrates a fixed pattern noise (FPN), sensitivity and gamma correction block diagram, in accordance with an embodiment of the invention.

FIG. 5 illustrates a fixed pattern noise (FPN), sensitivity and gamma correction block diagram, in accordance with an embodiment of the invention. Referring to FIG. 5, the exemplary FPN, sensitivity and Gamma correction module 301 of an image processing and content analysis block 200 may comprise a data selector 500, a background subtraction module 501, a sensitivity correction module 502, a pixel data width selection module 503, a Gamma correction module 504, a threshold and modes selection module 506, and a Gamma correction table 505.

In operation, the FPN, sensitivity, and Gamma correction module 301 may perform image calibration functions. The image sensor 100 may provide image data to the data selector 500. The background subtraction module 501 subtracts the background information from data received from the data selector 500. The DDR SDRAM controller 300 may contain a matrix of parameters which may be used for subtraction by the subtraction module 501. This matrix of parameters may be programmed into the DDR SDRAM controller 300 based on testing and/or calibration. The data provided by the DDR SDRAM controller 300 may be referred to as test and/or calibration data. The subtraction operation performed by the background subtraction module 501 may be used to determine levels of Fixed Pattern Noise in the incoming data. Similarly, the DDR SDRAM controller 300 may provide test and/or calibration data to the sensitivity correction module 502. The sensitivity correction module 502 may adjust sensitivity levels using the test and/or calibration data. The pixel data width selection module 503 may select between the various modes of operation. The Gamma correction module 504 may perform a logarithmic conversion upon the data received the sensitivity correction module 502. In order to perform this Gamma correction, the Gamma correction module 504 may receive various parameters contained within a lookup table which may be provided by the Gamma correction table 505. The Gamma correction module table 505 may contain a look up table with various parameters required for Gamma correction. The threshold and modes selection module 506 receives an input from the processor 202. The threshold and modes selection module 506 may select from various modes of operation for the modules within the FPN, sensitivity and Gamma correction module 301.

In reference to FIG. 5, the sensor pixel information may be received using a sensor trigger signal. When the FPN data is to be used by the processing chain, then channel 1 may have to be enabled first. After being received, the sensor pixel 10-bit data and 10-bit test data form inputs to 2:1 data selector. Depending on the setting of a bit in a sensor/FPN control register, the pixel data or the test data may be passed for further processing. For background subtraction, depending on a selected submode in the sensor/FPN Control register, background data may be calculated using FPN 8-bit data from SDRAM channel 1 buffer and subtracted (when the subtraction is enabled) from the 2:1 multiplexer output data. There may be four selections available: no subtraction, subtract 8-bit FPN data, subtract 8-bit FPN data shifted one bit left and subtract 8-bit FPN data shifted two bits left. If the result of the subtraction is negative, then the pixel-data may be set to 0.

For sensitivity correction, depending on the mode selected in the sensor/FPN control register and 8-bit FPN data from SDRAM channel 1 buffer, the pixel data may be multiplied by four different values: 0x0—1024 (no correction), 0x1—896 to 1144 (−12.5% to +12.5%), 0x2—768 to 1278 (−25% to +25%) and 0x3—512 to 1532 (−50% to +50%). After the multiplication, 10 LSBs may be discarded (equivalent to division by 1024). For saturation correction, data samples equal to or greater than 1024 may be limited to 1023 and may be used as input data for gamma correction block.

For gamma correction, a table may be used to implement the sensor data gamma correction. Two MSBs of the table 10-bit address select the pixel color (0x00—red, 0x01—green or 0x02—blue with 0x11 unused). Eight MSBs of the 10-bit saturated data may be used as the table address eight lower bits. In this way, for each pixel color and the data value represented by its eight MSBs, there may be a unique 16-bit value from the table.

For data width selection, when the bit width of sensor/FPN control register is set, the sensor pixel data may be in 16-bit mode (five leading zeros and 11-bit sensor data), which may be referred to as raw pixel data mode. When the bit is cleared, then the pixel saturation and gamma corrected 8-bit pixel data may be used. In the 8-bit mode, 16-bit of data may be written to the DDR SDRAM channel 0 every second pixel clock cycle. Output data bits 15 . . . 8 contain current pixel data with previous pixel data present on bits 7 . . . 0.

For Channel 0 write to DDR SDRAM, the Channel 0 buffer may be implemented as, for example, dual port memory organized as 1024×16, when seen from sensor side, and 512× 32, when seen from the DDR SDRAM side. Pixel data samples may be written to the buffer and may be synchronized to pixel clock (pclk). The buffer may be divided into four 256×16 pages (two MSBs of the sensor side 10-bit address select the current page). The pages may be filled with the sensor data until the page is full. Once one of the ring buffer pages is filled in, a start signal is asserted to and the buffer contents may be transferred to DDR SDRAM buffer. The SDRAM address is produced by the channel 0 buffer descriptors. Data transfers may be performed in the manner described in previous sections.

For color processing, once enough of the sensor frame data samples have been acquired in the DDR SDRAM video buffer, the channel 2 may be initialized and enabled and color processing may start. When initialized and enabled, the channel 2 logic transfers the sensor frame data from the DDR SDRAM video buffer to channel 2 dual-port memory buffer.

For Channel 2 read from DDR SDRAM, the channel dual-port memory may be organized as 2048×8, when seen from the color processing side, and as 512×32, when seen from the SDRAM side. The data may be read from the SDRAM into the channel 2 buffer in 20×20 pixel blocks. One buffer page holds one such block. The color processing may read the pixel data for processing from the dual-port memory port A. There may be two ways the data is addressed for reading: nomosaic and mosaic. In nomosaic mode, the samples may be read staring from the page beginning in scan-line order, 18 samples for 18 rows are read. In mosaic mode, a block counter may count the number of blocks read. The number of blocks (18×18 tiles) may be programmed by the processor through a register. Before reaching the end of a current page, the color processing may issue request to read data from the SDRAM into the next buffer page. Another 20×20 pixel block may be read from the SDRAM into the next buffer page and the new data readiness may be indicated to color processing. The pixel data samples may be passed to color space converter for color space (Bayer to YCbCr) conversion.

For a text mask, the first row of 20×20 pixel blocks may be duplicated in internal RAM as a row of 128 blocks. As Channel 2 reads from the DDR SDRAM, data may also be read from the internal RAM to provide a text mask. This may be visible on the first 20 scan lines.

To maximize the available data, the RAM may be configured to be 16,384×1 bit. Each bit may represent a block of 4 pixels. If a bit is set to 1, then the corresponding block may appear as a grey pixel with the intensity being defined by a mask intensity register. If the bit is set to 0, then either image data will be displayed or it will appear as a grey pixel with the intensity being defined by the mask background register. The selection of image or mask data may be controlled by the mask control register.

From the processor side, the mask data may be represented as 32 bit data. Each write to the mask data register will output the next 32 bits of data to the block. The address may be incremented automatically. Four writes are required for every 20×20 block. Each block may be stored in a 128×1 bit page within RAM. The RAM holds 128 of these blocks arranged in 1 row of 128, or 2560×20 pixels. Each block has a corresponding address. The address location may be defined in the mask address register. It also resets the address counter for the mask data.

Figure 6:
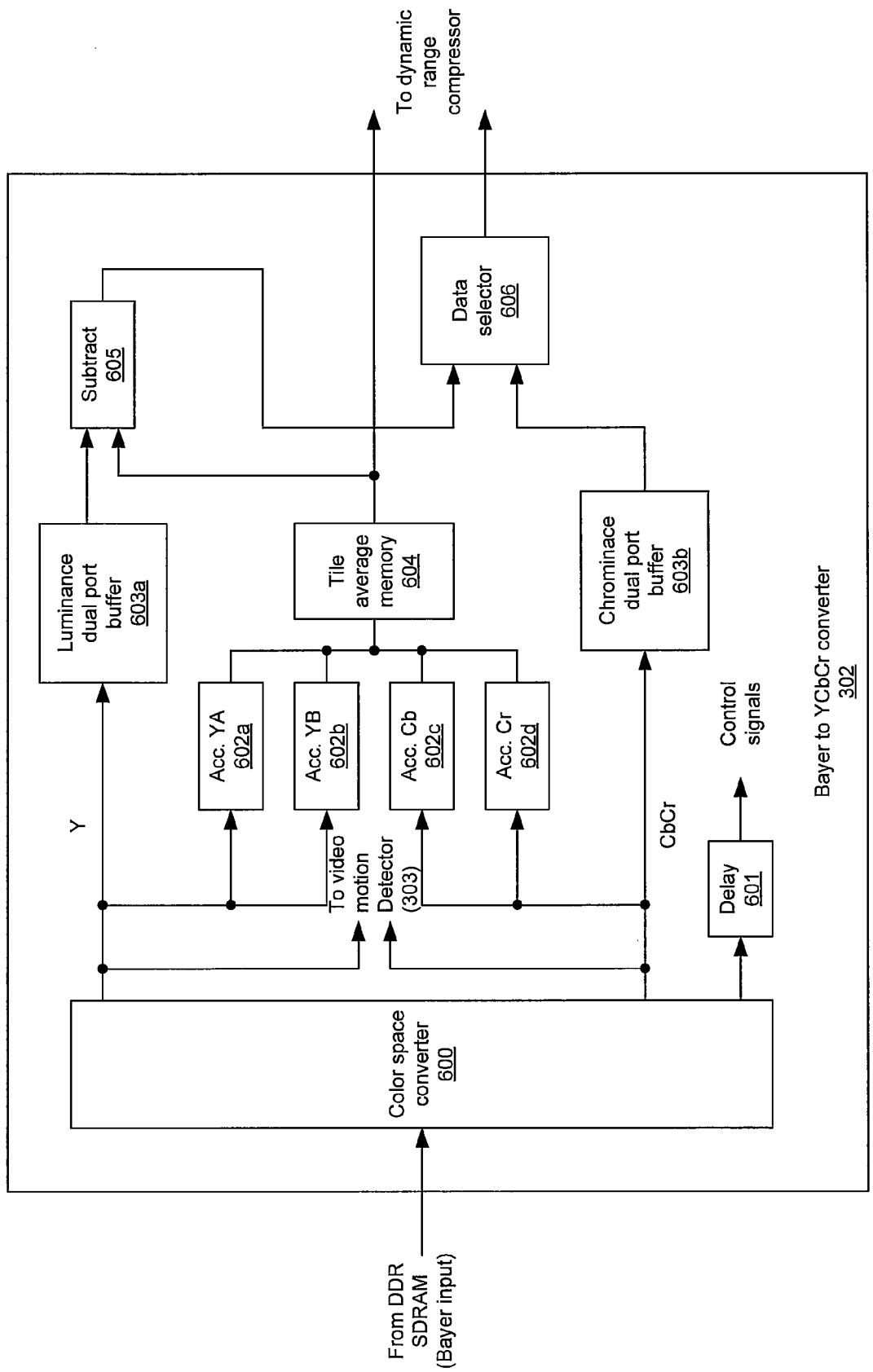
FIG. 6 illustrates a color processing block diagram, in accordance with an embodiment of the invention.

FIG. 6 illustrates a color processing block diagram, in accordance with an embodiment of the invention. Referring to FIG. 6, the exemplary Bayer to YCbCr converter 302 of an image processing and content analysis block 200 may comprise a color space converter 600, a delay module 601, a YA accumulator 602a, a YB accumulator 602b, a Cb accumulator 602c, a Cr accumulator 602d, a luminance dual port buffer 603a, a chrominance dual port buffer 603b, a tile average memory module 604, a subtraction module 605, and a data selector module 606.

In operation, the color space converter 600 may receive a Bayer input from the DDR SDRAM 300. The color space converter 600 may have a luminance output (Y) and a chrominance (chrominance blue and chrominance red) output (CbCr). The color space converter may also send these Y and CbCr outputs to the video motion detector 303. The Y output may be received by the luminance dual port buffer 603a. The Y output may also be received by the luminance accumulators (Acc.) YA 602a and Acc. YB 602b. Similarly, the CbCr output may be received by the chrominance dual port buffer 603b. The CbCr output may also be received by the chrominance accumulators Acc. Cb 602c and Acc. Cr 602d. The accumulators YA 602a, YB 602b, Cb 602c, and Cr 602d may provide several values to the tile average memory module 604. These values provided by the accumulators YA 602a, YB 602b, Cb 602c, and Cr 602d may be used by the tile average memory module 604 to calculate average values for luminance and chrominance tiles. For example, the average memory module 604 may calculate average values for 8×8 luminance and chrominance tiles 8×8.

Similarly, four average values for luminance tiles and one for Cb and one Cr tiles may be stored in a 16×8 memory. The subtraction module 605 may receive the luminance signal from the luminance dual port buffer 603a. The subtraction module 605 may also receive an average tile value from the tile average memory module 604. By performing the subtraction between the tile average values and the buffered signal from the luminance dual port buffer 603a, the subtraction module 605 outputs a signal that may be used for calibration purposes. This output from the subtraction module 605 may be provided to the data selector 606. The data selector module 606 may also receive a chrominance signal from the chrominance dual port buffer 603b. The data selector module 606 may then select which signal to output. The output from the data selector 606 may be provided to the dynamic range compressor 304. The delay module 601 may be used to synchronize the operation of the various modules within the Bayer to YCbCr converter 302. The output from the delay module 601 may serve as control signals which may be used to enable or disable various modules within the Bayer to YCbCr converter. These delays may compensate for the latency added by the motion detection processing.

For Bayer to YCbCr conversion, a CMOS or CCD sensor may send color pixels arranged according to Bayer phase 0 (GR/BG sequence). An N×N pixel block, which may be 2×2, may be used to interpolate RGB components for each pixel and calculate they Y, Cb and Cr components. For implementation in hardware logic, the coefficients used in conversion may be multiplied by 256 and rounded up to 8-bit unsigned integer numbers. Using those coefficients luminance values may be calculated and the results may be divided by 256 (shifted right by 8 bits).

Chrominance blue and chrominance red may be calculated using, for example, 4:2:0 chroma sub-sampling. Again, 256 times greater coefficients (10-bit) may be used in hardware logic implementation and the results may be scaled back accordingly. The chrominance coefficients may be programmable by the processor. After color space conversion luminance samples appear on the output in the scan line order (16 samples per line) and may be written to a dual port buffer with two 256 bytes pages. The samples may be read out in 8×8 tile order. Corresponding chrominance samples may be clocked out in CbCr order.

The green channel may be the most significant component of the luminance values of an image. The luminance channel contains most of the details of an image and hence the interpolation of green pixels has a significant impact on the details of a resultant image. Instead of a standard Bilinear interpolation, which indiscriminately averages the values of the neighboring pixels, the interpolation algorithm may instead be used to detect local spatial features present in the pixel neighborhood and then make effective choices as to which predictor to use for that neighborhood.

The output of the Y buffer may be also directed to the video motion detector (VMD) 303 for motion detection processing. Additional data selectors have been added to enable sending the output data (background and difference) to a compressor for VMD testing. Additional delays compensate for the latency added by the motion detection processing. Luminance data may be used by VMD and chrominance samples may be set to a constant value when data may be used as the JPEG compressor input.

Figure 7:
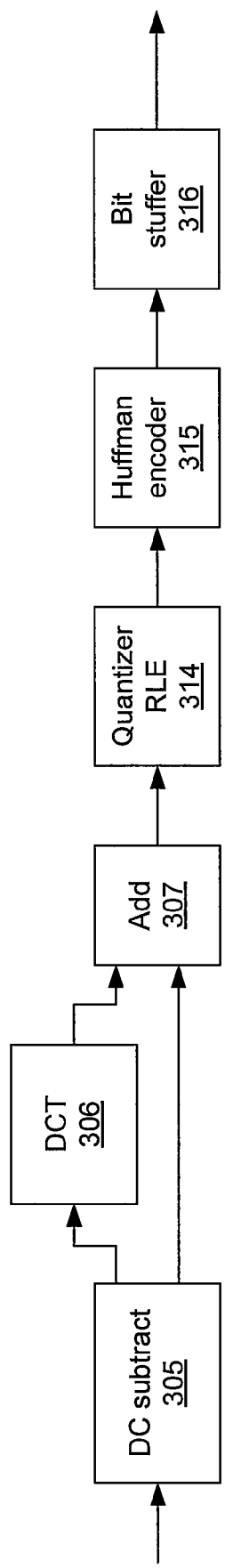
FIG. 7 illustrates a block diagram of JPEG compression processing chain, in accordance with an embodiment of the invention.

FIG. 7 illustrates a block diagram of JPEG compression processing chain, in accordance with an embodiment of the invention. Referring to FIG. 7, the JPEG compression chain 330 may include a DC subtract module 305, a DCT module 306, an adder 307, a quantizer RLE 314, a Huffman encoder 315, and a big stuffer 316.

In operation, the DC subtract module 305 may receive an input from the video motion detector 303. For DC subtraction, the luminance average (DC) values for each of the tiles may be subtracted from the tile luminance samples. The DC subtraction may be disabled through a compressor control register. The subtracted value may be added back by adder 307 after the DCT 306 which is not as defined in JPEG standard. The data from the Y and CbCr buffers may be clocked out by the color processing logic in the tiles order with tile number 4 and 5 being allocated to Cb and Cr tiles respectively. This data may be input to DCT for two-dimensional discrete cosine transform (DCT) processing. Further processing may implement operations defined in the JPEG compression standard and may be performed on 8×8 pixel tiles.

Figure 8:
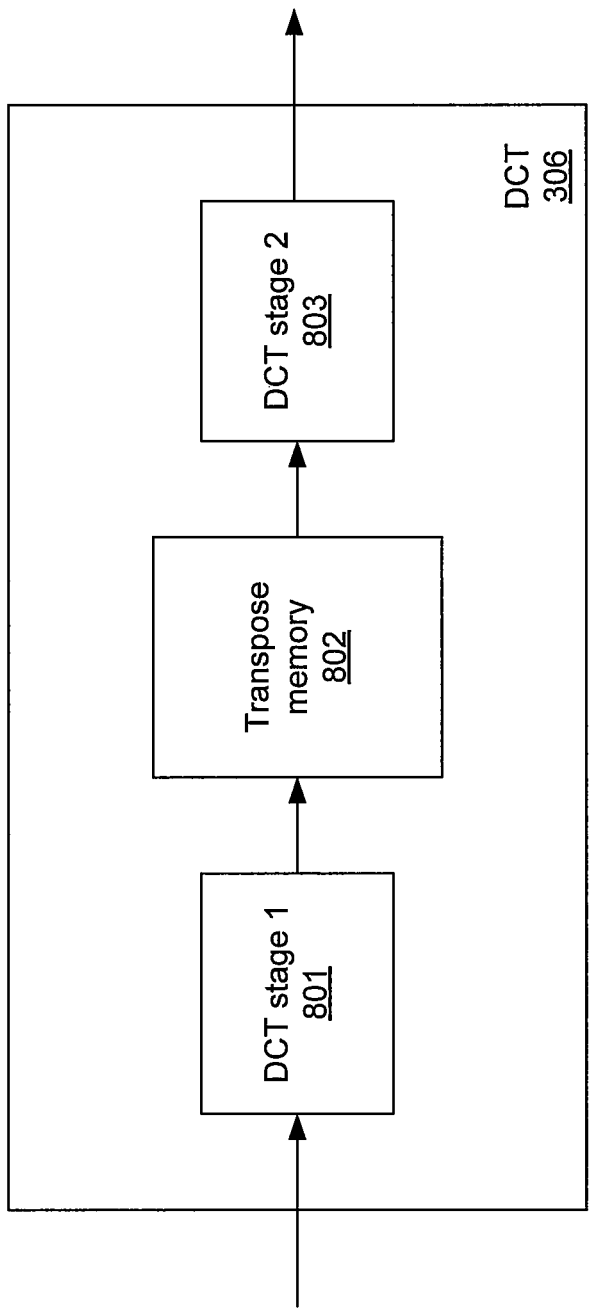
FIG. 8 illustrates a block diagram of discrete cosine transform in JPEG compression, in accordance with an embodiment of the invention.

FIG. 8 illustrates a block diagram of discrete cosine transform in JPEG compression, in accordance with an embodiment of the invention. Referring to FIG. 8, the DCT module 306 may comprise a DCT stage 1 801, a transpose memory 802, and a DCT stage 2 803. Therefore, in this embodiment, the DCT implementation may comprise two DCT stages 801 and 803 and a transpose memory 802.

In operation, the DCT 306 may enable start/stop operation, where 8×8 pixel blocks may be processed after each start pulse. The DCT stage 1 801 receives an input from the DC subtract 305. The output from the DCT stage 1 801 may be provided to the transpose memory 802. The output from the transpose memory 802 may be provided to the DCT stage 2 803. The DCT stage 2 803 may then output the data to the adder module 307.

Figure 9:
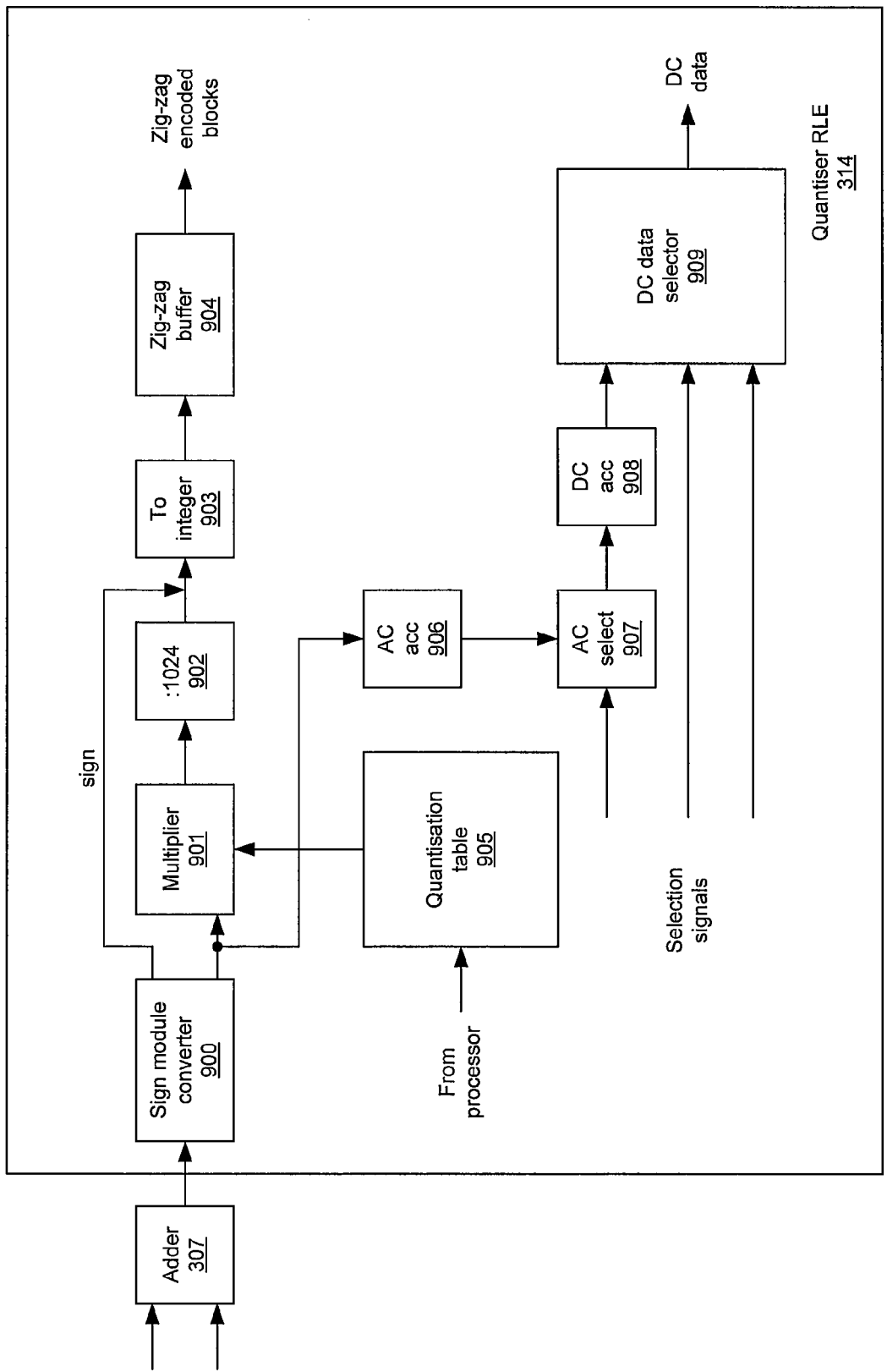
FIG. 9 illustrates a block diagram of quantization section of quantizer RLE block, in accordance with an embodiment of the invention.

FIG. 9 illustrates a block diagram of quantization section of quantizer RLE block, in accordance with an embodiment of the invention. Referring to FIG. 9, the quantizer RLE module 314 may comprise a sign module converter 900 a multiplier 901, a divider 902, an integer module 903, a zig-zag buffer 904, a quantization table 905, an accumulator AC module 906, an AC select 907, a DC accumulator, and a DC data selector 909.

In operation, the sign module converter 900 receives an input from the adder 307. The sign module converter 900 may output sign data to the integer module 903. The sign module converter 900 may also output data to the multiplier 901 and the AC acc module 906. The multiplier 901 receives values from the quantization table 905. The values in the quantization table 905 may be programmed by a processor. The values within the quantization table 905 may be equal to 1024 divided by the required quantization coefficients. The DC value for each tile subtracted before DCT 306 may be now added back to each sample. The result may be converted to sign-module format. The module parts may be multiplied by corresponding values from the quantization table 905 and the results may be divided by 1024. The division operation may be performed by the divider module 902. The values output by the divider module 902 may be rounded to the nearest integer by the integer module 903. Once these values have been rounded to the nearest integer and converted back to signed values, they may be written to a dual-port memory buffer. The second port of the memory buffer may be addressed in such a way as to re-organize the data samples in each 8×8 pixel block from scan-line to a zig-zag sequence. The output from the integer module 903 is provided to the zig-zag buffer 904. The output from the AC acc 906 may be output to the AC select module 907. The AC select module 907 may utilize selection signals for further operations. The output from the AC select module 907 may be provided to the DC acc module 908. The DC acc module 908 may then output data to the DC data selector 909. The DC data selector 909 may receive various other selection signals as well. The DC data selector 909 may then output DC data.

Figure 10:
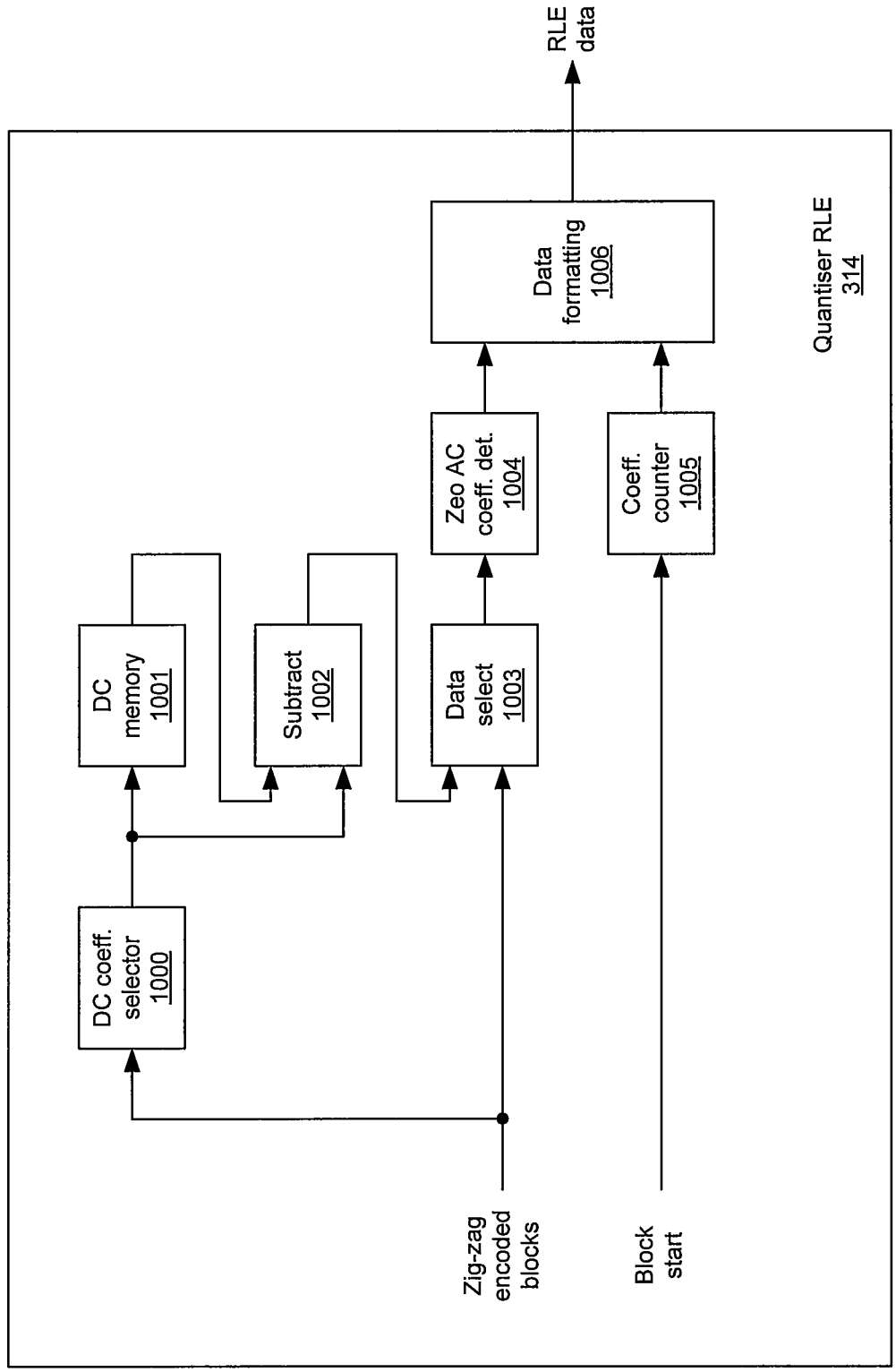
FIG. 10 illustrates a block diagram of run length encoder (RLE) section of quantizer RLE block, in accordance with an embodiment of the invention.

FIG. 10 illustrates a block diagram of run length encoder (RLE) section of quantizer RLE block, in accordance with an embodiment of the invention. Referring to FIG. 10, the run length encoder section of the quantizer RLE block 314 may comprise a DC coefficient selector 1000, DC memory 1001, a subtract module 1002, a data select module 1003, a zero AC coefficient determination module 1004, a coefficient counter 1005, and a data formatting block 1006.

In operation, the DC coefficient selector module 1000 may receive zig-zag encoded blocks from the zig-zag buffer 904.

The output from the DC coefficient selector 1000 may be provided to the DC memory module 1001. The subtract module may receive inputs from the DC coefficient selector 1000 and the DC memory module 1001. The data select module 1003 may receive data from the subtract 1002 module and the zig-zag encoded blocks from the zig-zag buffer 904. The output from the data select module may be provided to the Zero AC coefficient determination module 1004. The output from the zero AC coefficient determination module 1004 may be provided to the data formatting module 1006. The data formatting module 1006 may also receive an input from the coefficient counter module 1005. The coefficient counter module 1005 may receive a block start signal and may output data to the data formatting module 1006. The data formatting module 1006 may then output RLE data which may be provided to the Huffman encoder 315. Effectively, the run length encoder may implement a DC coefficient differential encoding and run-length encoding of the zig-zag encoded data for each 8×8 tile. A run length encoding data format may be specified.

Figure 11:
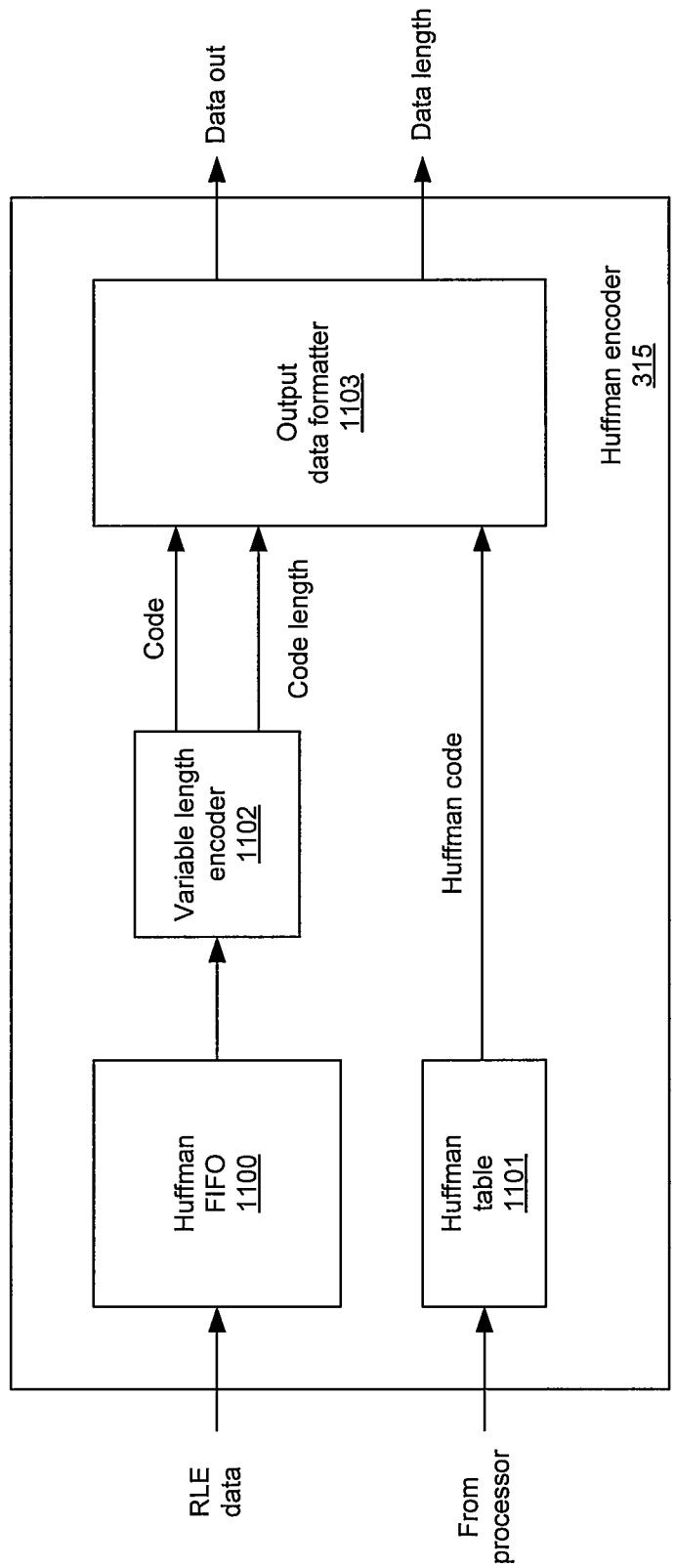
FIG. 11 illustrates a block diagram of Huffman encoder in JPEG compression, in accordance with an embodiment of the invention.

FIG. 11 illustrates a block diagram of Huffman encoder in JPEG compression, in accordance with an embodiment of the invention. Referring to FIG. 11, the Huffman encoder 315 may comprise a Huffman FIFO 1100, a variable length encoder 1102, an output data formatter 1103, and a Huffman table 1101.

In operation, the Huffman FIFO 1100 receives RLE data from the Quantizer RLE 314. The Huffman encoder 315 implements Huffman encoding of the 16-bit data stream received from the run length encoder 314. The Huffman table 1101 may be programmed by the smart network camera SoC processor 104. In Huffman encoding, different symbols may be encoded using different number of bits. The module output may comprise 16-bit data and 4-bit length indicating the number of the data valid bits.

Figure 12:
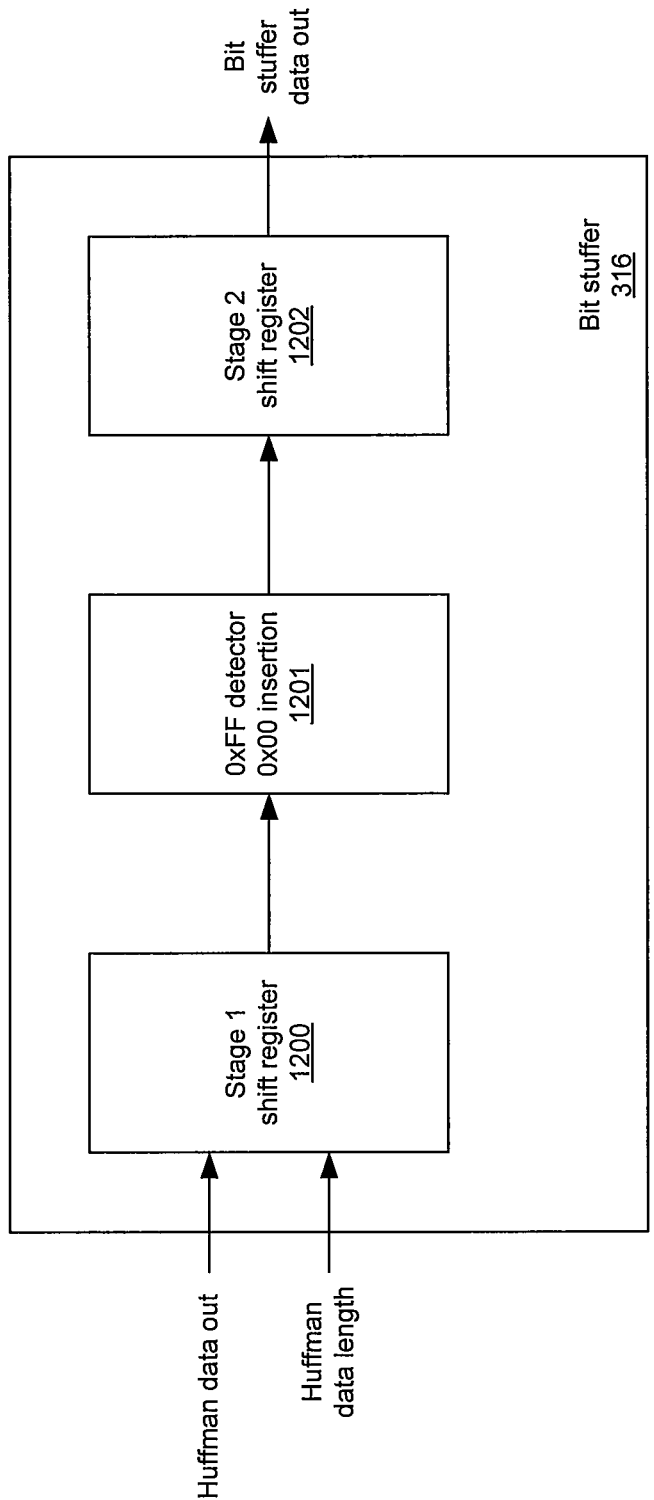
FIG. 12 illustrates a block diagram of bit stuffer in JPEG compression, in accordance with an embodiment of the invention.

FIG. 12 illustrates a block diagram of bit stuffer in JPEG compression, in accordance with an embodiment of the invention. Referring to FIG. 12, the bit stuffer 316 may comprise a stage 1 shift register 1200, a 0xFF detector and a 0x00 insertion module 1201, and a stage 2 shift register 1202.

In operation, the Stage 1 shift register 1200 receives Huffman data out and Huffman data length from the Huffman encoder 315. The Stage 1 shift register 1200 outputs data to the 0xFF detector 0x00 insertion 1201 module. The 0xFF detector 0x00 insertion module 1201 outputs data to the Stage 2 shift register 1202. The bit stuffer 316 may receive 16-bit data with variable number of valid bits from Huffman encoder 315 and packs the data in 32 bytes aligned blocks for DMA to processor SDRAM memory. After each 0xFF byte the stuffer inserts a 0x00 byte.

Figure 13:
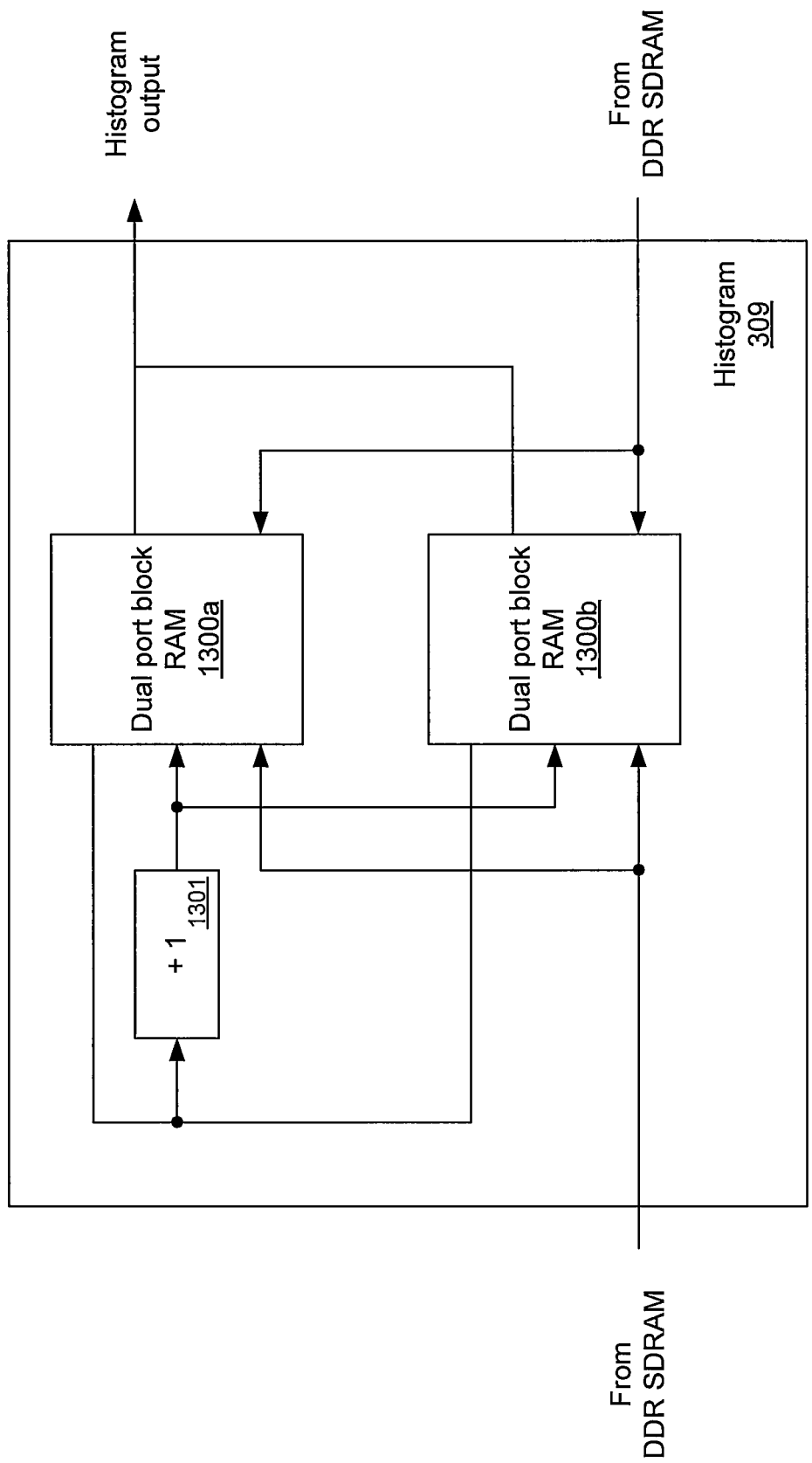
FIG. 13 illustrates a histogram block diagram, in accordance with an embodiment of the invention.

FIG. 13 illustrates a histogram block diagram, in accordance with an embodiment of the invention. Referring to FIG. 13, histogram 309 may comprise dual port block RAM modules 1300a and 1300b, and a +1 module 1301. In operation, the dual port block RAM 1300a and the dual port block RAM 1300b may receive an input from the DDR SDRAM. This input to the dual port block RAM modules 1300 and 1300b may have three channels of data. These three channels of data may contain luminance (Y), and chrominance (CrCb) information. The dual port block RAM modules 1300a and 1300b may communicate directly with each other. The +1 module 1301 may compensate for any delay within the histogram module 309. The +1 module may also count the number of occurrences of R, Gr, Gb and B pixels in the incoming signal. The +1 module 1301 may also increment address locations as they are addressed during data valid periods. Effectively, the histogram module 309 may count the number of occurrences of each of 0 to 255 value on sensor pixel data for R, Gr, Gb and B pixels in a programmed window. The module input data may be provided by channel 0 dual-port DDR SDRAM memory buffer. The histogram module 309 may be implemented as dual-port memory where the data sample value together with the pixel color identification address the memory. The addressed locations values increment each time the location has been addressed during data valid periods. The memory space may be divided into two 1048×18 pages. When the data may be written to one page the other may be accessed for read. One page holds histogram data for one sensor frame window. The histogram data may be read by a processor through a PIO interface.

The quantizer 314 may average values of one or more AC coefficients for each 16×16 block as well as the number of pixels with 0x00 and the number of pixels with 0xFF values in each such block may be sent to DMA FIFO 1 for transfer to the processor SDRAM memory. In this regard, the histogram module may receive an input from the DDR SDRAM and may output a histogram for luminance and/or a histogram for chrominance. All three channels may be displayed within one histogram output or in separate histograms.

Figure 14:
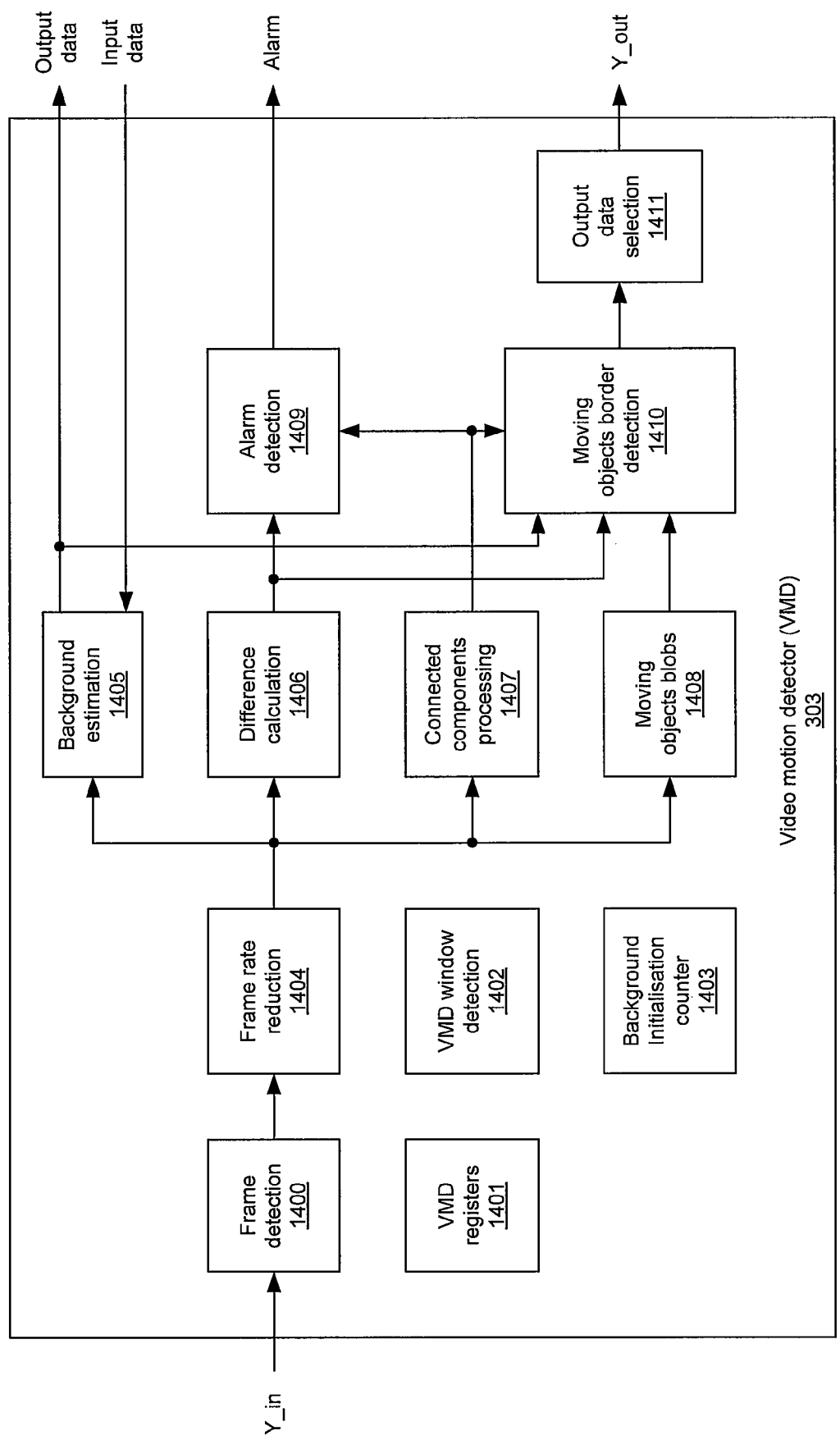
FIG. 14 illustrates a video motion detection (VMD) block diagram, in accordance with an embodiment of the invention.

FIG. 14 illustrates a video motion detection (VMD) block diagram, in accordance with an embodiment of the invention. Referring to FIG. 14, the video motion detector 303 may comprise a frame detection module 1400, a frame rate reduction module 1404, a background estimation module 1405, a difference calculation module 1406, an alarm detection module 1409, a connected components processing module 1407, a moving objects blobs module 1408, a moving objects border detection module 1410, an output data selection module 1411, VMD registers 1401, a VMD window detection 1402, and a background initialization counter 1403.

In operation, the frame detection module 1400 may receive an image data. This image data may contain luminance data. The output from the frame detection module 1400 may be provided to the frame rate reduction module 1404. The frame rate reduction module 1404 may reduce the frame rate for various purposes. For example, the frame rate reduction module 1404 may reduce the frame rate if frames are being received at a rate at which the VMD module 303 may not operate optimally. The output from the frame rate reduction module 1404 may be provided to the background estimation module 1405, the difference calculation module 1406, the connected components processing module 1407, and the moving objects blobs module 1408. The background estimation module 1405 may perform statistical analysis and image processing to estimate a background within incoming image frames. The difference calculation module 1406 may calculate the difference between frames provided by the frame reduction module 1404 and the background image as provided by the background estimation module 1405.

The connected components processing module 1407 may receive incoming active tiles and may classify objects within these active tiles. The connected components processing module 1407 may also place information regarding objections into blobs. The moving objects blobs 1408 may perform additional processing of the image. For example, the moving objects blobs module 1408 may extract additional information such as color, shape and direction of an object within a frame. The moving objects border detection module 1410 may receive data from the background estimation module 1405, the difference calculation module 1406, the connected components processing module 1407, and/or the moving objects blobs module 1408. The moving objects border detection module 1410 may then combine all the information from these various modules 1405, 1406, 1407, and/or 1408. The moving objects border detection module 1410 may also add a boundary such as a highlight to the borders of objects within an image. The moving border detection module 1410 may then output this data to the output data selection module 1411.

The output data selection module 1411 may selectively output some or all of the incoming data from the moving objects border detection 1410. The Y_out signal from the output data selection may then be provided to other modules within the smart network camera 110. The alarm detection module 1409 may receive data from the difference calculation module and/or the moving objects border detection module 1410. The alarm detection module 1409 may comprise suitable circuitry, logic and/or code and may serve as a trigger. The alarm detection module 1409 may contain parameters which may serve as a threshold or a baseline. The alarm detection module 1409 may then output data in a format such as XML which may be used by other modules within the smart network camera 110. The VMD registers 1401 may enable or disable the various modules within the video motion detector 303. The VMD window detection module 1402 may set a window within which motion may be detected. This window may be referred to as a region of interest. The window or region of interest may be of any shape or size. The background initialization counter 1403 may reset the background estimation module 1405.

The video motion detector 303 may implement the camera video motion and new static objects detection features. In the video motion detection luminance signal may be used by VMD processing. The module operation may be controlled through a set of registers 1401. In order to enable video motion detection, bit 0 of VMD control register 1401 may be set high. The bit when set high may inhibit changes to some of the VMD registers and hence those other VMD registers may be programmed prior to that. Other bits of VMD control register 1401 may be programmed simultaneously with setting bit 0 high. An area of the video frame ranging from 16×32 pixels (or 32×16 pixels) to the frame full size may be defined through VMD window register. Video motion detection may be performed only in this selected area. The VMD window area may be an integer multiple of 512 bytes.

When the motion detection has been enabled, the background initialization may be performed in N iterations programmable through VMD control register 1405. The background estimation may be based on successive approximations algorithm which increments/decrements the background value by a half of the difference between the input luminance signal and the previous frame background value.

The VMD 303 may use for motion detection frames with reduced frame rate. When value M written to VMD control register bits may be different than zero only every (M+1) frame will be used. Start of a new video frame may be indicated to VMD by the compressor. The VMD 303 may count the number of received luminance samples in order to detect the frame end. For this reason, it may be important to program the correct frame size in VMD frame size register.

After detecting a new VMD frame (frame with reduced frame rate) beginning the frame data may be written to DDR SDRAM memory buffer through channel 4. Since then, every frame the previous VMD frame data (background) may be read through channel 5 from DDR SDRAM memory buffer and compared with the current frame data received from compressor module. If the current data may be greater than the corresponding background value then the new value written to the DDR SDRAM buffer through channel 4 may be equal to the background value increased by one. Accordingly, if the current data is less than the corresponding background value the new background value may be decreased by one and remains unchanged if both data values may be equal. The background estimation continues in this way every VMD frame throughout the time video motion detection remains enabled.

Until the background initialization is completed, the frame difference and alarm detection may remain disabled. After that every VMD frame the current data from compressor module may be compared with the corresponding background value and the two values absolute difference (module) may be produced. The difference may be then compared with a threshold (pixel threshold) programmable through a VMD threshold register. If the difference is greater than the programmed threshold, a counter value counting pixels with the difference exceeding the threshold may be increased.

At the end of each VMD frame, the pixel counter value may be compared with two threshold values programmed through VMD threshold registers. If the pixel counter value is greater than the value in the first VMD threshold register and less than the value in the second VMD threshold register, a counter counting the number of frames with the number of pixels with the difference exceeding the threshold may be increased. Otherwise, the counter value may be reset back to zero. When the counter reaches the value programmed through VMD control register, the VMD alarm output may be pulsed high for one clock cycle and the counter may be reset back to zero. In this way, it may be possible to set a minimum number of consecutive VMD frames with the motion detected that will produce VMD alarm. The VMD alarm signal may drive an interrupt status register flag. In order to detect a new VMD alarm, the flag may be polled or corresponding interrupt may be enabled and then an interrupt will be generated once the flag may be set.

With regard to motion detection, testing the data that may be sent to compressor module for JPEG compression may be selected through the VMD control register. This may be moving objects 'blobs' displayed in VMD window, the background data or the difference data. The video data will may remain set to 0xFF, when VMD enable bit in VMD control register may be cleared.

Figure 15:
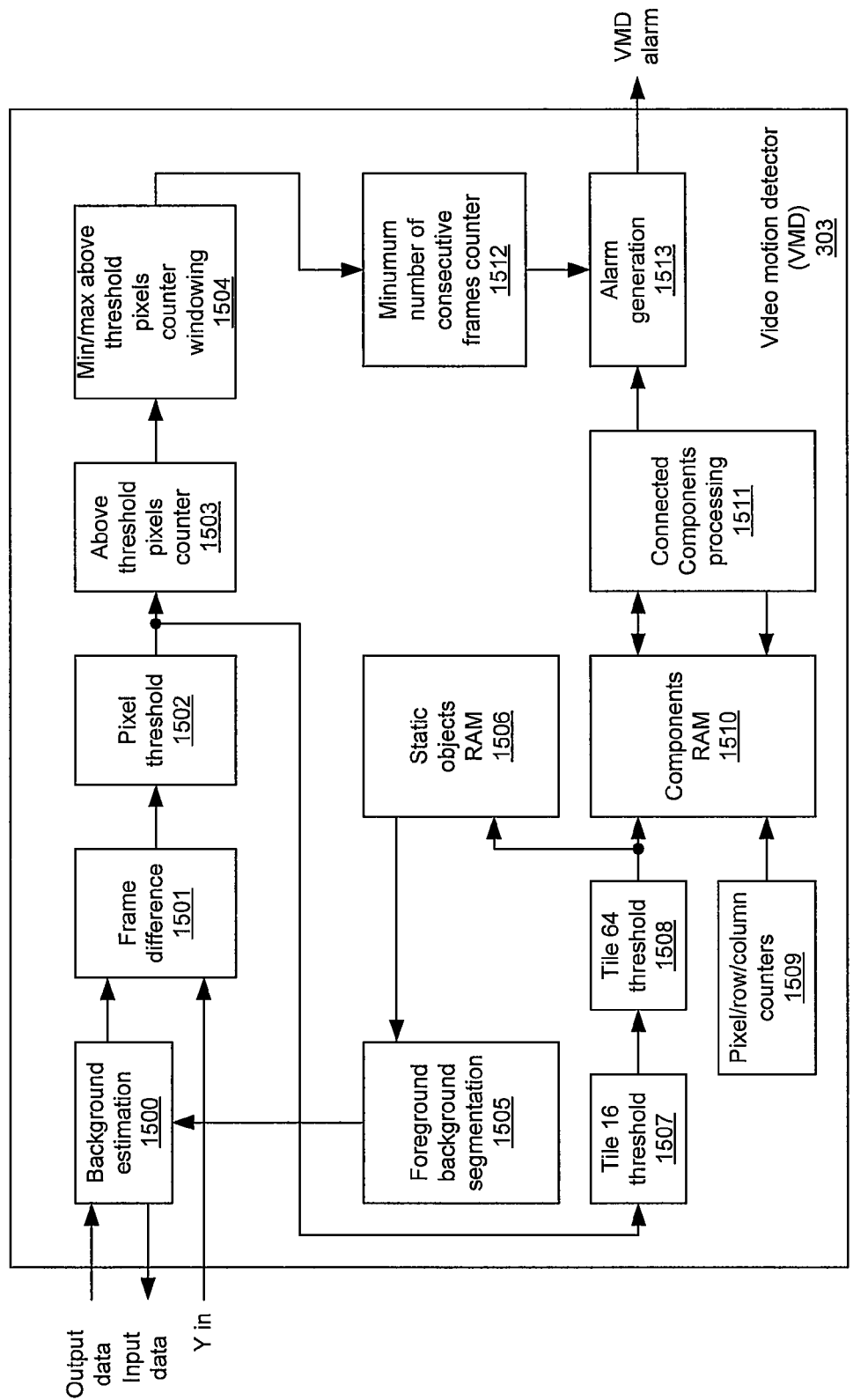
FIG. 15 illustrates static object detection operations in VMD, in accordance with an embodiment of the invention.

FIG. 15 illustrates static object detection operations in VMD, in accordance with an embodiment of the invention. Referring to FIG. 15, the video motion detector (VMD) 303 may comprise a background estimation module 1500, a frame difference module 1501, a pixel threshold module 1502, an above threshold pixels counter 1503, a min/max above threshold pixels counter windowing 1504, a foreground background segmentation module 1505, a static objects RAM module 1506, a minimum number of consecutive frames counter 1512, a tile 16 threshold module 1507, a tile 64 threshold module 1508, a components RAM module 1510, a connected components processing module 1511, an alarm generation module 1513, and pixel/row/column counters 1509.

In operation, the frame difference module 1501 may receive the luminance (Y) input. The background estimation module 1500 may receive image data. The background estimation module 1500 may perform statistical analysis to estimate the background of an image. The background estimation module 1500 may use multiple frames to create a statistical model of the background. The frame difference module 1501 subtracts the incoming frame from the statistical model of the background. The frame difference module 1501 may determine the difference between the incoming Y in data and the data received from the background estimation module 1500. The frame difference module 1501 may determine this difference between the Y in data and the model background data by performing a subtraction operation. By creating a model of the background, the background estimation module 1500 may enable the camera to ignore certain types of object movement. For example the movement of a tree swaying in the wind in the background of an image may be ignored using the background estimation process.

The result of the subtraction operation performed by the frame difference module 1501 may result in pixel values. The pixel values may then be transferred to the pixel threshold module 1502. The pixel threshold module 1502 may then utilize these pixel values to determine whether an object may be present within a frame. The pixel threshold module 1502 may contain a particular threshold and/or trigger level of pixels. An alarm may be triggered based upon a particular pixel threshold level. The pixel threshold module 1502 may output active tiles. These active tiles may be of any shape or size. For example, these active tiles may be 16×16 or 64×64 depending upon the application or the image sensor 100. The size of these active tiles may be inversely related to the level of detail within the tile. For example, if the size of a tile were decreased, there may be a greater amount of detail in the tile. This inverse correlation may enable an operator to balance the camera's operations between a wide range of motion and false alarms. Several smaller active tiles may be used to construct a larger active tile. For example, 16×16 tiles may be used to construct a 64×64 tile. This may enable detection of larger objects without compromising the level of detail captured in each active tile. The above threshold pixels counter 1503 counts the number of pixels that are beyond a threshold. The output from the pixel threshold module 1502 may be provided to the tile 16 threshold module 1507.

The tile 16 threshold module may convert the pixel data into a 16×16 tile. In another embodiment, the tile threshold module 1507 may convert pixels into tiles of any other shape or size. The tile 64 threshold 1508 may use the output of the tile 16 threshold 1507 to create a tile of 64×64. The output of the tile 64 threshold module 1508 may be provided to the static objects RAM 1506 and the components RAM module 1510. The static objects RAM 1506 may be enabled when it may be desirable to detect static objects within images. The components RAM 1510 may store active tiles. The output from the static objects RAM module 1506 may be provided to the foreground background segmentation module. The output from the components RAM module 1510 may be provided to the connected components processing module 1511. The connected components processing module 1511 may differentiate between active tiles and/or may classify moving objects within an image. The output of the components processing module 1511 may then be provided to the alarm generation module 1513. The alarm generation module 1513 may then output an alarm signal. The pixel threshold module 1502 may also output data to the above threshold pixels counter 1503. The above threshold pixels counter 1503 may count the number of pixels beyond threshold values. The output of the above threshold pixels counter 1503 may be provided to the min/max above threshold pixels counter windowing module 1504. The output of the min/max above threshold pixels counter windowing module 1504 may be provided to the minimum number of consecutive frames counter 1512. The output from the minimum number of consecutive frames counter 1512 may then be provided to the alarm generation module 1513. The alarm generation module 1513 may then output an alarm signal.

In addition to motion detection, the VMD 303 may also perform new static objects detection. This mode of operation may be enabled by setting a bit in the VMD control register high and provides detection of new static objects (or changes to existing static objects) in the programmable region of interest, the VMD window register. In the new static objects detection mode, the background estimation may be performed using +/−1 increments/decrements of the background value when the input luminance signal may be greater than/ less than the previous frame background value. During the background initialization stage every second VMD frame may be used for background estimation. After the background initialization may be complete every eight VMD frame may be used.

For background/foreground segmentation, in order to avoid updating the background value to foreground objects value, a simple segmentation mechanism may be employed. For this purpose, the entire maximum resolution image may be divided into 64×64 pixels tiles. Each tile may be considered to be 'active' (belonging to foreground) or 'inactive' (belonging to background). There may be two additional thresholding stages used to produce the tiles status. These may be: Tile 16 1507 and Tile 64 1508 thresholds. A 64×64 pixels tile may be considered to be active, if the number of its active 16×16 pixel tiles exceeds the Tile 16 Threshold set. A 16×16 pixels tile may be considered to be active, if the number of its pixels exceeding the Pixel Threshold value set may be greater than the Tile 16 Threshold set.

A dual-port memory (static objects RAM) 1506 may be used to store the 64×64 pixel status information. The RAM locations corresponding to the frame 64×64 pixels tiles may be written with 1 or 0 at the end of each 64×64 pixel tile and read during the next frame. If a pixel belonged during the previous frame to an active tile, the background value corresponding to this pixel may be not updated. Otherwise the background value may be incremented/decremented by 1 accordingly to the input luminance signal and previous background values (for every second/eight frame only).

For new static objects detection, after learning the background over a number of frames programmed through VMD control register, the module 1506 may detect any new objects that remain static for longer than a number of frames set through a VMD threshold register. The static objects RAM 1506 implements a 16-bit counter for each 64×64 pixels tile. Every frame a tile may be detected to belong to the foreground its count may be increased by 1 or reset to zero, if the tile is considered to belong to the background. In this way, the tiles that belong to new static objects will have their counts to reach the threshold set. When this happens, the count values may be no longer increased and 1s may be written to corresponding locations in the components RAM. The static objects detection requires a bit in the VMD control register to be set high. This may enable the connected components processing, which may allow producing of rectangular borders (bounding boxes) around of up to four new objects detected. A new static object (or objects) detected will set VMD alarm flag (same as for motion detection) and generate an interrupt when enabled.

Figure 16:
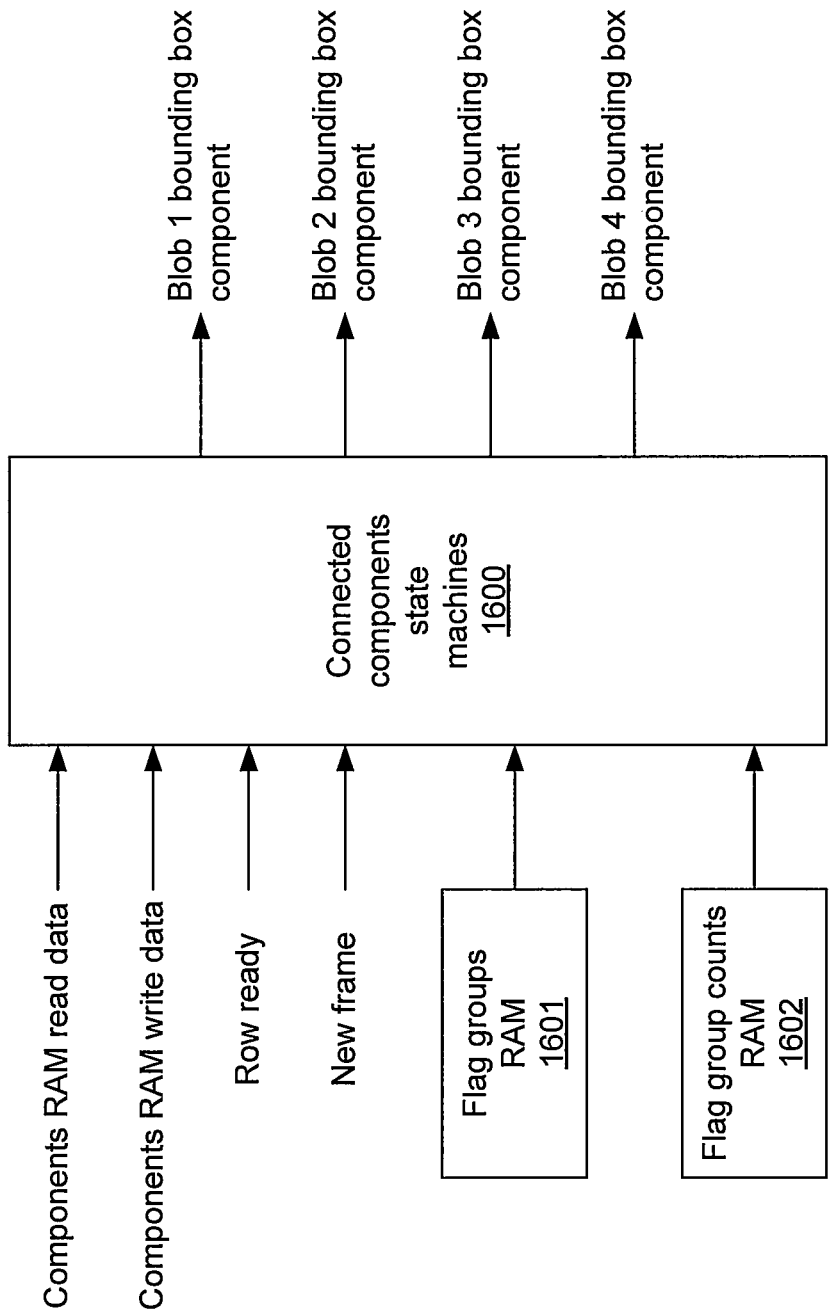
FIG. 16 illustrates connected components block diagram, in accordance with an embodiment of the invention.

FIG. 16 illustrates connected components block diagram, in accordance with an embodiment of the invention. Referring to FIG. 16, the connected components block diagram may contain connected components state machines 1600, flag groups RAM 1601, and flag group counts RAM 1602.

In operation, the connected components state machine 1600 may interface with the components RAM module 1510. The connected components state machines 1600 may receive six inputs from the connected components RAM module 1510. The inputs from the connected components RAM module 1510 may comprise components RAM read data, components RAM write data, row ready, new frame, flag groups RAM 1601, and flag group counts 1602. The flag groups RAM 1601 and flag group counts RAM 1602 may contain specific features that may have been extracted by the tile 16 threshold module 1507, the tile 64 threshold module 1508, and/or the pixel/row/column counter module 1509 (in FIG. 15). The input to the connected components state machines 1600 may include features such as shape, color, and movement of an object.

The connected components state machines 1600 may analyze the incoming data and classify objects into separate blobs. The connected components state machines 1600 may classify objects into blobs by placing the objects into a bounding box. The connected components state machines 1600 may target objects based upon various features such as color, shape, and/or direction. The architecture, functionality, and operation of the flag groups RAM 1601, the flag group counts RAM 1602, and the connected components state machines 1600 is discussed in greater detail herein below. The outputs from the connected components states machines 1600 may be provided to the alarm generation module 1513 and/or other modules within the smart network camera 110. These alarm outputs may also be transmitted to other smart network cameras 110 on the network. The connected components block implements connected components analysis algorithm for the purpose of detecting borders of separate objects in the difference image. The difference image may be produced due to moving or new static objects. The module operation may be the same in those two cases. A set number of largest objects may be detected.

In order to reduce processing time as well as data storage requirements, the difference image of maximum resolution may be divided into 64×64 pixels tiles. The minimum detected object border may be thus equal to a 64 pixels by 64 pixels square box. It should be noted that the detected object may be as small as 1 pixel (depending on the Tile 16 and Tile 64 thresholds setting). It may be possible to set a minimum detected object size limit to larger values through a VMD threshold register. This will prevent displaying small objects in motion detection and alarm generation due to new small static objects in new static objects detection modes of operation.

Figure 17:
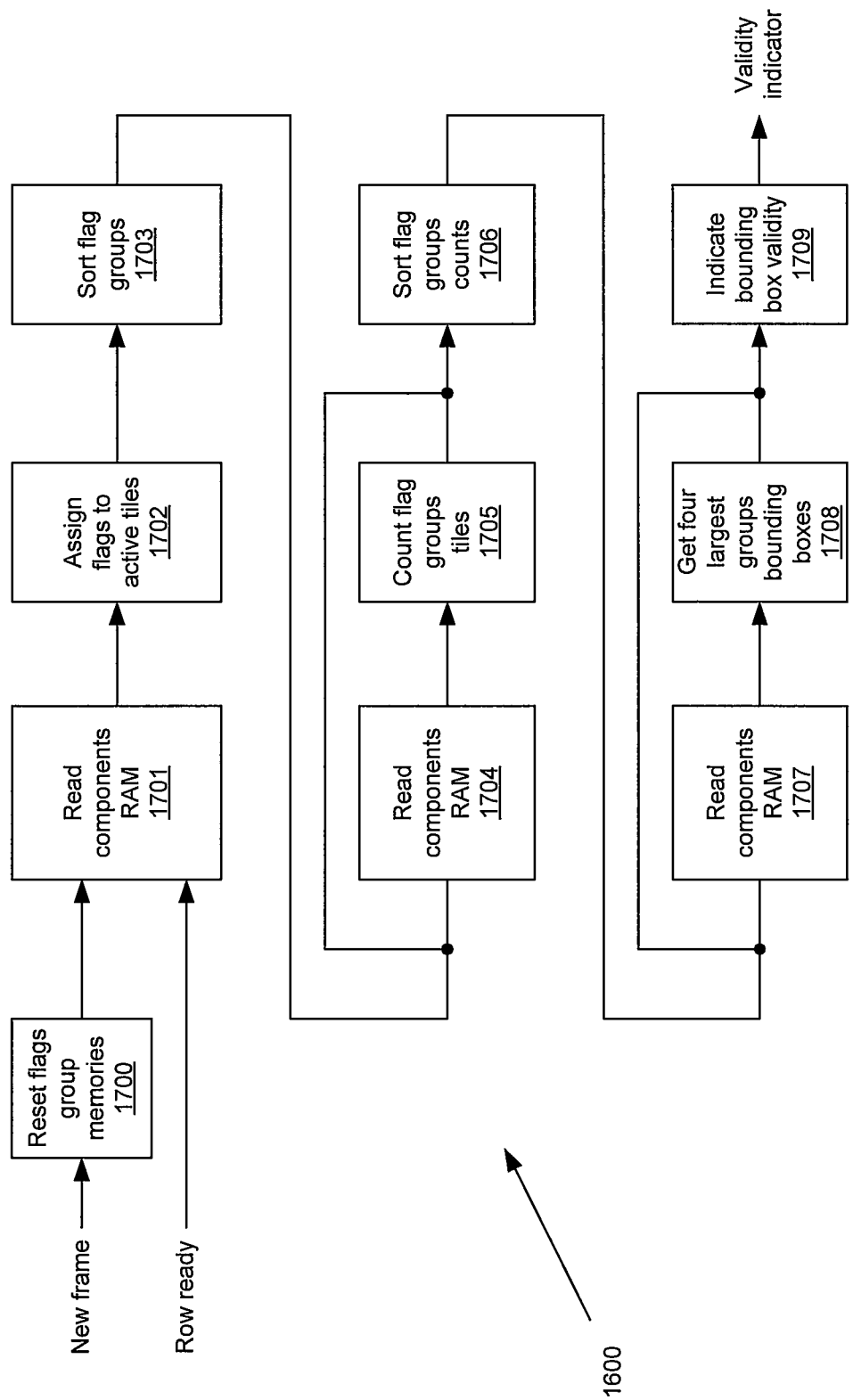
FIG. 17 illustrates connected components operations diagram, in accordance with an embodiment of the invention.

FIG. 17 illustrates connected components operations diagram, in accordance with an embodiment of the invention. Referring to FIG. 17, the connected components may comprise a reset flags group memories 1700, a read components RAM 1701, an assign flags to active tiles module 1702, a sort flag groups module 1703, a read components RAM module 1704, a count flag groups tile 1704, a count flag groups tiles 1705, a sort flag groups counts 1706, a read components RAM module 1707, a get four largest groups bounding boxes module 1708, and an indicate bounding box validity module 1709. FIG. 17 describes in greater detail, the relevant portions of the connected components state machines 1600 module, flag groups RAM 1601, and flag group counts RAM 1602.

In operation, the reset flag group memories module 1700 may receive a new frame. The reset flag group memories module 1700 may reset the flags upon receiving each new frame and/or active tiles. The read components RAM 1701 may extract active tiles. The read components RAM 1701 may use the row ready signal to address rows of memory. The assign flags to active tiles 1702 may read incoming active tiles from the read components RAM 1701. The assign flags to active tiles 1702 module may then assign flags for a new group of active tiles to classify objects. The sort flag groups module 1703 may sort flag groups. A second layer of similar operations may be carried out by the read components RAM 1704, the count flag groups tiles module 1705, and the sort flag groups counts 1706. That is, the components RAM 1704 may extract active tiles. The read count flag groups tiles module 1705 may then assign flags for a new group of active tiles to classify objects. The sort flag groups counts 1706 may sort flag groups and classify them. This second layer of processing may enable reduction in noise levels.

The read components RAM 1704, the count flag groups tiles 1705, and the sort flag groups counts 1706 may collectively operate as a noise filter. The output from the count flag groups tiles 1705 may also be provided to the read components RAM 1704. This output may serve as a feedback for historical purposes. That is, this feedback may ensure reorganization of the tiles in case any tiles have been discarded by the count flag groups tiles module 1705. This feedback may also serve as a memory of the last active tile and/or series of active tiles. This feedback facilitates in the determination of whether an active tile is complete and/or whether the information contained within the active tile or series of active tiles forms an object. The read components RAM 1707 may extract active tiles. The get four largest groups bounding boxes module 1708 extracts the four largest objects within an active tile. In another embodiment, module 1708 may extract another number of objects. Each channel may carry blob bounding box information. The indicate bounding box validity module 1709 may indicate validity of a bounding box. In this regard, the indicate bounding box validity module 1709 may ensure that the coordinates of the bounding box of a blob is in the appropriate region of interest. The indicate bounding box validity module 1709 may output a validity indicator signal. The validity indicator signal may be used to form a boundary such as a line around an object.

For connected components block, components labeling may be required. In order to detect connected components in the image matrix, the state machine 1600 reads status of all 64×64 pixel tiles from the components RAM (in row by row sequence) and assigns flags to active tiles using 8-connected tiles neighborhood definition.

In the state machine algorithm, for the first row, if first active tile found assign a new flag. For any subsequent active tile, if the previous tile in the row was also active assign the same flag to current active tile. Otherwise, assign a new flag. For other rows, if first tile in the row and the current tile may be active check the status of the tile directly above (previous row tile). If the tile above may be active assign the tile flag to the current tile. If the above tile may be inactive assign a new flag to the current tile. If not first tile in the row and the current tile may be active check the status of the preceding tile in the previous row (the tile to the left to the tile above the current tile). If the tile is active assign the tile flag to the current tile. Otherwise check the tile above the current tile. Four cases may be possible: only the current tile active, assign a new flag; the previous and current tiles active, assign previous tile flag; the above and current tiles active, assign the above tile flag; and the previous, above and current tiles may be active, assign previous tile flag, indicate previous and above tiles flags equality (by writing bitwise OR of both flags to flag groups RAM location referenced by current flag index). For sorting flag groups, at the frame beginning each of the flag group locations may be written with a different flag coded by a set bit position. During the components labeling process some flags may have been modified to indicate equality with other flags (more than one bit set per flag).

In order to find flags that may be marked as equal the first flag may be taken as a reference flag and the flag groups RAM memory may be read starting from the next flag location. All non-zero flags may be bitwise AND-ed with the reference flag. If the result is different than zero then the two flags may be equal. Bitwise OR of both flags may be written to the current flag location and the reference flag location may be marked for reset. The reset may be performed when the reference flag has been checked against all other flags. After that a next flag may be taken as a reference and checked against the remaining flags. The process continues until second last flag has been used as a reference. At the end of this process the flag group memory contains non-zero flags corresponding to all identified separate components (objects) and all other unused flags equal to zero.

For counting flag group tiles, the flag read from components RAM may be bitwise AND-ed with first flag from flag group RAM. If the result is not equal to zero, the flag group count RAM location corresponding to the current flag may be incremented by one. Otherwise, the count may remain unchanged. The process may continue until all flags have been read from the flag group RAM. After that next flag from the components RAM may be read and the previous steps may be repeated until the end of components memory have been reached. At this point the flag group counts RAM contains the numbers of 64×64 pixels tiles in each separate object. The flag group counts may be sorted and a set number of the largest flag group counts may be found. Bounding boxes may be then found for the largest flag group counts by reading the component RAM to obtain the bounding box parameters (startX, endX, starty, endy). The largest bounding boxes parameters may be compared against minimum bounding box width and height to produce valid signals for bounding boxes exceeding the thresholds set.

Figure 18:
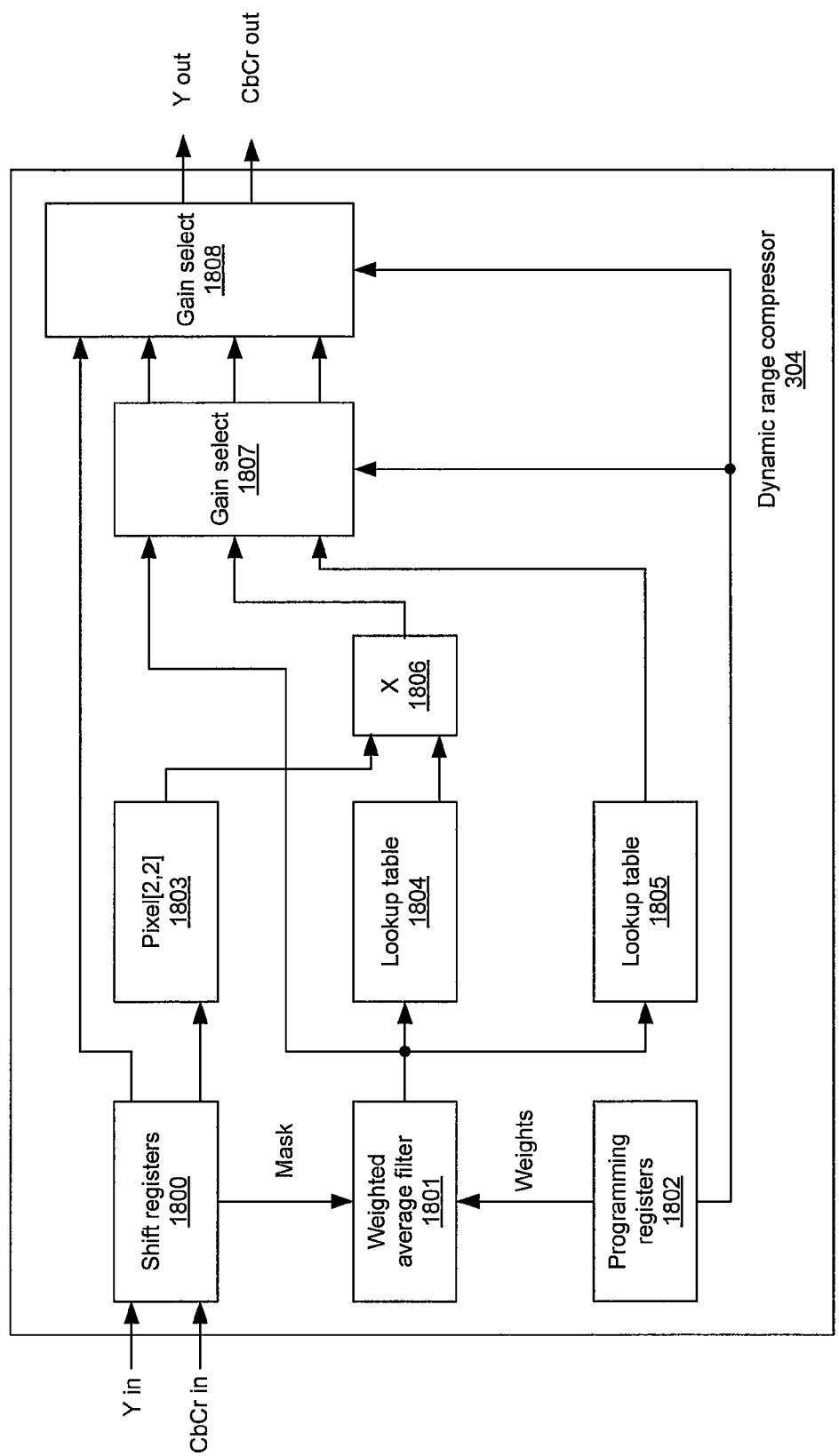
FIG. 18 illustrates a dynamic range compression block diagram, in accordance with an embodiment of the invention.

FIG. 18 illustrates a dynamic range compression block diagram, in accordance with an embodiment of the invention. Referring to FIG. 18, the dynamic range compressor 304 may comprise shift registers 1800, a weighted average filter 1801, programming registers 1802, a pixel [2,2] module 1803, a lookup table 1804, a lookup table 1805, a multiplication module 1806, a gain select module 1807, and a gain select module 1808.

In operation, the dynamic range compressor module 304 may perform a logarithmic compression with a non-linear filter characteristic. The shift registers 1800 of the dynamic range compressor module 304 may receive the luminance (Y) and chrominance (CbCr) inputs from the Bayer to YCbCr converter 302. The shift registers 1800 may perform mathematical operations such as division. The shift registers 1800 may divide the incoming Y and CbCr signals by a number specified within the registers. This number may be preset in the registers or may be programmable. The pixel [2,2] module may select a 2×2 window within the data. The X module 1806 may perform mathematical operations such as multiplication. The shift registers 1800 may also provide an output to the gain select module 1807. The gain select module 1807 may perform multiplication and/or amplification of the incoming signal. The output of the gain select module 1807 may be provided to the gain select module 1808.

The shift registers 1800 may also provide data to the weighted average filter 1801. The weighted average filter 1801 may perform a multiplication operation which may result in a linear filter. The output of the weighted average filter 1801 may be combined with the lookup table contained within the lookup table module 1804. The table stored within the lookup table module 1804 may be used to calculate the filter parameters. The X module 1806 may perform mathematical operations such as multiplication. The X module 1806 may multiply the output from the pixel [2,2] module 1803 by the output from the lookup table 1804. The output from the weighted average filter 1801 may also be provided to the lookup table module 1805. The lookup table module 1805 may perform a mathematical operation such as division. The division that may be performed by the lookup table module 1805 may result in data compression. The gain select module 1807 may receive data from the weighted average filter 1801, the multiplier 1806, and the lookup table 1805.

The gain select module 1807 may perform a mathematical operation such as division or multiplication. The gain select module 1808 may perform additional operations which may result in enhancement and amplification of the data signals. The programming registers 1802 may be used to enable, disable, and/or control the weighted average filter 1801, the gain select module 1807, and the gain select module 1808. The programming registers 1802 may also be used to program specific values for the weighted average filter 1801, the gain select module 1807, and the gain select module 1808. As a result of the specific processes within the dynamic range compressor module 304, the smart network camera 110 may be able to operate even in situations with low levels of illumination. For dynamic range compression (DRC), chrominance the median filters may be enabled or disabled. When disabled, the chrominance Cb and Cr signals may be passed unchanged through the dynamic range compression block or they may be set to a constant value for a black and white picture.

The DRC provides level shifting of luminance values in case of low level lighting conditions (night vision mode). This mode may be activated by the camera software upon detection of predominantly low level pixel values in the frame histogram. The compression causes that the 0 to 255 level values on the module input (48 dB dynamic range) may be represented by a smaller number of level values from 8 to 255 (30 dB dynamic range). This corresponds to 8-bit input value being represented by upper 5 bits of 8-bit values on the module output. The dynamic range may be then compressed 1.6 times (48/30). The higher the compression ration the higher the noise level on the module output. The implementation may be based on a 3×3 weighted average filter for the luminance channel. The filter window may be then obtained using a set of three shift registers. The result of the convolution of the pixels in the filter mask and the weight matrix may be obtained as the sum of the results of a pixel value and its corresponding weight multiplications.

The pixel weight mask multipliers may be implemented as binary multipliers, where multiplication may be by 0 and 2N where N=0, 1, 2 or 3. The filter weights may assume values of 0, 1, 2, 4 or 8. The filter weight values may be programmable through the DRC parameters register. The weighted average filter response may be obtained by dividing the convolution by a value dependant on the sum of the programmed weights. When simplicity of implementation is important, division may be limited to division by 8, 16, 32 or 64. The convolution divider value may be also programmable through the DRC parameters register. The first output luminance value may be obtained by multiplying the filter reference pixel value by a value read from the first lookup table, where the filter response may be used as the tables address. The result of the multiplication by the reference pixel value may be divided by 32 for 0 dB output gain and by other respective values for the other gain settings. Similarly, the second lookup table containing luminance compressed values may be addressed by the smoothing filter response producing dynamic range compressed second luminance output. The output data selector may select the luminance and chrominance signals that may be passed to other parts of the SoC for further processing.

Figure 19:
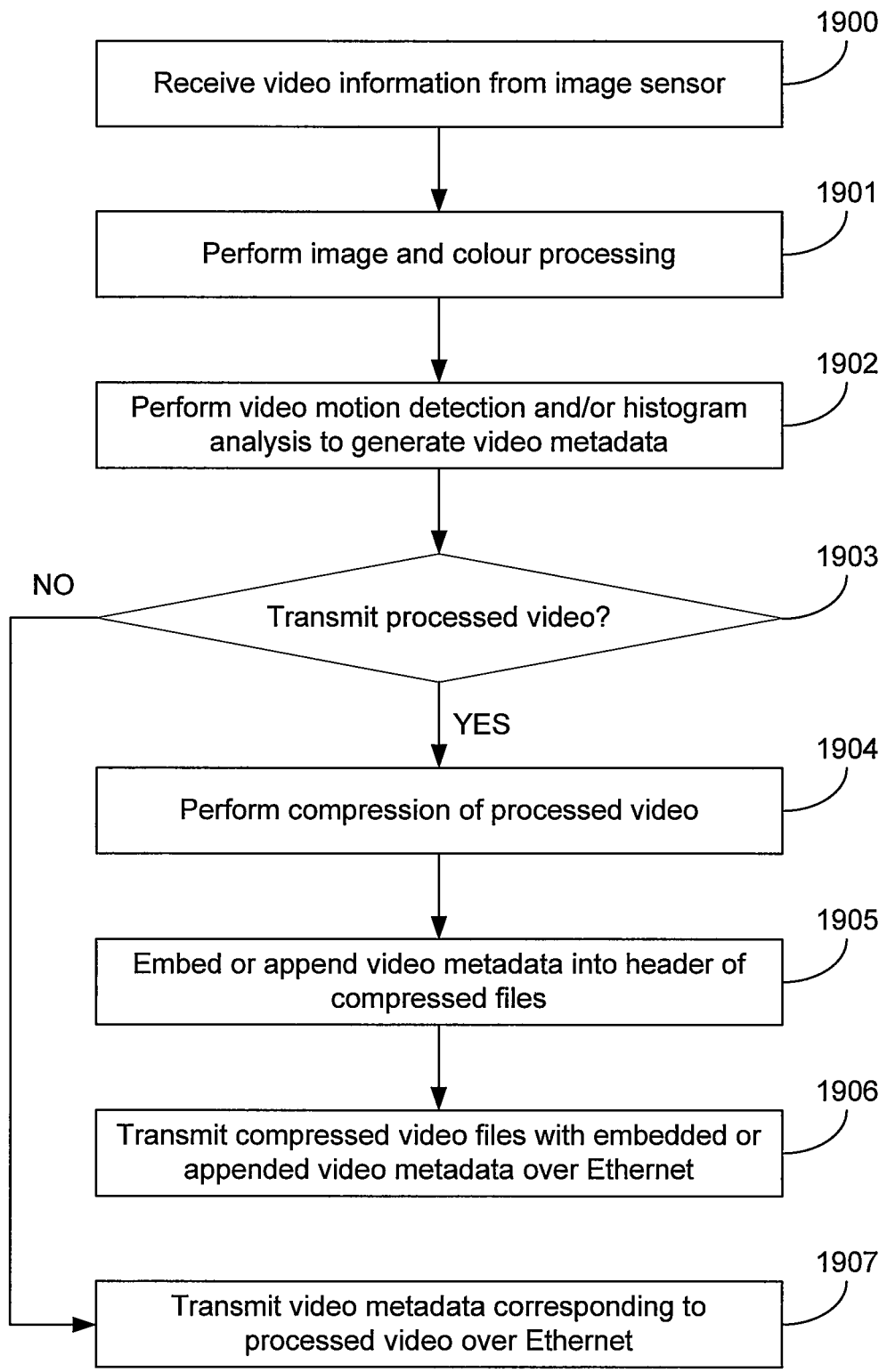
FIG. 19 illustrates a flow diagram for transmitting video content metadata, in accordance with an embodiment of the invention.

FIG. 19 illustrates a flow diagram for transmitting video content metadata, in accordance with an embodiment of the invention. Referring to FIG. 19, the flow chart illustrates an exemplary process by which the reconfigurable smart network camera SoC 104 may generate video metadata and embed or append metadata onto the header or XML part of the compressed video stream before being sending the stream to the Ethernet or other high-speed digital network. The video metadata may also be sent without its respective processed video in another mode of operation. Referring to FIGS. 1A and 19, at 1900, the reconfigurable smart network camera SoC 104 may receive video information from the image sensor 100. At 1901, the reconfigurable smart network camera SoC 104 may perform image and color processing. At 1902, the reconfigurable smart network camera SoC 104 may perform video motion detection and/or histogram analysis to generate video metadata. At 1903, the reconfigurable smart network camera SoC 104 may or may not elect to transmit processed video.

At 1907, if the reconfigurable smart network camera SoC 104 elects not to transmit processed video, the reconfigurable smart network camera SoC 104 may transmit only the video metadata corresponding to the processed video over Ethernet. In another embodiment of the invention, the reconfigurable smart network camera may transmit the video metadata through any other means of transmission as well, such as a wireless network. At 1904, if the reconfigurable smart network camera SoC 104 elects to transmit processed video, the reconfigurable smart network camera SoC 104 may perform compression of compressed video. At 1905, the reconfigurable smart network camera SoC 104 may embed or append video metadata into the header of the compressed files. At 1906, the reconfigurable smart network camera SoC 104 may transmit compressed video files with embedded or appended video metadata over Ethernet or via a wireless connection.

Figure 20:
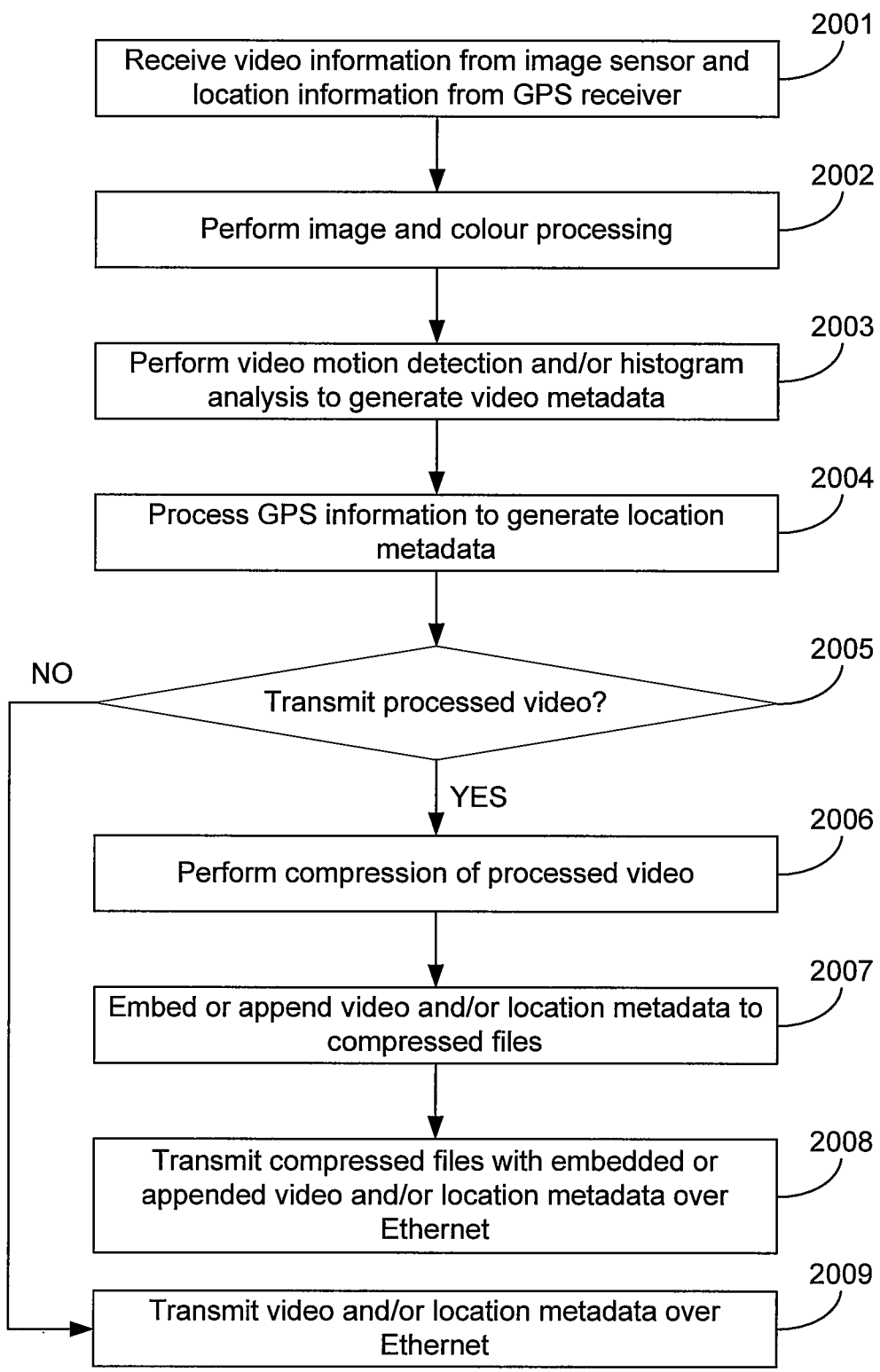
FIG. 20 illustrates a flow diagram for transmitting video and location content metadata, in accordance with an embodiment of the invention.

FIG. 20 illustrates a flow diagram for transmitting video and location content metadata, in accordance with an embodiment of the invention. Referring to FIG. 20, the flow chart illustrates an exemplary process by which the reconfigurable smart network camera SoC 104 may generate video metadata and/or location metadata and embed or append metadata onto the header or XML part of the compressed video stream before being sending the stream to the Ethernet or other high-speed digital network. As described in greater detail herein below, the video metadata and/or location metadata may also be sent without its respective processed video in another mode of operation.

Referring to FIGS. 1B and 20, at 2001, the reconfigurable smart network camera SoC 104 may receive video information from the image sensor 100 and location information from a GPS receiver 108. At 2002, the reconfigurable smart network camera SoC 104 may perform image and color processing. At 2003, the reconfigurable smart network camera SoC 104 may perform video motion detection and/or histogram analysis to generate video metadata. At 2004, the reconfigurable smart network camera SoC 104 may process GPS information to generate location metadata. At 2005, it may be determined whether the reconfigurable smart network camera SoC 104 transmits the processed video. At 2009, if the reconfigurable smart network camera SoC 104 elects not to transmit processed video, the reconfigurable smart network camera SoC 104 may transmit only the video metadata and/or the location metadata corresponding to the processed video over Ethernet. In another embodiment of the invention, the reconfigurable smart network camera may transmit the video metadata through any other means of transmission as well, such as a wireless network. At 2006, if the reconfigurable smart network camera SoC 104 elects to transmit processed video, the reconfigurable smart network camera SoC 104 may perform compression of compressed video. At 2007, the reconfigurable smart network camera SoC 104 may embed or append video metadata and/or location metadata into the header of the compressed files. At 2008, the reconfigurable smart network camera SoC 104 may transmit compressed video files with embedded or appended video metadata and/or location metadata over Ethernet.

Accordingly, aspects of the invention may be realized in hardware, software, firmware or a combination thereof. The invention may be realized in a centralized fashion in at least one computer system or in a distributed fashion where different elements may be spread across several interconnected computer systems. Any kind of computer system or other apparatus adapted for carrying out the methods described herein may be suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it may be possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system may be able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video data, the method comprising:
    detecting, within a single chip in a programmable surveillance video camera, one or more moving objects in a raw video signal generated by said programmable surveillance video camera;
    extracting, within said single chip in said programmable surveillance video camera, one or more characteristics of said detected one or more objects, wherein said extraction is based on said raw video signal;
    generating, within said single chip in said programmable surveillance video camera, one or more textual representations of at least one of said one or more characteristics of said detected one or more objects;
    compressing said raw video data in at least one compressed video file; and
    embedding at least one of said characteristics of said detected one or more objects into a header of said compressed video file.

2. The method according to claim 1, wherein said extraction is performed prior to compression of said raw video data.

3. The method according to claim 1, wherein said characteristics of said detected one or more objects comprise one or more of shape, texture, color, motion presence, motion direction, sequence name, location, links, and/or alarm type.

4. The method according to claim 1, comprising communicating said generated one or more textual representations outside of said single chip for processing.

5. The method according to claim 4, wherein said generated one or more textual representations are communicated outside of said single chip independently of image data corresponding to said raw video signal.

6. The method according to claim 4, wherein said generated one or more textual representations are communicated outside of said single chip in parallel with image data corresponding to said raw video signal.

7. The method according to claim 1, comprising formatting with at least one visual effect, at least a portion of image data corresponding to said raw video signal, wherein said at least one visual effect corresponds to one or more of said one or more characteristics of said detected one or more objects.

8. A non-transitory machine-readable storage having stored thereon, a computer program having at least one code section for processing video data, the at least one code section being executable by a machine for causing the machine to perform steps comprising:
    detecting, within a single chip in a programmable surveillance video camera, one or more moving objects in a raw video signal generated by said programmable surveillance video camera;
    extracting, within said single chip in said programmable surveillance video camera, one or more characteristics of said detected one or more objects, wherein said extraction is based on said raw video signal;
    generating, within said single chip in said programmable surveillance video camera, one or more textual representations of at least one of said one or more characteristics of said detected one or more objects;
    compressing said raw video data in at least one compressed video file; and
    embedding at least one of said characteristics of said detected one or more objects into a header of said compressed video file.

9. The machine-readable storage according to claim 8, wherein said extraction is performed prior to compression of said raw video data.

10. The machine-readable storage according to claim 8, wherein said characteristics of said detected one or more objects comprise one or more of shape, texture, color, motion presence, motion direction, sequence name, location, links, and/or alarm type.

11. The machine-readable storage according to claim 8, comprising code that enables communicating said generated one or more textual representations outside of said single chip for processing.

12. The machine-readable storage according to claim 11, wherein said generated one or more textual representations are communicated outside of said single chip independently of image data corresponding to said raw video signal.

13. The machine-readable storage according to claim 11, wherein said generated one or more textual representations are communicated outside of said single chip in parallel with image data corresponding to said raw video signal.

14. The machine-readable storage according to claim 8, comprising code that enables formatting with at least one visual effect, at least a portion of image data corresponding to said raw video signal, wherein said at least one visual effect corresponds to one or more of said one or more characteristics of said detected one or more objects.

15. A system for processing video data, the system comprising:
 one or more processors within a single chip in a programmable surveillance video camera, said one or more processors enable detecting one or more moving objects in a raw video signal generated by said programmable surveillance video camera;
 said one or more processors enable extracting, within said single chip, one or more characteristics of said detected one or more objects, wherein said extraction is based on said raw video signal;
 said one or more processors enable generating, within said single chip in said programmable surveillance video camera, one or more textual representations of at least one of said one or more characteristics of said detected one or more objects;
 said one or more processors enable compressing said raw video data in at least one compressed video file; and
 said one or more processors enable embedding at least one of said characteristics of said detected one or more objects into a header of said compressed video file.

16. The system according to claim 15, wherein said one or more processors enable performing of said extraction prior to compression of said raw video data.

17. The system according to claim 15, wherein said characteristics of said detected one or more objects comprise one or more of shape, texture, color, motion presence, motion direction, sequence name, location, links, and/or alarm type.

18. The system according to claim 15, wherein said one or more processors enable communicating said generated one or more textual representations outside of said single chip for processing.

19. The system according to claim 18, wherein said one or more processors enable communicating said generated one or more textual representations outside of said single chip independently of image data corresponding to said raw video signal.

20. The system according to claim 18, wherein said one or more processors enable communicating said generated one or more textual representations outside of said single chip in parallel with image data corresponding to said raw video signal.

21. The system according to claim 15, wherein said one or more processors enable formatting with at least one visual effect, at least a portion of image data corresponding to said raw video signal, wherein said at least one visual effect corresponds to one or more of said one or more characteristics of said detected one or more objects.

* * * * *